United States Patent
Zhang et al.

(10) Patent No.: US 11,381,275 B2
(45) Date of Patent: Jul. 5, 2022

(54) RANGING PROTOCOL IMPROVEMENTS TO SUPPORT ANTENNA SWITCHING

(71) Applicant: QUALCOMM Incorporated, San Diego, CA (US)

(72) Inventors: Xiaoxin Zhang, Sunnyvale, CA (US); Erik David Lindskog, Cupertino, CA (US); Sunil Ravi, Sunnyvale, CA (US); Kurt Erwin Landenberger, Santa Clara, CA (US); Mukul Sharma, Hyderabad (IN); Arjun Bhatia, Santa Clara, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 13 days.

(21) Appl. No.: 16/297,425

(22) Filed: Mar. 8, 2019

(65) Prior Publication Data
US 2019/0305813 A1    Oct. 3, 2019

(30) Foreign Application Priority Data
Mar. 31, 2018 (IN) .............................. 201841012233

(51) Int. Cl.
*H04B 1/44* (2006.01)
*G01S 13/76* (2006.01)
(Continued)

(52) U.S. Cl.
CPC .............. *H04B 1/44* (2013.01); *G01S 13/765* (2013.01); *H04B 7/04* (2013.01); *H04W 24/10* (2013.01); *H04W 64/00* (2013.01); *H04W 84/12* (2013.01)

(58) Field of Classification Search
CPC ..... H04W 64/00; H04W 4/023; H04W 84/12; H04W 24/00; H04W 24/10; H04W 88/08;
(Continued)

(56) References Cited

U.S. PATENT DOCUMENTS

| | | | | |
|---|---|---|---|---|
| 2010/0299584 | A1* | 11/2010 | Lee | H04W 56/0005 714/807 |
| 2012/0008558 | A1* | 1/2012 | Lim | H04B 7/0802 370/328 |

(Continued)

OTHER PUBLICATIONS

International Search Report and Written Opinion—PCT/US2019/021667—ISA/EPO—dated May 14, 2019.

*Primary Examiner* — Golam Sorowar
(74) *Attorney, Agent, or Firm* — Holland & Hart LLP

(57) ABSTRACT

This disclosure provides systems, methods and apparatuses, including computer programs encoded on computer storage media, for ranging procedures performed using antenna switching. In one aspect, a device initiating a ranging procedure may transmit a ranging request, which may include antenna switching capabilities of the initiating device, a request for antenna switching by a responding device during the ranging procedure, or both. Ranging signaling may be communicated between the initiating device and the responding device using different transmit antennas, receive antennas, or both. In some implementations, ranging messages transmitted by the responding device may include transmit antenna indices used for transmission of different ranging messages, and receive antenna indices used for reception of different ranging response messages. The initiating device may estimate a range relative to the responding device based on round trip times (RTTs) associated with different antenna pairs used during the ranging procedure.

30 Claims, 20 Drawing Sheets

(51) Int. Cl.
*H04B 7/04* (2017.01)
*H04W 24/10* (2009.01)
*H04W 64/00* (2009.01)
*H04W 84/12* (2009.01)

(58) Field of Classification Search
CPC . H04W 24/06; H04W 24/08; H04W 36/0011; H04W 4/029; H04W 4/043; H04W 4/21; H04W 4/30; H04W 52/0209; H04W 56/00; H04W 56/0005; H04W 56/0015; H04W 56/0045; H04W 60/04; G01S 13/74; G01S 5/00; G01S 13/765; G01S 13/767; G01S 5/021; G01S 5/0236; G01S 5/14; G01S 11/08; G01S 11/16; G01S 1/00; G01S 2013/466; G01S 3/72; G01S 3/74; G01S 5/0072; G01S 5/02; G01S 5/0215; G01S 5/0252; G01S 5/0273; G01S 5/06; G01S 5/12; H04L 43/0864; H04L 1/0083; H04L 1/0086; H04L 1/16; H04L 1/1671; H04L 1/1887; H04L 47/283; H04L 5/0044; H04L 5/005; H04L 5/0053; H04L 5/0055; H04L 67/104

See application file for complete search history.

(56) References Cited

U.S. PATENT DOCUMENTS

| | | | |
|---|---|---|---|
| 2012/0213154 A1* | 8/2012 | Gaal | H04B 7/061 370/328 |
| 2013/0005403 A1* | 1/2013 | Kuwahara | H04W 48/10 455/561 |
| 2015/0099538 A1* | 4/2015 | Wang | H04W 64/00 455/456.1 |
| 2015/0319631 A1 | 11/2015 | Aldana et al. | |
| 2015/0350936 A1* | 12/2015 | Qi | H04W 24/02 370/252 |
| 2016/0242056 A1 | 8/2016 | Patil et al. | |
| 2016/0255604 A1* | 9/2016 | Venkatraman | H04W 24/08 455/456.1 |
| 2017/0006422 A1* | 1/2017 | Kim | G01S 11/16 |
| 2017/0127412 A1 | 5/2017 | Amizur | |
| 2017/0250831 A1 | 8/2017 | Aldana et al. | |
| 2017/0257885 A1 | 9/2017 | Zhang et al. | |
| 2017/0261591 A1* | 9/2017 | Zhang | G01S 5/14 |

\* cited by examiner

RANGING PROTOCOL IMPROVEMENTS TO SUPPORT ANTENNA SWITCHING

CROSS REFERENCE

The present application for patent claims the benefit of India Provisional Patent Application No. 201841012233 by Zhang, et al., entitled "Ranging Protocol Improvements To Support Antenna Switching," filed Mar. 31, 2018, assigned to the assignee hereof, and expressly incorporated by reference in its entirety herein.

TECHNICAL FIELD

The following relates generally to wireless communications, and more specifically to ranging protocol improvements to support antenna switching.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources such as time, frequency, and power. A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink (or forward link) may refer to the communication link from the AP to the station, and the uplink (or reverse link) may refer to the communication link from the station to the AP.

Wireless communication devices, which may include APs, STAs, and other devices, may utilize ranging techniques, such as a fine timing measurement (FTM) procedure, for estimating distances from other wireless devices. For example, a wireless device initiating a ranging procedure may perform timing measurement procedures with a responding wireless device to measure one or more round trip times (RTTs) associated with signaling between the two devices. RTTs may be used to estimate a range between the two devices, to determine a location of one device with respect to the other device, etc. In some implementations, ranging accuracy may depend on direct path estimations determined from measured RTTs.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for wireless communication by a first wireless communication device. The apparatus can be in a system including a first interface configured to output a ranging request for a ranging procedure for transmission to a second wireless communication device. The apparatus can further include a second interface configured to receive a set of ranging messages based on the transmitted ranging request. The first interface can be further configured to output a set of ranging response messages for transmission to the second wireless communication device, where each ranging response message in the set of ranging response messages corresponds to a separate ranging message in the received set of ranging messages and at least two ranging response messages of the set of ranging response messages are output for transmission using different transmit antennas. The apparatus can further include a processing system configured to estimate a range between the first wireless communication device and the second wireless communication device based on the set of ranging messages and the at least two ranging response messages output for transmission using different transmit antennas. In some cases, the apparatus can be included in a wireless communication device with transmit and receive capabilities.

Another innovative aspect of the subject matter described in this disclosure can be implemented in a method for wireless communication. In some implementations, the method can include transmitting, by a first wireless communication device, a ranging request for a ranging procedure to a second wireless communication device. In some implementations, the method can further include receiving, by the first wireless communication device, a set of ranging messages based on the transmitted ranging request, and transmitting a set of ranging response messages to the second wireless communication device, where each ranging response message in the set of ranging response messages corresponds to a separate ranging message in the received set of ranging messages and at least two ranging response messages of the set of ranging response messages are transmitted using different transmit antennas. The method can further include estimating a range between the first wireless communication device and the second wireless communication device based on the set of ranging messages and the at least two ranging response messages transmitted using different transmit antennas.

Another innovative aspect of the subject matter described in this disclosure can be implemented in a non-transitory computer-readable medium storing code for wireless communication. The code can include instructions executable by a processor to transmit, by a first wireless communication device, a ranging request to a second wireless communication device. The code can further include instructions executable by a processor to receive, by the first wireless communication device, a set of ranging messages based on the transmitted ranging request, and transmit a set of ranging response messages to the second wireless communication device, where each ranging response message in the set of ranging response messages corresponds to a separate ranging message in the received set of ranging messages and at least two ranging response messages of the set of ranging response messages are transmitted using different transmit antennas. The code may further include instructions executable by a processor to estimate a range between the first wireless communication device and the second wireless communication device based on the set of ranging messages and the at least two ranging response messages transmitted using different transmit antennas.

In some implementations of the method, apparatus, or computer-readable medium, at least two ranging messages of the set of ranging messages are received using different receive antennas of the first wireless communication device, and where the range between the first wireless communication device and the second wireless communication device is estimated based on using the different receive antennas.

In some implementations, the method, apparatus, or computer-readable medium can include determining a set of range values for each transmit and receive antenna pair used during the ranging procedure, where each range value of the set of range values is determined based on receiving a ranging message and transmitting a ranging response message using a transmit and receive antenna pair associated with the set. The method, apparatus, or computer-readable medium can further include computing an average range value for each set of determined range values, and identifying a minimum range value of all computed average range values, where the range between the first wireless communication device and the second wireless communication device is estimated based on the minimum range value.

In some implementations, the method, apparatus, or computer-readable medium may include determining a set of round trip times based on receiving the set of ranging messages and transmitting the set of ranging response messages, where at least two round trip times of the set of round trip times are determined based on using different transmit and receive antenna pairs. The method, apparatus, or computer-readable medium can further include determining an outlier threshold for discarding one or more round trip times of the set of round trip times, and determining a subset of valid round trip times of the set of round trip times based on the outlier threshold, where the range between the first wireless communication device and the second wireless communication device is estimated based on the subset of valid round trip times.

In some implementations, the method, apparatus, or computer-readable medium may include determining a median round trip time based on the set of round trip times, where the outlier threshold is based on the median round trip time, a bandwidth of the set of ranging messages, a bandwidth of the set of ranging response messages, a preamble type of the set of ranging messages, a preamble type of the set of ranging response messages, or some combination thereof.

In some implementations of the method, apparatus, or computer-readable medium, determining the subset of valid round trip times can further include comparing each round trip time of the set of round trip times to the outlier threshold, where the subset of valid round trip times is determined based on one or more round trip times that satisfy the outlier threshold.

In some implementations, the method, apparatus, or computer-readable medium can include identifying a first group of the subset of valid round trip times including one or more valid round trip times determined using a first transmit and receive antenna pair and identifying a second group of the subset of valid round trip times including one or more valid round trip times determined using a second transmit and receive antenna pair. The method, apparatus, or computer-readable medium can further include determining a weighted round trip time average for each of the first group and the second group, where the range between the first wireless communication device and the second wireless communication device is estimated based on the weighted averages.

In some implementations of the method, apparatus, or computer-readable medium, each weighted average is based on a median round trip time, a bandwidth of the set of ranging messages, a bandwidth of the set of ranging response messages, a preamble type of the set of ranging messages, a preamble type of the set of ranging response messages, or some combination thereof.

In some implementations, the method, apparatus, or computer-readable medium can include identifying a lesser weighted round trip time average of the weighted round trip time averages, where the range between the first wireless communication device and the second wireless communication device is estimated based on the lesser weighted average.

In some implementations of the method, apparatus, or computer-readable medium, the ranging request includes a request for transmit antenna switching by the second wireless communication device during the ranging procedure.

In some implementations, the method, apparatus, or computer-readable medium can include determining that at least two ranging messages of the received set of ranging messages are associated with different transmit antennas of the second wireless communication device based on the request for transmit antenna switching by the second wireless communication device, where the range between the first wireless communication device and the second wireless communication device is estimated based on the determination.

In some implementations of the method, apparatus, or computer-readable medium, receiving the set of ranging messages can further include receiving a first ranging message including an indication of transmit antenna switching capabilities of the second wireless communication device, where the range between the first wireless communication device and the second wireless communication device is estimated based on the indication of transmit antenna switching capabilities of the second wireless communication device.

In some implementations of the method, apparatus, or computer-readable medium, receiving the set of ranging messages can further include receiving, for each ranging message in the set of ranging messages, a transmit antenna index indicating a transmit antenna of the second wireless communication device used to transmit that ranging message or a transmit antenna of the second wireless communication device used to transmit a previous ranging message, where the range between the first wireless communication device and the second wireless communication device is estimated based on the transmit antenna index indicating a transmit antenna of the second wireless communication device used to transmit that ranging message or the transmit antenna of the second wireless communication device used to transmit a previous ranging message.

In some implementations of the method, apparatus, or computer-readable medium, the set of ranging message may include a set of fine timing measurement (FTM) frames and the set of ranging response messages includes a set of acknowledgement frames.

In some implementations, the method, apparatus, or computer-readable medium can include receiving a first ranging message including an indication of transmit antenna switching capabilities of the second wireless communication device. In some implementations of the method, apparatus, or computer-readable medium, the determination that at least two of the received ranging messages are associated with different transmit antennas of the second wireless communication device may be based on the indication of transmit antenna switching capabilities in the first ranging message. In some implementations of the method, apparatus, or computer-readable medium, each ranging message in the set of ranging messages may include a transmit antenna index indicating a transmit antenna of the second wireless communication device used to transmit that ranging message or a transmit antenna of the second wireless communication device used to transmit a previous ranging message. In some implementations of the method, apparatus, or computer-readable medium, the ranging request includes a request for the second wireless communication device to provide the transmit antenna index for each ranging message in the set of ranging messages.

In some implementations, the method, apparatuses, or computer-readable medium can include transmitting a set of ranging response messages to the second wireless communication device, where each ranging response message in the set of ranging response messages corresponds to a separate ranging message in the received set of ranging messages. In some implementations of the method, apparatuses, or computer-readable medium, the ranging request further includes a request for receive antenna switching by the second wireless communication device during the ranging procedure, and estimating the range may be further based on a determination that at least two of the ranging response messages may be associated with different receive antennas of the second wireless communication device.

In some implementations, the method, apparatuses, or computer-readable medium can include receiving the set of ranging messages and may further include operations, features, means, or instructions for receiving a first ranging message including an indication of receive antenna switching capabilities of the second wireless communication device. In some implementations of the method, apparatuses, or computer-readable medium, the determination that at least two of the ranging response messages may be associated with different receive antennas of the second wireless communication device may be based on the indication of receive antenna switching capabilities in the first ranging message.

In some implementations, the method, apparatuses, or computer-readable medium can include receiving the set of ranging messages and may further include operations, features, means, or instructions for receiving, for each ranging response message corresponding to the set of ranging messages, a receive antenna index indicating a receive antenna of the second wireless communication device used to receive that ranging response message or a receive antenna of the second wireless communication device used to receive a previous ranging response message. In some implementations of the method, apparatuses, or computer-readable medium, the ranging request includes a request for the second wireless communication device to provide the receive antenna index for each ranging response message in the set of ranging response messages.

In some implementations, the method, apparatuses, or computer-readable medium can include receiving the set of ranging messages and may further include operations, features, means, or instructions for receiving a first ranging message including a request for transmit antenna switching by the first wireless communication device during the ranging procedure. In some implementations, the method, apparatuses, or computer-readable medium can include transmitting the set of ranging response messages to the second wireless communication device and may further include operations, features, means, or instructions for using different transmit antennas for transmitting at least two of the ranging response messages of the set of ranging response messages.

In some implementations of the method, apparatuses, or computer-readable medium, the set of ranging response messages includes a set of acknowledgement frames and the set of ranging messages includes a set of FTM frames. In some implementations of the method, apparatuses, or computer-readable medium, the set of ranging response messages includes a set of null data packet (NDP) frames, a set of downlink null data packet announcement (NDPA) frames, or a set of downlink (DL) NDP frames. In some implementations of the method, apparatuses, or computer-readable medium, the ranging request may be an FTM request frame, the set of ranging messages includes a set of FTM frames, and the ranging procedure may be an FTM procedure. In some implementations of the method, apparatuses, or computer-readable medium, the ranging request may be a NDPA frame, the set of ranging messages includes a set of NDP frames, and the ranging procedure may be a very high throughput IEEE 802.11az (VHTz) procedure. In some implementations of the method, apparatuses, or computer-readable medium, the ranging request may be a downlink Trigger frame, the set of ranging messages includes a set of uplink (UL) NDP frames, and the ranging procedure may be a high efficiency IEEE 802.11az (HEz) procedure.

In some implementations, the method, apparatuses, or computer-readable medium can include receiving the set of ranging messages and may further include operations, features, means, or instructions for receiving a first ranging message including a request for receive antenna switching by the first wireless communication device during the ranging procedure. In some implementations, the method, apparatuses, or computer-readable medium can include receiving the set of ranging messages and may further include operations, features, means, or instructions for using different receive antennas of the first wireless communication device to receive each ranging message, and where estimating the range may be further based on using the different receive antennas to receive each ranging message.

In some implementations, the method, apparatuses, or computer-readable medium can include determining a set of range values for each transmit and receive antenna pair used during the ranging procedure, where each range value of the set of range values may be determined based on receiving a ranging message and transmitting a ranging response message using a transmit and receive antenna pair associated with the set, computing an average range value for each set of determined range values and identifying a minimum range value of all computed average range values, where the range between the first wireless communication device and the second wireless communication device may be estimated based on the minimum range value. The average range value may be an example of a weighted average.

Another innovative aspect of the subject matter described in this disclosure can be implemented in a method for wireless communication. In some implementations, the method can include receiving, by a second wireless communication device, a ranging request for a ranging procedure from a first wireless communication device. In some implementations, the method can further include transmitting, by the second wireless communication device, a set of ranging messages to the first wireless device based on the received ranging request, where at least two ranging messages of the set of ranging messages are transmitted using different transmit antennas of the second wireless communication device.

Another innovative aspect of the subject matter described in this disclosure can be implemented in an apparatus for wireless communication. The apparatus can include a first interface configured to receive, by a second wireless communication device, a ranging request for a ranging procedure from a first wireless communication device. The apparatus can further include a second interface configured to transmit, by the second wireless communication device, a set of ranging messages to the first wireless communication device based on the received ranging request, where at least two ranging messages of the set of ranging messages are transmitted using different transmit antennas of the second wireless communication device. In some cases, the apparatus can be included in a wireless communication device with transmit and receive capabilities.

Another innovative aspect of the subject matter described in this disclosure can be implemented in a non-transitory computer-readable medium storing code for wireless communication. The code can include instructions executable by a processor to receive, by a second wireless communication device, a ranging request from a first wireless communication device, where the ranging request for a ranging procedure from a first wireless communication device. The code can further include instructions executable by a processor to transmit, by the second wireless communication device, a set of ranging messages to the first wireless device based on the received ranging request, where at least two ranging messages of the set of ranging messages are transmitted using different transmit antennas of the second wireless communication device.

In some implementations, the method, apparatuses, or computer-readable medium can include receiving a set of ranging response messages from the first wireless communication device, where each ranging response message in the received set of ranging response messages corresponds to a separate ranging message in the transmitted set of ranging messages. In some implementations of the method, apparatuses, or computer-readable medium at least two ranging response messages of the set of ranging response messages are received using different receive antennas of the second wireless communications device.

In some implementations of the method, apparatuses, or computer-readable medium, the ranging request includes a request for transmit antenna switching by the second wireless communication device during the ranging procedure.

In some implementations of the method, apparatuses, or computer-readable medium, transmitting the set of ranging messages can further include transmitting a first ranging message including an indication of transmit antenna switching capabilities of the second wireless communication device.

In some implementations of the method, apparatuses, or computer-readable medium, transmitting the set of ranging messages can further include transmitting, for each ranging message in the set of ranging messages, a transmit antenna index indicating a transmit antenna of the second wireless communication device used to transmit that ranging message or a transmit antenna of the second wireless communication device used to transmit a previous ranging message.

In some implementations of the method, apparatuses, or computer-readable medium, the received ranging request includes a request for the second wireless communication device to provide the transmit antenna index for each transmitted ranging message in the set of ranging messages.

In some implementations of the method, apparatuses, or computer-readable medium, transmitting the set of ranging messages can further include transmitting, for each received ranging response message corresponding to the transmitted set of ranging messages, a receive antenna index indicating a receive antenna of the second wireless communication device used to receive each ranging response message. In some implementations of the method, apparatuses, or computer-readable medium, the received ranging request includes a request for the second wireless communication device to provide the receive antenna index for each received ranging response message in the set of ranging response messages.

In some implementations, the method, apparatuses, or computer-readable medium can include transmitting the set of ranging messages and may further include operations, features, means, or instructions for using different transmit antennas of the second wireless communication device to transmit each ranging message. In some implementations, the method, apparatuses, or computer-readable medium can further include receiving a set of ranging response messages from the first wireless communication device, where each ranging response message in the set of ranging response messages corresponds to a separate ranging message of the transmitted set of ranging messages.

In some implementations of the method, apparatuses, or computer-readable medium, the received ranging request further includes a request for receive antenna switching by the second wireless communication device during the ranging procedure. In some implementations, the method, apparatuses, or computer-readable medium can include transmitting a second ranging message including an indication of receive antenna switching capabilities of the second wireless communication device. In some implementations, the method, apparatuses, or computer-readable medium can include transmitting, for each ranging response message corresponding to the set of ranging messages, a receive antenna index indicating a receive antenna of the second wireless communication device used to receive each ranging response message.

In some implementations of the method, apparatuses, or computer-readable medium, the received ranging request includes a request for the second wireless communication device to provide the receive antenna index for each received ranging response message in the set of ranging response messages. In some implementations, the method, apparatuses, or computer-readable medium can include transmitting a second ranging message including a request for transmit antenna switching by the first wireless communication device during the ranging procedure. In some implementations, the method, apparatuses, or computer-readable medium can include using different receive antennas for receiving at least two of the ranging response messages of the set of ranging response messages.

In some implementations of the method, apparatuses, or computer-readable medium, the set of ranging response messages includes a set of acknowledgement frames and the set of ranging messages includes a set of FTM frames. In some implementations of the method, apparatuses, or computer-readable medium, the set of ranging response messages includes a set of NDP frames, a set of downlink (DL) NDPA frames, or a set of DL NDP frames. In some implementations of the method, apparatuses, or computer-readable medium, the ranging request may be an FTM request frame, the set of ranging messages includes a set of FTM frames, and the ranging procedure may be an FTM procedure. In some implementations of the method, apparatuses, or computer-readable medium, the ranging request may be a NDPA frame, the set of ranging messages can include a set of NDP frames, and the ranging procedure may be a VHTz procedure. In some implementations of the method, apparatuses, or computer-readable medium, the ranging request may be a downlink Trigger frame, the set of ranging messages includes a set of UL NDP frames, and the ranging procedure may be a HEz procedure.

In some implementations, the method, apparatuses, or computer-readable medium can include transmitting, for each ranging message in the set of ranging messages, a transmit antenna index indicating a transmit antenna of the second wireless communication device used to transmit that ranging message or a transmit antenna of the second wireless communication device used to transmit a previous ranging message. In some implementations of the method, apparatuses, or computer-readable medium, the received ranging request includes a request for the second wireless communication device to provide the transmit antenna index for each ranging message in the set of ranging messages. In some implementations, the method, apparatuses, or computer-readable medium can include transmitting a second ranging message including an indication of transmit antenna switching capabilities of the second wireless communication device. In some implementations of the method, apparatuses, or computer-readable medium, at least two of the transmitted ranging messages may be associated with different transmit antennas of the second wireless communication device.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
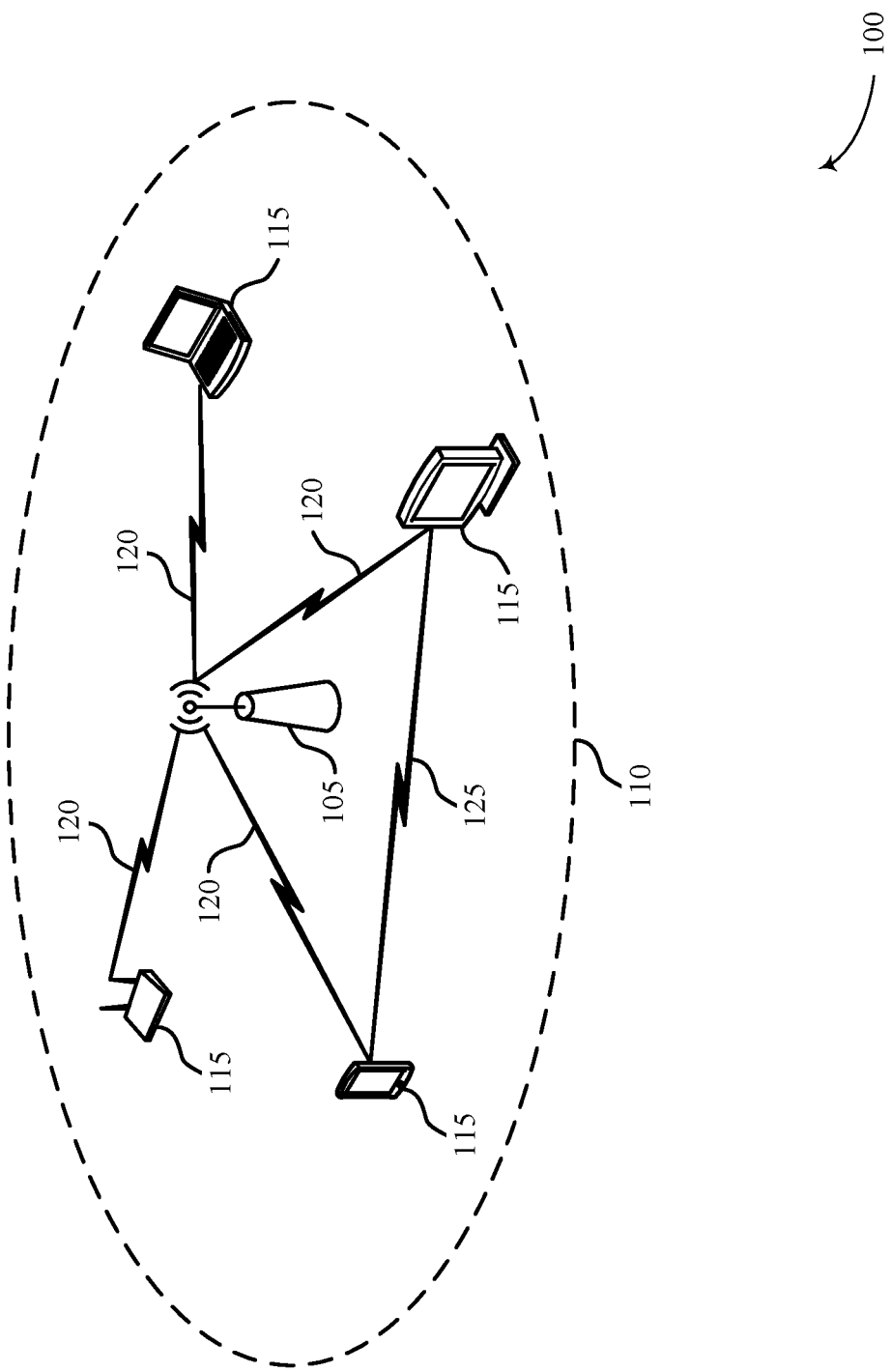
FIG. 1 shows a block diagram of an example wireless local area network (WLAN) that supports ranging protocol improvements for antenna switching.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (TOT) network, such as a system utilizing 3G, 4G or 5G, or further implementations thereof, technology.

Two wireless devices may exchange a series of ranging messages and ranging response messages to estimate a distance or range between the wireless devices. Timestamps associated with the ranging messages and ranging response messages (such as signal transmission and reception timing information) may be used to calculate round trip times (RTTs), from which the distance between the two devices can be extrapolated.

According to techniques described herein, a first wireless device may employ antenna switching during a ranging procedure with a second wireless communication device. The first wireless communication device may send a ranging request to the second wireless communication device, and the second wireless communication device may respond with a series of ranging messages. In some implementations, the first wireless communication device may receive at least two of the ranging messages using different receive antennas. The first wireless communication device may transmit, in response to each received ranging message, a ranging response message. In some implementations, at least two ranging response messages may be transmitted using different transmit antennas. The first wireless device may estimate a range between the first wireless communication device and the second wireless communication device based on RTTs calculated using different transmit antennas for ranging response messages, different receive antennas for ranging messages, or different transmit and receive antenna pairs used during the ranging procedure.

In some implementations, a ranging request sent by a first wireless communication device to a second wireless communication device may include a request for antenna switching by the second wireless communication device. The ranging request also may include an advertisement of antenna switching capabilities of the first wireless communication device. The second wireless communication device may respond to the ranging request with a series of ranging messages. The second wireless communication device also may advertise its antenna switching capabilities to the first device or request that the first device employ antenna switching during the ranging procedure. The range between the first and second wireless communication devices may be estimated based on the ranging messages and the antenna switching employed by at least one of the two wireless communication devices.

Alternatively, the second wireless communication device may autonomously employ antenna switching during the ranging procedure (such as without an explicit antenna switching request from the first wireless device). The first wireless communication device may transmit a ranging request, and the second wireless communication device may report timing information as well as antenna switching information. Throughout the ranging procedure, the second wireless communication device may report antenna information used for each RTT exchange (such as a transmit antenna used for transmission of a ranging message and a receive antenna used for reception of a ranging response message). Antenna pair dependent RTT estimations may be determined based on reported antenna information and timing information indicated during the RTT exchange.

Particular implementations of the subject matter described in this disclosure can be implemented to realize one or more of the following potential advantages. Beneficially, these ranging techniques may provide for more accurate channel estimation (such as direct path estimation) such that distances between an initiating device and a responding device may be estimated more accurately. For example, ranging accuracy may depend on how well the direct path between the two wireless communication devices is estimated in time. Ranging procedures employing antenna switching may increase transmitter and receiver spatial diversity and reduce multipath issues. In addition, this increase in spatial diversity may allow for a determination of a set of antenna pair dependent RTT estimation results between the two wireless communication devices. The antenna pair dependent RTT estimation results may be combined to reduce random error, inaccuracies arising from multipath scenarios, and noise.

Particular implementations of the subject matter described in this disclosure with reference to example wireless communications systems, examples of antenna switching capability elements and fine timing measurement (FTM) frames including Tx/Rx antenna indices enabling ranging protocol improvements to support antenna switching, example ranging procedures such as FTM procedures, null data packet (NDP) sounding procedures, ranging protocols, and the like, apparatus diagrams, system diagrams, and flowcharts can be implemented to realize one or more of the potential advantages.

FIG. 1 shows a block diagram of an example wireless local area network (WLAN) 100 that supports ranging protocol improvements for antenna switching. The WLAN 100 may include an access point (AP) 105 and multiple associated stations (STAs) 115, which may represent devices such as mobile stations, personal digital assistant (PDAs), other handheld devices, netbooks, notebook computers, tablet computers, laptops, display devices (TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some implementations, the coverage area 110 of an AP 105 may be divided into sectors (also not shown). The WLAN 100 may include APs 105 of different types such as metropolitan area, home network, and the like with varying and overlapping coverage areas 110. Two STAs 115 also may communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, 802.11ax, 802.11az, 802.11-EHT (or 802.11be), etc. In some other implementations, peer-to-peer connections or ad hoc networks may be implemented within the WLAN 100.

In some implementations, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment such as CSMA/CA because the STAs 115 may not refrain from transmitting on top of each other. A STA 115 whose transmissions are not identifiable, but that is within the same coverage area 110 may be known as a hidden node. CSMA/CA may be supplemented by the exchange of a ready to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, utilizing RTS/CTS may help mitigate a hidden node problem.

In some implementations, ranging accuracy may be decided or determined by a bandwidth of the fine timing measurement (FTM) frames that are transmitted. FTM frames using larger bandwidths, for example, may provide more information of the multipath wireless channel. As such, better timing accuracy may be achieved in estimating an arrival path on a first FTM transmission, resulting in better RTT and ranging accuracy. In some implementations, (such as utilizing a communication system under IEEE 802.11REVmc), the bandwidth may be limited (for example, to 160 MHz), and thus the information that may be sent by an FTM frame may be limited.

In some wireless communication devices (such as an AP 105 or STA 115), antennas are placed generally close to each other on the wireless communication device such that the ranges to different antennas may be similar. The channel information to different antennas of a wireless communication is independent, however, if the antennas of the wireless communication device are placed more than $\lambda/2$ apart, where $\lambda$ represents wavelength of the wireless communication (such as 3 cm in 5 GHz WiFi channel). This independent channel information may provide independent RTT estimation results. The RTT results derived from different antenna combinations between the initiating device and responding device may be combined to reduce any random error and thereby improve timing measurement accuracy.

In this regard, RTT measurements from each of the multiple antennas of a wireless communication device that are disposed at a localized position (such as where each antenna is spaced apart no more than approximately a number full wavelengths (i.e., 2, 3, or 4 full wavelengths in some radio frequency spectrum systems), where multiple antennas are disposed on the wireless communication device generally at a single location, where multiple antennas are disposed together in a clustered base but located away from the wireless communication device, etc.) may be used to fine tune or refine a final distance estimation between the wireless communication device and another wireless communication device. For example, the wireless communication device may have four antennas, each separated by approximately 3 cm to approximately 24 cm apart (such as for a 5 GHz WiFi device). These antennas may be integrated within a casing or housing of the wireless communication device (such as a mobile handset or tablet computer) or may be moveably attached to one or more sides of a casing or housing of the wireless communication device (such as an AP). While the distance separation between antennas at the same general location may be too small to perform triangulation procedures for determining a location of another device, each of these antennas may be used to provide similarly correlated distance measurements to determine a precise line-of-sight propagation associated with a 5 GHz WiFi channel (or other radio frequency spectrum channel such as, but not limited to, a 2.4 GHz WiFi channel) between another device.

As such, to achieve improved timing measurement accuracy, APs 105 and STAs 115 may employ ranging techniques utilizing antenna switching as described herein. In some implementations, ranging messages received by the initiating device may be received using different receive antennas. Additionally, or alternatively, ranging messages transmitted by the responding device may be transmitted using different transmit antennas. The initiating device may estimate a range between the two devices engaged in the ranging procedure (such as the timing measurement procedure) based on information associated with the ranging messages received, and information associated with ranging response messages transmitted in response to the received ranging messages. For example, by extending ranging to multiple antennas, wireless channel information may be obtained via different spatial links to further improve ranging accuracy.

Figure 2:
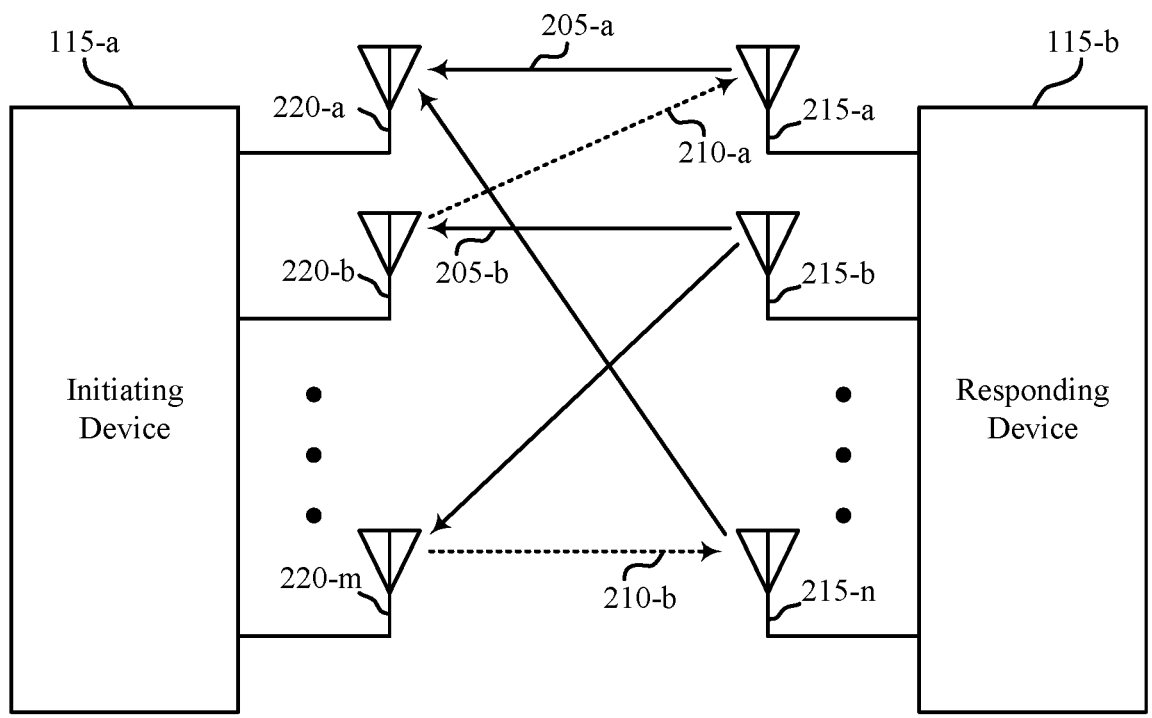
FIG. 2 shows a block diagram of an example WLAN that supports ranging protocol improvements for antenna switching.

FIG. 2 shows a block diagram of an example WLAN 200 that supports ranging protocol improvements for antenna switching. In some implementations, WLAN 200 may implement aspects of WLAN 100. WLAN 200 may include STA 115-a and STA 115-b, which may be examples of STAs 115 as described herein. The WLAN 200 may include an initiating device (such as STA 115-a) that initiates a ranging procedure or ranging signaling, with a responding device such as (STA 115-b). Further, STA 115-a and STA 115-b may perform antenna switching throughout the ranging procedure, as described in more detail herein. Although described between two STAs 115, techniques described herein may be performed between a STA 115 and an AP 105, between two APs 105, etc.

Wireless devices (such as STA 115-a and STA 115-b) may be capable of supporting some number of transmit antennas and receive antennas for antenna switching during ranging procedures. For example, STA 115-a may include m antennas and STA 115-b may include n antennas. Based on the capabilities of STA 115-a, each antenna 220 may be used as either a transmit antenna, a receive antenna, or both. In the example of FIG. 2, STA 115-a may be capable of operating antenna 220-a as a receive antenna, whereas antennas 220-b and 220-m may be operable as either a receive antenna or a transmit antenna. Similarly, each antenna 215 of STA 115-b may be used as either a transmit antenna, a receive antenna, or both, depending on STA 115-b capabilities. For instance, STA 115-b may be capable of operating antenna 215-b as a transmit antenna, whereas antennas 215-a and 215-n may be operable as either a receive antenna or a transmit antenna. STA 115-a and STA 115-b may convey antenna switching capabilities such as a number of supported transmit antennas, a number of supported receive antennas, antenna switching times, etc., via an antenna switching capabilities element, as further described with reference to FIGS. 3A and 3B.

STA 115-a may initiate a ranging procedure by transmitting a ranging request (such as an FTM request, a null data packet announcement (NDPA), a trigger frame, etc.) to STA 115-b. In response, STA 115-b may transmit ranging messages 205 using different transmit antennas (such as different antennas 215). In some implementations, the ranging messages 205 may be received, by STA 115-a, using different receive antennas (such as different antennas 220). For example, STA 115-b may transmit multiple ranging messages 205 (such as a burst of FTM frames, a series of NDP frames, etc.). A first ranging message 205-a may be transmitted by STA 115-b using antenna 215-a, and may be received by STA 115-a using antenna 220-a. A second ranging message 205-b may be transmitted by STA 115-b using antenna 215-b, and may be received by STA 115-a using antenna 220-b.

In response to each ranging message 205, STA 115-a may transmit ranging response messages 210 using different transmit antennas such as different antennas 220. In some implementations, the ranging response messages 210 may be received, by STA 115-b, using different receive antennas such as different antennas 215. For example, STA 115-a may transmit multiple ranging response messages 210 in response to received ranging messages 205. A first ranging response message 210-a (which may be transmitted in response to received ranging message 205-a) may be transmitted by STA 115-a using antenna 220-b, and may be received by STA 115-b using antenna 215-a. A second ranging response message 210-b (which may be transmitted in response to received ranging message 205-b) may be transmitted by STA 115-a using antenna 215-m, and may be received by STA 115-b using antenna 215-n. In some implementations, a transmit or receive antenna may be used for more than one ranging message 205 or ranging response message 210. That is, antennas 215-a and 215-b may be used by responding STA 115-b to transmit, for example, three ranging messages 205 (such that each and every ranging message or ranging response message may not necessarily be transmitted or received using a different antenna).

For example, a ranging procedure may begin with an initiator (such as STA 115-a) sends a ranging request to a responder (such as STA 115-b). STA 115-a may be considered a peer of STA 115-b and STA 115-b may be considered a peer of STA 115-a. STA 115-a may append or otherwise include an Antenna Switching Capabilities element to a ranging request to indicate if STA 115-a supports Tx/Rx antenna switching (such as Tx antenna switching, Rx antenna switching, or both), to indicate that STA 115-a supports reporting the per-packet antenna index for Tx/Rx antennas to STA 115-b, or both. Additionally, or alternatively, STA 115-a may append or otherwise include an Antenna Switching Request element to the ranging request to request STA 115-b switch Tx/Rx antennas, to request STA 115-b to report STA 115-b's per-packet antenna index for Tx/Rx antennas back to STA 115-a, or both.

In response to the ranging request, STA 115-b may optionally transmit an acknowledgement (ACK) to STA 115-*a*. STA 115-*b* may transmit first ranging message 205-*a* to STA 115-*a*. STA 115-*b* may append or otherwise include an Antenna Switching Capabilities element to first ranging message 205-*a* to indicate if STA 115-*b* supports Tx/Rx antenna switching or to indicate if STA 115-*b* supports reporting the per-packet Tx/Rx antenna indices to STA 115-*a*. Additionally, or alternatively, STA 115-*b* may append or otherwise include an Antenna Switching Request element to first ranging message 205-*a* to request STA 115-*a* switch Tx/Rx antennas or to request STA 115-*a* report per-packet Tx/Rx antenna indices for STA 115-*a* back to STA 115-*b*. In some implementations, an Antenna Switching Capabilities element or an Antenna Switching Request element may refer to a next generation positioning (NGP) parameters element.

Once STA 115-*b* has transmitted a first ranging message 205-*a*, STA 115-*a* may receive the first ranging message 205-*a* and transmit a ranging response message 210-*a* to STA 115-*b*. The time that STA 115-*b* transmits first ranging message 205-*a* may be referred to as $t_1$. The time that STA 115-*a* receives first ranging message 205-*a* may be considered $t_2$. The time that STA 115-*a* transmits a first ranging response message 210-*a* to STA 115-*b* may be considered $t_3$. The time that STA 115-*b* receives the first ranging response message 210-*a* may be considered $t_4$. An RTT may refer to the time it takes for a ranging message 205 to go from STA 115-*b* to STA 115-*a* and a ranging response message 210 to go from STA 115-*a* to STA 115-*b*, $(t_4-t_1)-(t_3-t_2)$, etc. As used herein, the notation $t_z^x$ may refer to the $z^{th}$ time stamp (such as $t_1$, $t_2$, $t_3$, $t_4$) associated with the $x^{th}$ RTT. For example, $t_4^2$ may refer to the time responding STA 115-*b* receives a second ranging response message 210-*b* (such as a second ACK) associated with a second RTT or a second ranging message 205-*b* (such as an FTM_2).

Ranging messages, including first ranging message 205-*a*, may report Tx/Rx antennas indices (such as either or both of Tx and Rx antennas indices). In some implementations, ranging messages 205 may include a Time of Departure (TOD) error field and a Time of Arrival (TOA) error field. A number of bits in the TOD error field (such as reserved bits in the TOD error field) may be used to report the Tx antenna index of STA 115-*b*. In some implementations, each bit may be used to represent a single antenna. In implementations using 80+80 (such as wireless communications systems using 80 MHz+80 MHz bandwidth), in which primary 80 and secondary 80 are transmitted using two different Tx antennas, some bits may be set aside to report the primary 80 Tx antenna index and some bits may be set aside to report the secondary 80 Tx antenna index. In another implementation, one bit may indicate if the Tx antenna index is for a previous FTM frame or a current FTM frame. In another implementation, the Tx antenna index may be mapped to a binary number.

Bits of the TOA field error field may be used to report STA 115-*b*'s Rx antenna index used by STA 115-*b* to receive a previous or future ranging response message 210, and to capture $t_4$. For example, ranging message 205-*b* may include a Rx antenna index associated with an antenna used to receive a previous ranging response message (such as ranging response message 210-*a*) and to capture $t_4$, a future ranging response message (such as ranging response message 210-*b* in response to the current ranging message 205), or some combination thereof. STA 115-*b* may use different Rx antennas to receive different ranging response messages 210. In some implementations, each bit of the Rx antenna index may represent a single antenna. Furthermore, multiple Rx antennas may be indicated to having received or will be receiving a ranging response message and to capture $t_4$. In implementations using 80+80 where primary 80 and secondary 80 are received using two different sets of Rx antennas, some bits may report the primary 80 Rx antenna index used to capture $t_4$ and other bits may report the secondary 80 Rx antenna index used to capture $t_4$. Furthermore, when either secondary 80 or primary 80 are not used to capture $t_4$ the bits set aside for the secondary 80 Rx antenna index or the primary 80 Rx antenna index may reflect this change. The Rx antenna index reported may reflect which Rx antenna is used to capture $t_4$. The Rx antenna index may be reported in the current FTM frame or in the next FTM frame.

An algorithm may be used to combine RTT measurements from different (Tx, Rx) antenna pairs. Although the initiator in this example is STA 115-*a* and the responder in this example is STA 115-*b*, this algorithm may work for other initiators (for instance, an AP) and other responders (for instance, an AP). Assuming N successful RTT measurements from a burst, STA 115-*a* may perform outlier detection and removal. STA 115-*a* may begin by finding the median of the N RTT measurements ($rtt_{median}$). STA 115-*a* may alternatively use the mean of the N RTT measurements. For each RTT measurement (rtt(i), i=1, 2 . . . , N), an outlier threshold $Th_i$ may be set. $Th_i$ may be a function of the bandwidth and preamble type of the FTM frame and ACK used to obtain an RTT measurement. $Th_i$ for a wide bandwidth may be smaller than $Th_i$ for narrow bandwidth. $Th_i$ for the IEEE 802.11n or IEEE 802.11ac preamble type may be smaller than $Th_i$ for the 11a preamble type. The high outlier threshold may be defined as $Th_{high}^i = rtt_{median} + Th_i$. The low outlier threshold may be defined as $Th_{low}^i = rtt_{median} - Th_i$. If $rtt(i) > Th_{high}^i$ or $rtt(i) < Th_{low}^i$, then rtt(i) may be marked as an outlier and removed. Elsewise rtt(i) may be considered a valid measurement. These steps may be repeated for all RTT measurements rtt(i), i=1, 2 . . . , N.

After outlier detection and removal, there may be M valid RTT measurements, denoted by $rtt_{valid}(1:M)$. For $rtt_{valid}(i)$, the $i^{th}$ RTT measurement, there may be an associated responder FTM Tx antenna $A_{ti}^R$, an associated responder ACK Rx antenna $A_{ri}^R$, an associated initiator FTM Rx antenna $A_{ri}^I$, and an associated initiator ACK Tx antenna $A_{ti}^I$. If responder FTM Tx antenna information is not available, $A_{ti}^R$ may be set to 0. Additionally, or alternatively, if initiator ACK Tx antenna information is not available, $A_{ti}^I$ may be set to 0. The M valid measurements may be put into T groups, where the measurements within each group have the same $(A_{ti}^R, A_{ri}^R, A_{ri}^I, A_{ti}^I)$. For each group, a weighted average of the RTT measurements within the group may be computed to get one output $rtt_{group}(t)$, t=1, 2, . . . T. For example, group t may have $N_t$ valid RTT measurements $rtt_{valid}(i_1, i_2, \ldots i_{N_T})$. The weighted average $rtt_{group}(t)$ may be calculated as $$rtt_{group}(t) = \frac{\sum_{n=1}^{N_T} \alpha_n rtt_{valid}(i_n)}{\sum_{n=1}^{N_T} \alpha_n}$$

where $\alpha_n$ may be a function of bandwidth and preamble type of the FTM frame and ACK used to obtain $rtt_{valid}(i_n)$. For example, if $\alpha_n = 1$, it is averaging. $\alpha_n$ may be larger for a wide bandwidth than it is for a narrow bandwidth and may be larger for the 11n or 11ac preamble type than for the 11a preamble type.

Once the weighted average $rtt_{group}(t)$ is calculated, the minimum value of $rtt_{group}(t)$ may be output as the final RTT between STA 115-*a* and STA 115-*b*. This may be done because the direct path may be hard to detect due to either non-line of sight (NLOS) or a certain multipath pattern for a certain antenna combination, meaning the resulting RTT measurement may be larger than the true distance. Thus, using the minimum of the RTT measurements from all groups may effectively remove bad measurements. The final RTT may be: $rtt_{final} = \min(rtt_{group}(1:T))$. In other implementations, the final RTT may be the mean, median, weighted average, or other functions of the RTT measurements from all groups.

The Tx and Rx antenna used in the algorithm may not be the same antenna. For example, STA 115-*a* may use antenna i to receive a ranging message and use antenna j to transmit a ranging response message where i≠j. Likewise, STA 115-*b* may use antenna k to receive a ranging response message and to capture $t_4$ and use antenna l to transmit a ranging message where k≠l. However, the Tx and Rx antenna used by STA 115-*a* or STA 115-*b* for the algorithm may be the same antenna. Using the same antenna may have the advantage of reducing the number of groups. For example, if an initiator, such as STA 115-*a*, has two antennas #0 and #1 and the device uses the same antenna for Tx and Rx, then $(A_{ri}^I, A_{ti}^I)$ may be either (#0,#0) or (#1,#1). Alternatively, an initiator that has two antennas #0 and #1 but may use different antennas for receiving and transmitting may have four combinations for $(A_{ri}^I, A_{ti}^I)$: (#0, #0), (#0, #1), (#1, #0), and (#1, #1). Having more groups may mean that there may be less measurements per group for a set number of FTM frames. More measurements per group may mean that the weighted average can more effectively suppress random noise.

In some implementations, the ranging request message may not necessarily include a request for antenna switching (such as antenna switching during ranging procedures may be preconfigured by the network, established in advance via radio resource control (RRC) signaling, etc.). In such cases, a responding device may still convey Tx/Rx antenna information via ranging messages as described herein, but may do so, in some implementations, without an explicit request to do so.

Figure 3A:
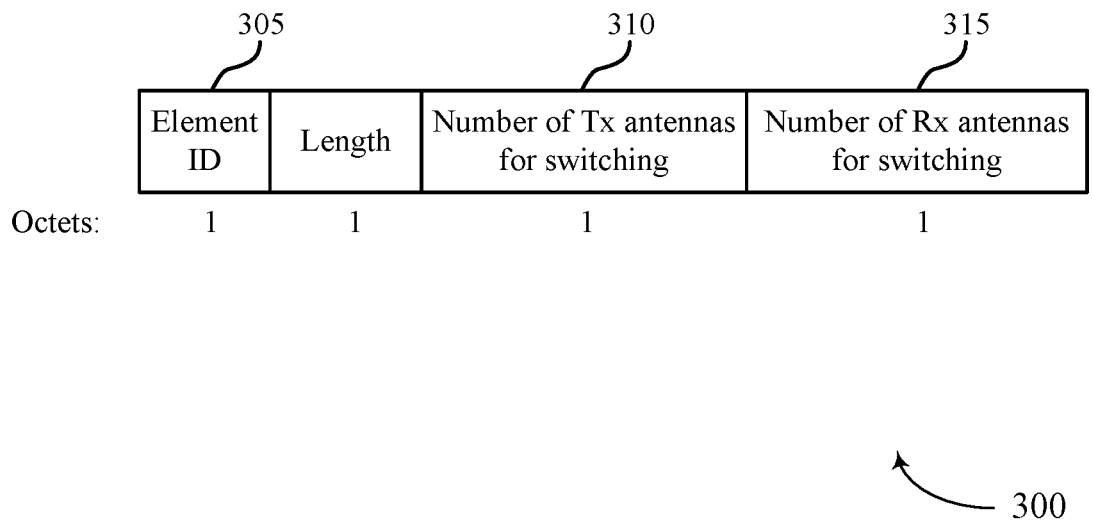
FIGS. 3A and 3B are block diagrams of example antenna switching capability elements that support ranging protocol improvements for antenna switching.

FIG. 3A is a block diagram of an example antenna switching capabilities element 300 that supports ranging protocol improvements for antenna switching. The Antenna Switching Capabilities element 300 may include, for example, an Element ID field 305, a Length field, a 'Number of Tx Antennas for Switching' field 310, and a 'Number of Rx Antennas for Switching' field 315. In the example of FIG. 3A, the Antenna Switching Capabilities element 300 may include four octets, with each field including one octet (or eight information bits). In some implementations, the Antenna Switching Capabilities element 300 may include other fields that convey information described herein.

The Antenna Switching Capabilities element 300 may be included in or appended to ranging signaling to convey Tx/Rx antenna capabilities (such as a number of Tx antennas supported for antenna switching, a number of Rx antennas supported for antenna switching, or both), to indicate support for reporting per-packet Tx/Rx antenna indices, or both. An initiating device may append the Antenna Switching Capabilities element 300 to a ranging request message (such as an FTM request (FTMR), a NDP trigger frame, etc.), to indicate Tx/Rx antenna switching capabilities of the initiating device, support for reporting per-packet Tx/Rx antenna indices (such as support for reporting Rx antenna indices used for ranging message reception, support for reporting Tx antenna indices used for ranging response message transmission, or both), or both. A responding device may append the Antenna Switching Capabilities element 300 to a ranging message (such as a first FTM frame, FTM_1, a first NDP frame, etc.), to indicate Tx/Rx antenna switching capabilities of the responding device, support for reporting per-packet Tx/Rx antenna indices (such as support for reporting Tx antenna indices used for ranging message transmission, support for reporting Rx antenna indices used for ranging response message reception, or both), or both. For example, a responding device may append the Antenna Switching Capabilities element 300 to a first ranging message to indicate subsequent ranging messages may include Tx/Rx antenna indices used by the responding device for ranging signaling. In some implementations, a responding device may include the Antenna Switching Capabilities element 300 in (or append the Antenna Switching Capabilities element 300 to) a first ranging message transmission based on receiving the Antenna Switching Capabilities element 300 in a ranging request message received from the initiating device.

The Element ID field 305 may be set to a value indicating the element is the Antenna Switching Capabilities element 300. For example, the Element ID field 305 may be set to a value (such as an 8-bit identifier) unique to the Antenna Switching Capabilities elements 300. The value may be any unused element number (such as any element number not used to identify other types of capability elements), such as 255 (a bit value of '11111111'). In some implementations, the Length field may be set to two (such as to indicate a two octet payload associated with the remaining 'Number of Tx Antennas for Switching' field 310 and the 'Number of Rx Antennas for Switching' field 315).

The 'Number of Tx antennas for switching' field 310 may have, for example, 8 bits. Bits 0-6 may all be set to 1 to indicate that Tx antenna switching is not supported. Otherwise, bits 0-6 may be set to the number of Tx antennas that can be used for antenna switching (such as the number of different Tx antennas that may be used to transmit a ranging message or ranging response message). Bit 7 may be set to 1 indicate that per-packet Tx index reporting, such as through FTM or NDP, is supported. Alternatively, Bit 7 may be set to 0 indicate that per-packet Tx index reporting is not supported. The 'Number of Tx antennas for switching' field 310 may be associated with a different number of bits, or may convey the above information using different bit combinations or schemes, by analogy. For example, in some implementations (such as implementations where the ranging devices are associated with 7 or fewer transmit antennas), each of bits 0-6 may be associated with an antenna index, such that bits 0-6 may be toggled to indicate a certain combination of antenna indices capable of being used as a transmit antenna. In such implementations, if bits 0-6 include a value of '0010101' the peer receiving the Antenna Switching Capabilities element 300 may identify three Tx antennas are supported, and the antenna indices associated with the three Tx antennas.

The 'Number of Rx antennas for switching' field 315 may have, for example, 8 bits. Bits 0-6 may all be set to 1 to indicate that Rx antenna switching is not supported. Otherwise, bits 0-6 may be set to the number of Rx antennas that can be used for antenna switching. Bit 7 may be set to 1 indicate that the per-packet Rx index reporting, such as through FTM or another ranging message, is supported. Alternatively, bit 7 may be set to 0 to indicate that the per-packet Rx index reporting is not supported. Other combinations, total numbers of bits, and numbers of bits corresponding to the number of Rx antennas that can be used for antenna switching are possible. The 'Number of Rx antennas for switching' fields 315 may be associated with a different number of bits, or may convey the above information using different bit combinations or schemes, by analogy. For example, in some implementations (such as implementations where the ranging devices are associated with 7 or fewer receive antennas), each of bits 0-6 may be associated with an antenna index, such that bits 0-6 may be toggled to indicate a certain combination of antenna indices capable of being used as a receive antenna. In such implementations, if bits 0-6 include a value of '0010101' the peer receiving the Antenna Switching Capabilities element 300 may identify three Rx antennas are supported, and the antenna indices associated with the three Rx antennas.

Figure 3B:
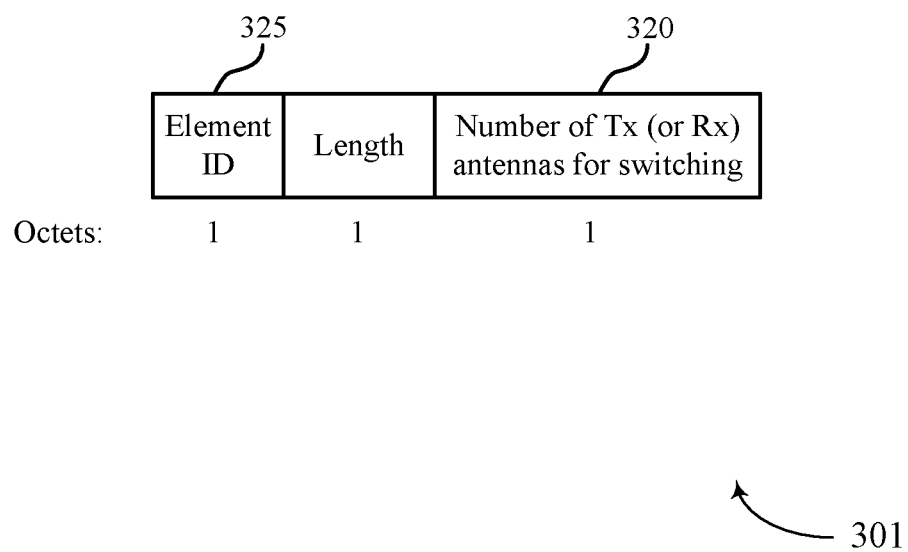

FIG. 3B is a block diagram of an example antenna switching capabilities element 301 that supports ranging protocol improvements for antenna switching. The Antenna Switching Capabilities element may include Element ID field 325, a Length field, and a 'Number of Tx (or Rx) antennas for switching' field 320. In the example of FIG. 3B, the Antenna Switching Capabilities element 300 may include three octets, where each field includes one octet (or eight information bits). That is, the 'Number of Tx (or Rx) antennas for switching' field 320 may refer to either a 'Number of Tx antennas for switching' field 320 or a 'Number of Rx antennas for switching' field 320, such that two separate Antenna Switching Capability elements are defined for each of Tx and Rx antenna switching capability information. The 'Number of Tx (or Rx) antennas for switching' field 320 may convey the information as described above with reference to the 'Number of Tx Antennas for Switching' field 310 or the 'Number of Rx Antennas for Switching' field 315. Whether the 'Number of Tx (or Rx) antennas for switching' field 320 conveys information as described herein with reference to the 'Number of Tx Antennas for Switching' field 310 or the 'Number of Rx Antennas for Switching' field 315 may depend on the Element ID field 325. That is, Element ID field 325 may be set to a value indicating the element is an Antenna Switching Capabilities element 301 that includes either the 'Number of Tx antennas for switching' field 320 or the 'Number of Rx antennas for switching' field 320. For example, the Element ID field 325 may be set to a value (such as an 8-bit identifier) unique to a receive the Antenna Switching Capabilities element 301 (such as an Antenna Switching Capabilities element 301 including the 'Number of Rx antennas for switching' field 320) or unique to a transmit Antenna Switching Capabilities element 301 (such as an Antenna Switching Capabilities element 301 including the 'Number of Tx antennas for switching' field 320).

Figure 4A:
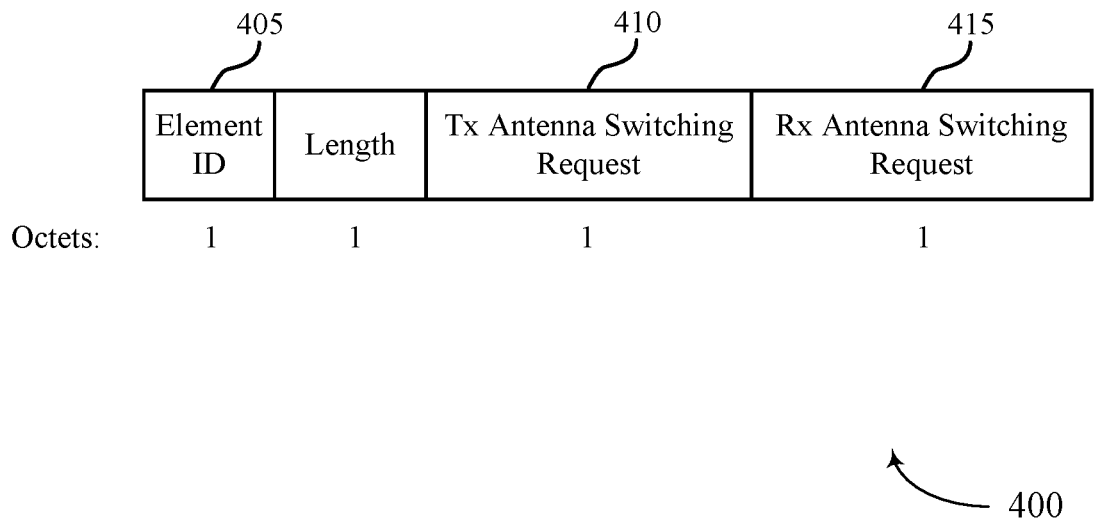
FIGS. 4A and 4B are block diagrams of example antenna switching request elements that support ranging protocol improvements for antenna switching.

FIG. 4A is a block diagram of an example antenna switching request element 400 that supports ranging protocol improvements for antenna switching. Antenna Switching Request element 400 may include an Element ID field 405, a Length field, a 'Tx Antenna Switching Request' field 410, and a 'Rx Antenna Switching Request' field 415. In the example of FIG. 4A, the Antenna Switching Request element 400 may include four octets, where each field includes one octet (or eight information bits). In some implementations, Antenna Switching Request element 400 may include other fields that convey information described herein.

The Antenna Switching Request element 400 may be included in or appended to ranging signaling to request a peer perform Tx/Rx antenna switching (such as switch Tx antennas, switch Rx antennas, or both), to request per-packet Tx/Rx antenna index reporting, or both, during a ranging procedure. An initiating device may append the Antenna Switching Request element 400 to a ranging request message (such as an FTMR, a NDP trigger frame, etc.), to request a responding device perform Tx/Rx antenna switching, request per-packet Tx/Rx antenna index reporting by the responding device (such as request the responding device report Tx antenna indices used for ranging message transmissions, request the responding device report Rx antenna indices used for ranging response message reception, or both), or both. A responding device may append the Antenna Switching Request element 400 to a ranging message (such as a first FTM frame, FTM_1, a first NDP frame, etc.), to request an initiating device perform Tx/Rx antenna switching, request per-packet Tx/Rx antenna index reporting by the initiating device (such as request the initiating device report Rx antenna indices used for ranging message reception, request the initiating device report Tx antenna indices used for ranging response message transmissions, or both), or both. For example, an initiating device may append the Antenna Switching Request element 400 to a ranging request message to request subsequent ranging messages sent by a responding device include Tx/Rx antenna indices used by the responding device for ranging signaling.

The Element ID field 405 may be set to a value indicating the element is the Antenna Switching Request element 400. For example, the Element ID field 405 may be set to a value (such as an 8-bit identifier) unique to the Antenna Switching Request element 400. The value may be any unused element number (such as any element number not used to identify other types of capability elements), such as 255 (a bit value of '11111111'). In some implementations, the Length field may be set to two (such as to indicate a two octet payload associated with the remaining 'Tx Antenna Switching Request' field 410 and 'RX Antenna Switching Request' field 415).

'Tx Antenna Switching Request' field 410 may include, for example, 8 bits. Bit 0 may be set to 1 to request a peer (a responding device if the initiating device is transmitting the Antenna Switching Request element 400 in a ranging request message, or an initiating device if the responding device is transmitting the Antenna Switching Request element 400 in a ranging message) to switch at least one Tx antenna. Otherwise, bit 0 may be set to 0. Bit 1 may be set to 1 to request a peer to feedback the Tx antenna index, such as through FTM or another ranging message. Otherwise, bit 1 may be set to 0. Use of different bits or different combinations of bits to convey such information in the 'Tx Antenna Switching Request' field 410 are possible.

The 'Rx Antenna Switching Request' field 415 may have, for example, 8 bits. Bit 0 may be set to 1 to request a peer (a responding device if the initiating device is transmitting the Antenna Switching Request element 400 in a ranging request message, or an initiating device if the responding device is transmitting the Antenna Switching Request element 400 in a ranging message) to switch at least one Rx antenna. Otherwise, bit 0 may be set to 0. Bit 1 may be set to 1 to request a peer to feedback a Rx antenna index, such as through FTM or another ranging message. Otherwise, bit 1 may be set to 0. Use of different bits or different combinations of bits to convey such information in the 'Rx Antenna Switching Request' field 415 are possible.

Figure 4B:
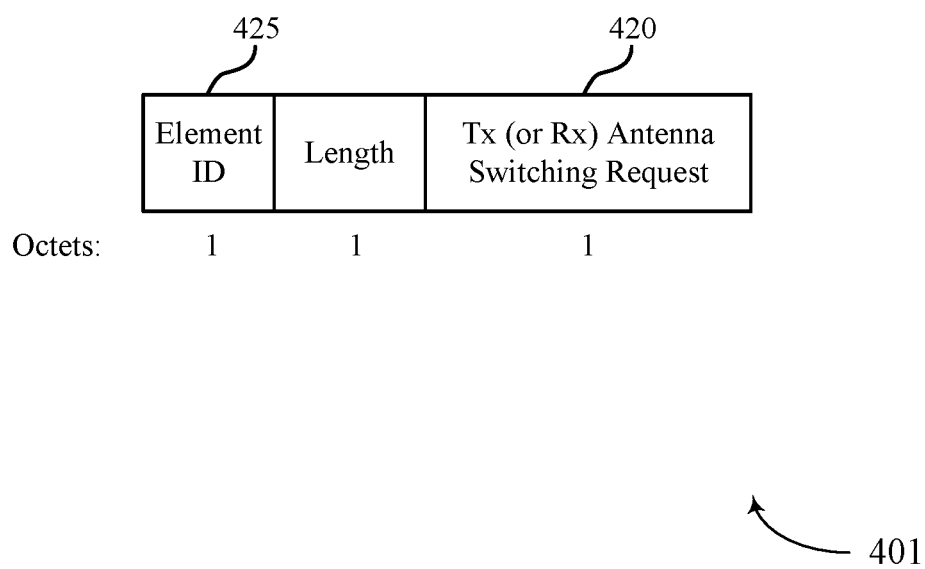

FIG. 4B is a block diagram of an example antenna switching request element 401 that supports ranging protocol improvements for antenna switching. The Antenna Switching Request element 401 may include Element ID field 425, a Length field, and a 'Tx (or Rx) Antenna Switching Request' field 420. In the example of FIG. 4B, the Antenna Switching Request element 401 may include three octets, where each field includes one octet (or eight information bits). That is, the 'Tx (or Rx) Antenna Switching Request' field 420 may refer to either a 'Tx Antenna Switching Request' field 420 or a 'Rx Antenna Switching Request' field 420, such that two separate Antenna Switching Capability elements are defined for each of Tx and Rx antenna switching requests. The 'Tx (or Rx) Antenna Switching Request' field 420 may convey the information as described herein with reference to 'Tx Antenna Switching Request' field 410 or 'Rx Antenna Switching Request' field 415. Whether the 'Tx (or Rx) Antenna Switching Request' field 420 conveys information as described herein with reference to the 'Tx Antenna Switching Request' field 410 or the 'Rx Antenna Switching Request' field 415 may depend on the Element ID field 425. That is, the Element ID field 425 may be set to a value indicating the element is an Antenna Switching Request element 401 that includes either the 'Tx Antenna Switching Request' field 420 or the 'Rx Antenna Switching Request' field 420. For example, the Element ID field 425 may be set to a value (such as an 8-bit identifier) unique to a receive Antenna Switching Request element 401 (such as an Antenna Switching Request element 401 including the 'Tx Antenna Switching Request' field 420) or unique to a transmit Antenna Switching Request element 401 (such as an Antenna Switching Request element 401 including the 'Rx Antenna Switching Request' field 420).

Figure 5:
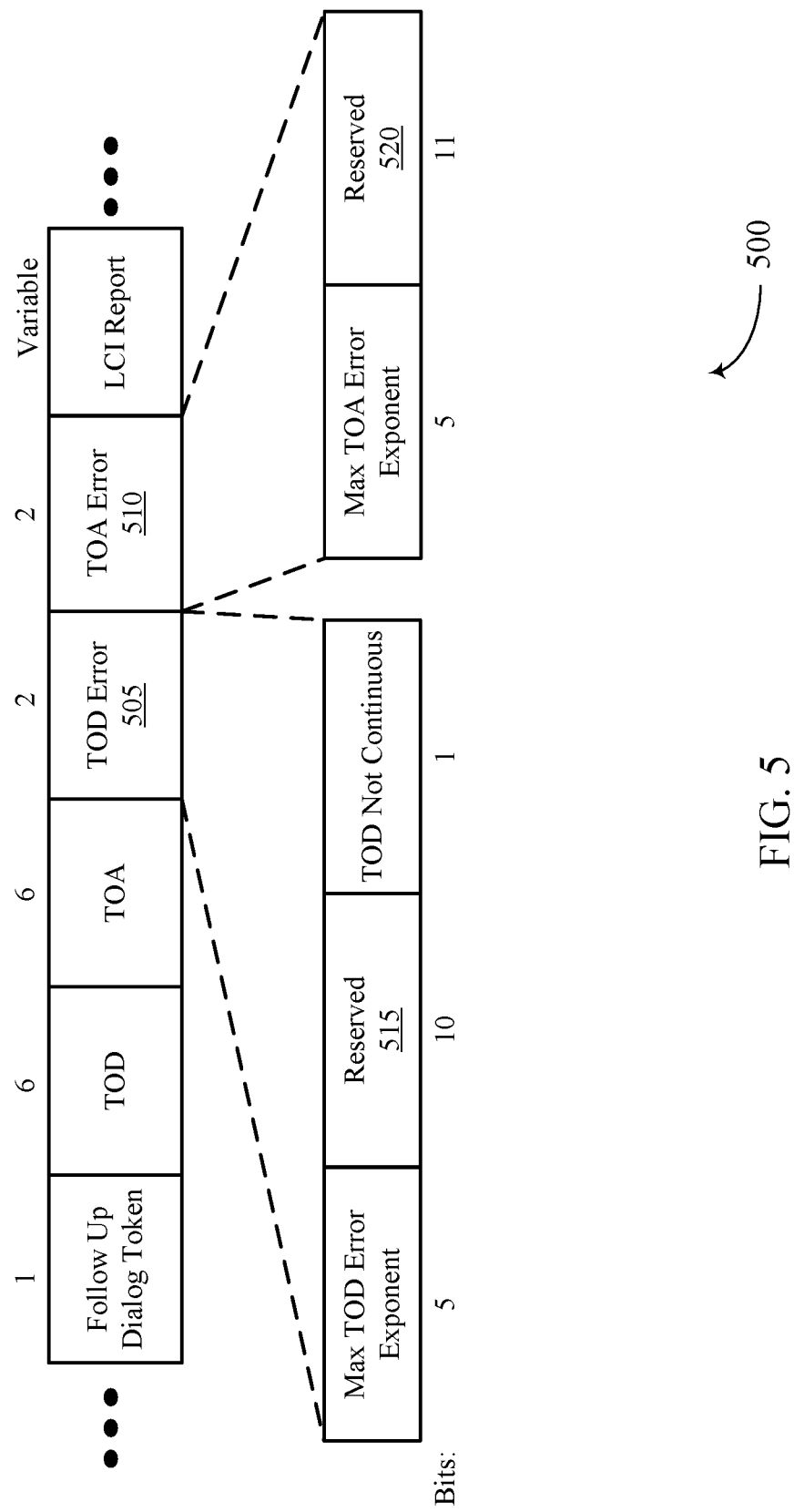
FIG. 5 is a block diagram of an example fine timing measurement (FTM) frame that supports ranging protocol improvements for antenna switching.

FIG. 5 is a block diagram of an example FTM frame 500 that supports ranging protocol improvements for antenna switching. The FTM frame 500 may include a TOD Error field 505 and a TOA Error field 510, both, for example, may be two octets in length. The TOD Error field 505 may include a Max TOD Error Exponent subfield, a Reserved subfield 515, and a TOD Not Continuous subfield. The Max TOD Error Exponent subfield may have 5 bits, Reserved subfield 515 may have 10 bits, and TOD Not Continuous subfield may have 1 bit. TOA Error field 510 may include a Max TOA Error Exponent subfield and a Reserved subfield 520. The Max TOA Error Exponent subfield may have 5 bits and the Reserved subfield 520 may have 11 bits. As described herein, a responding device may transmit FTM frames 500 to convey Tx/Rx antenna indices associated with Tx/Rx antenna switching, performed during a ranging procedure, to an initiating device.

The Reserved subfield 515 may include, for example, 8 bits within the TOD Error field 505 to report a Tx antenna index, used by the responding device, to transmit a previous ranging message (such as the ranging message sent just prior to the current one) or a current ranging message (such as the current FTM frame 500). In some implementations, multiple FTM frames 500 (such as ranging messages or ranging frames) may be transmitted using a single antenna. In some implementations, each bit may be used to represent a single antenna. For instance, '00000001' may indicate that antenna #0 was used to transmit a current or previous ranging message. Alternatively, '00000010', may indicate that antenna #1 was used to transmit a current or previous ranging message. In implementations using 80+80, in which primary 80 and secondary 80 are transmitted using two different Tx antennas, bits 0-3 may be used to report the primary 80 Tx antenna index and bits 4-7 may be used to report the secondary 80 Tx antenna index. That is, a decimal value represented by bits 0-3 may be used to report the primary 80 Tx antenna index and a decimal value represent by bits 4-7 may be used to report the secondary 80 Tx antenna index. In some other implementations, one bit may be set aside to indicate if a Tx antenna index is associated with a previous ranging message or a current ranging message. For example, a 0 may indicate that a Tx antenna index is associated with a previous message and a 1 may indicate a Tx antenna index is associated with a current message. One or more ranging messages or, Additionally, or alternatively, an Antenna Switching Capabilities element may include such an indication. In some other implementations, the Tx antenna index may be mapped to a binary number. For example, '000' may represent antenna #0, '001' may represent antenna #1, and '010' may represent antenna #2 and so on. Using 3 bits may support up to 8 antennas, using 4 bits may support up to 16 antennas, and so on. In implementations using 80+80, X bits may be associated with primary 80 and Y bits may be associated with secondary 80, where X may equal Y.

The Reserved subfield 520 may include, for example, 8 bits within the TOA Error field 510 to report a Rx antenna index, used by the responding device, to receive a previous ranging response message (such as a ranging response message received just prior to the current ranging message) or to receive a future ranging response message (such as an anticipated ranging response message to be received in response to the current ranging message). A responding device may use multiple Rx antennas to receive an ACK and capture the time associated with receiving the ACK or ranging request, $t_4$. Multiple antennas may be used to receive an ACK or ranging request. Each bit of the Reserved subfield 520 dedicated to reporting a Rx antenna index may represent a single antenna and any Rx antenna index may be considered a valid combination. For example, '00001111' may indicate that antennas #0-#3 were used to receive a previously received ranging response or will be used to receive a future ranging response, and capture $t_4$. As another example, '10100000' may indicate that antennas #5 or #7 were used to receive a previously received ranging response or will be used to receive a future ranging response, and capture $t_4$. The reported antenna index may indicate the Rx antenna(s) used to capture $t_4$. For example, if antennas #0-#7 were all used to receive the previous ranging response message, but antenna #0 was used or processed to capture $t_4$, then '00000001' may be reported instead of '11111111'. In implementations using 80+80, where primary 80 and secondary 80 are received using two different sets of Rx antennas, bits 0-3 may report the primary 80 Rx antenna index used to capture $t_4$ and bits 4-7 may report the secondary 80 Rx antenna index used to capture $t_4$. In implementations where secondary 80 Rx antenna is not used to capture $t_4$, '0000' may be reported as the secondary 80 Rx antenna index. In implementations where the primary 80 Rx antenna is not used to capture $t_4$, '0000' may be reported as the primary 80 Rx antenna index. The Rx antenna index reported may reflect which Rx antenna is used to capture $t_4$. The Rx antenna index may be reported in the current ranging message or in the next ranging message. An ACK also may be called an ACK frame.

Figure 6:
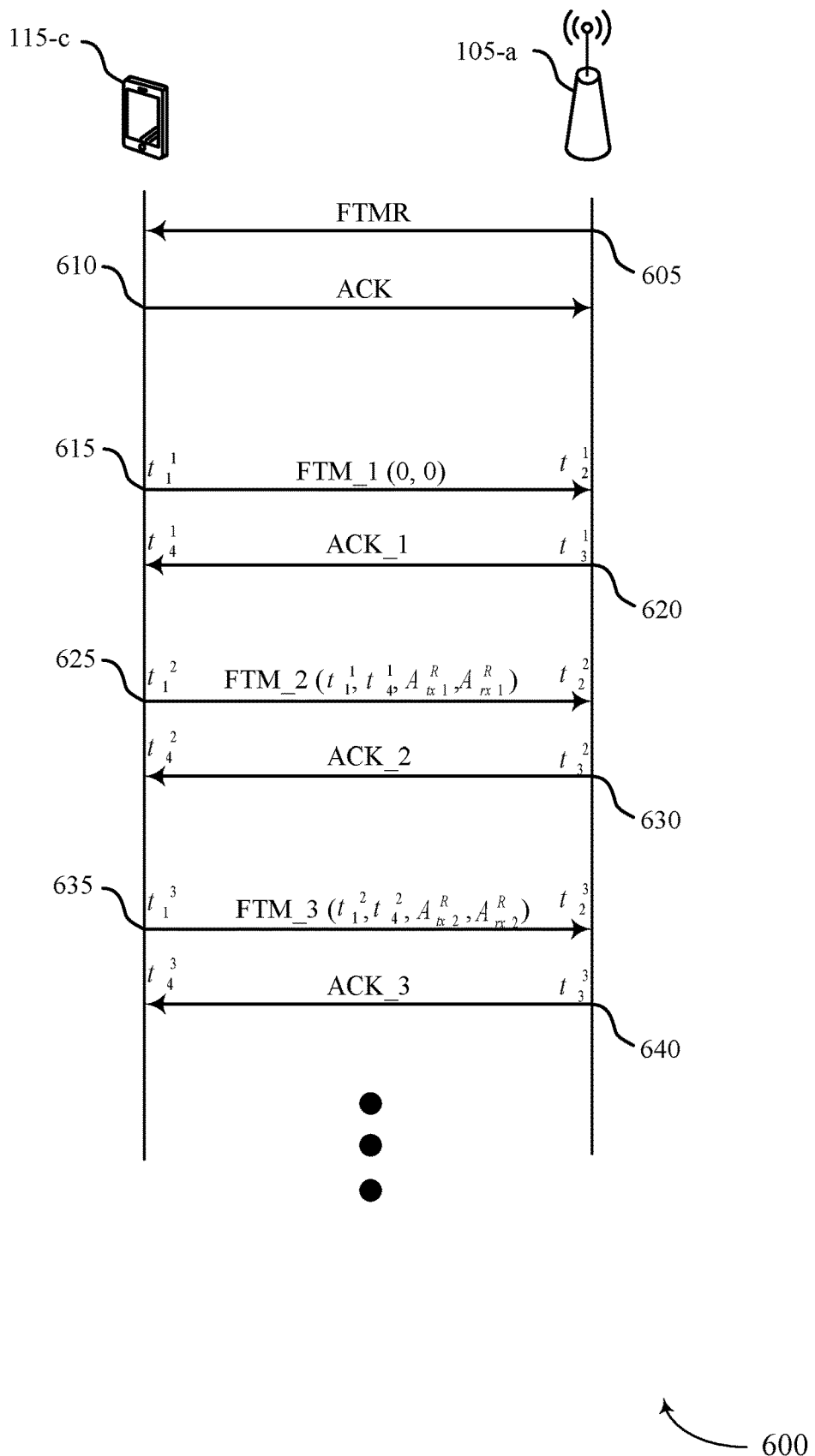
FIGS. 6-8 are diagrams of example FTM signaling that supports ranging protocol improvements for antenna switching.

FIG. 6 is a diagram of an example FTM signaling 600 that supports ranging protocol improvements for antenna switching. For example, FTM signaling 600 may illustrate an example of ranging signaling between wireless communication devices that support ranging over multiple antennas in accordance with various aspects of the present disclosure. In this example, an AP 105-*a* is the initiator and communicates with a STA 115-*c*, the responder. Additionally, both the AP 105-*a* and the STA 115-*c* may be multi-antenna devices. Although described in this example as occurring between an AP 105 and a STA 115, techniques described herein may be performed between two APs 105, between two STAs 115, etc. In the following description, the notation $A_{tx1}^R$, for example, may refer to an antenna index used by a responder (R) used to transmit (tx) a first FTM frame (FTM_1). As another example, the notation $A_{rx2}^I$, may refer to an antenna index used by an initiator (1) used to receive (rx) a second ACK (2) associated with a second received FTM frame (FTM_2). Further, the notation $t_z^x$ may refer to the $z^{th}$ time stamp (such as $t_1$, $t_2$, $t_3$, $t_4$) associated with the $x^{th}$ RTT. For example, $t_4^2$ may refer to the time a responding device (such as STA 115-c) receives a second ranging response (such as an ACK) associated with a second RTT or a second ranging message (such as an FTM_2). The AP 105-a may wish to engage in ranging or timing measurement procedures with STA 115-c.

At 605, the AP 105-a may transmit an FTMR to the STA 115-c. In some implementations, the AP 105-a may append or otherwise include an Antenna Switching Capabilities element to the FTMR to indicate if the AP 105-a supports either or both of Tx and Rx antenna switching or to indicate that AP 105-a supports reporting the per-packet antenna index for either or both of its Tx and Rx antennas to the STA 115-c. Additionally, or alternatively, the AP 105-a may append or otherwise include an Antenna Switching Request element to the FTMR to request the STA 115-c to switch either or both Tx and Rx antennas of the STA 115-c or to request the STA 115-c to report per-packet antenna indices for either or both of its Tx and Rx antennas back to the AP 105-a.

At 610, the STA 115-c may transmit an acknowledgement to the AP 105-a in response to the received FTMR. The AP 105-a may receive the FTMR acknowledgement from the STA 115-c and prepare (such as by preparing receiver circuitry) to receive a number of FTM frames.

At 615, the STA 115-c may transmit a first FTM frame (FTM_1) at a time ti, using a first Tx antenna $A_{tx1}^R$. The STA 115-c may identify or generate a timestamp ti associated with the time the first FTM frame was transmitted by the STA 115-c. In some implementations, the STA 115-c may append or otherwise include an Antenna Switching Capabilities element to FTM_1 to indicate if the STA 115-c supports either or both of Tx and Rx antenna switching or to indicate if the STA 115-c supports reporting the per-packet antenna index for either or both of its Tx and Rx antennas to the AP 105-a. Additionally, or alternatively, the STA 115-c may append or otherwise include an Antenna Switching Request element to FTM_1 to request the AP 105-a to switch either or both of Tx and Rx antennas or to request the AP 105-a to report per-packet Tx/Rx antennas indices back to the STA 115-c. After transmitting the first FTM frame, the STA 115-c may switch from first Tx antenna to second Tx antenna (such as from $A_{tx1}^R$ to $A_{tx2}^R$) for transmitting the next FTM frame.

The AP 105-a may receive the first FTM frame at a second time $t_2^1$ using a first Rx antenna $A_{rx1}^I$. For example, the AP 105-a may identify or generate a timestamp $t_2^1$ associated with a time the AP 105-a received the first FTM frame. After receiving the first FTM frame, the AP 105-a may switch from first Rx antenna to second Rx antenna (such as from $A_{rx1}^I$ to $A_{rx2}^I$) for receiving the next FTM frame.

At 620, AP 105-a may transmit an ACK_1 in response to receiving the first FTM frame (at 615) at ti using Tx antenna $A_{tx1}^I$. In some implementations, $A_{tx1}^I$ may be the same antenna as $A_{rx1}^I$, or they may be different antennas. After transmitting the ACK_1 in response to the first FTM frame received at 615, the AP 105-a may switch from first Tx antenna to second Tx antenna (such as from $A_{tx1}^I$ to $A_{tx2}^I$). The STA 115-c may receive the ACK_1 at 0 using Rx antenna $A_{rx1}^R$. $A_{rx1}^R$ may be the same antenna as $A_{tx1}^R$ or they may be different antennas. The STA 115-c may switch from first Rx antenna $A_{rx1}^R$ to second Rx antenna $A_{rx2}^R$ for receiving the next ACK.

At 625, the STA 115-c may transmit a second FTM frame (FTM_2) after receiving the ACK at 620. STA 115-c may transmit the second FTM frame at a time $t_1^2$ using second Tx antenna $A_{tx2}^R$. The second FTM frame may include information related to FTM_1 transmitting time $t_1^1$, ACK_1 receiving time $t_4^1$, FTM_1 Tx antenna $A_{tx1}^R$, and ACK_1 Rx antenna $A_{rx1}^R$. That is, FTM_2 may include timestamps $t_1^1$ and $t_4^1$, as well as antenna indices $A_{tx1}^R$ and $A_{rx1}^R$. The antenna indices information may be included through the methods disclosed with reference FIG. 5 or through other methods. In general, an FTM frame may include information associated with the previous FTM frame transmitting time, the previous ACK receiving time, the previous FTM frame Tx antenna, and the previous ACK Rx antenna. After transmitting the second FTM frame at 625, the STA 115-c may switch from a second Tx antenna to a third Tx antenna (such as from $A_{tx2}^R$ to $A_{tx3}^R$) for transmitting the next FTM frame. The AP 105-a may receive the second FTM frame at time $t_2^2$ using second Rx antenna $A_{rx2}^I$. After receiving the second FTM frame, the AP 105-a may switch from the second Rx antenna to a third Rx antenna (such as from $A_{rx2}^I$ to $A_{rx3}^I$) for receiving the next FTM frame.

At 630, the AP 105-a may transmit an ACK_2 in response to the received second FTM frame at time $t_3^2$ using a second Tx antenna $A_{tx2}^I$. $A_{rx2}^I$ may be the same antenna as $A_{tx2}^I$, or they may be different antennas. After transmitting the ACK_2 in response to the second FTM frame 625, the AP 105-a may switch from the second Tx antenna to a third Tx antenna (such as $A_{tx2}^I$ to $A_{tx3}^I$). The STA 115-c may receive the ACK_2 at a time $t_4^2$ using Rx antenna $A_{rx2}^R$. $A_{rx2}^R$ may be the same antenna as $A_{tx2}^R$ or they may be different antennas. The STA 115-c may switch from the second Rx antenna to a third Rx antenna (such as $A_{rx2}^R$ to $A_{rx3}^R$) for receiving the next ACK.

At 635, the STA 115-c may transmit a third FTM frame (FTM_3) after receiving the ACK_2 at 630. The STA 115-c may transmit the third FTM frame at a time $t_1^3$ using a third Tx antenna $A_{tx3}^R$. The third FTM frame may include information related to FTM_2 transmitting time $t_1^2$, ACK_2 receiving time $t_4^1$ FTM_2 Tx antenna $A_{tx2}^R$, and ACK_2 Rx antenna $A_{rx2}^R$. That is, FTM_3 may include timestamps $t_1^2$ and $t_4^2$, as well as antenna indices $A_{tx2}^R$ and $A_{rx2}^R$. The antenna indices information may be included through the methods disclosed with reference FIG. 5 or through other methods. After transmitting the third FTM frame at 635, the STA 115-c may switch from the third Tx antenna to a fourth Tx antenna (such as from $A_{tx3}^R$ to $A_{tx4}^R$) for transmitting the next FTM frame. The AP 105-a may receive the third FTM frame at time $t_2^3$ using a third Rx antenna $A_{rx3}^I$. After receiving the third FTM frame, the AP 105-a may switch from the third Rx antenna to a fourth Rx antenna (such as from $A_{rx3}^I$ to $A_{rx4}^I$) for receiving the next FTM frame.

At 640, the AP 105-a may transmit an ACK_3 in response to the received second FTM frame at time $t_3^3$ using the third Tx antenna $A_{tx3}^I$. $A_{rx3}^I$ may be the same antenna as $A_{tx3}^I$, or they may be different antennas. This process may continue until all FTM frames have been sent.

Figure 7:
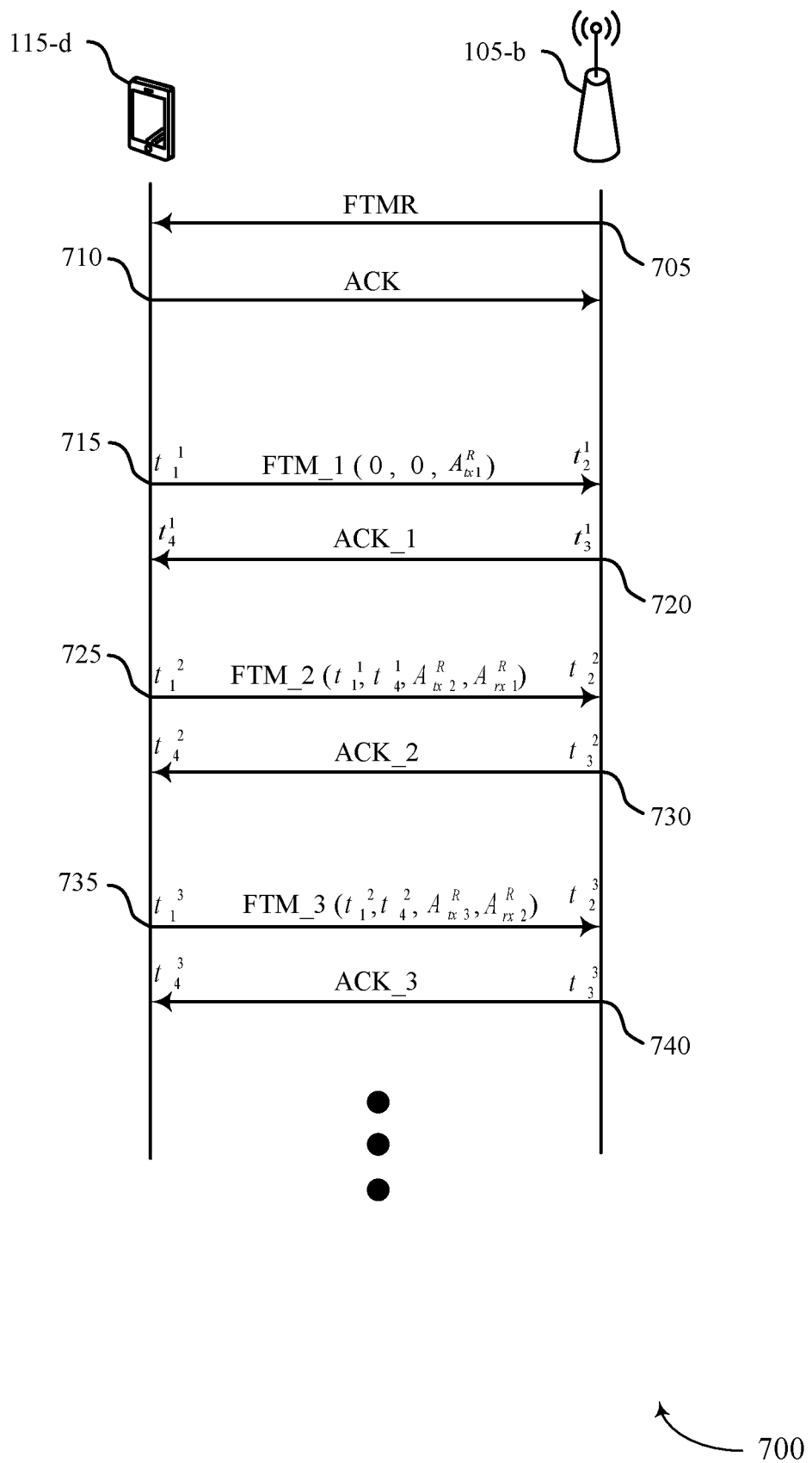

FIG. 7 is a diagram of an example FTM signaling 700 that supports ranging protocol improvements for antenna switching. For example, the FTM signaling 700 may illustrate an example of ranging signaling between wireless communication devices that support ranging over multiple antennas in accordance with various aspects of the present disclosure. In this example, an AP 105-*b* is the initiator and communicates with a STA 115-*d*, the responder. Additionally, both the AP 105-*b* and the STA 115-*d* may be multi-antenna devices. Although described here in the context of the AP 105 and the STA 115, techniques described herein may be performed between two APs 105, between two STAs 115, etc. In the following description, the notation $A_{tx1}^R$, for example, may refer to an antenna index used by a responder (R) used to transmit (tx) a first FTM frame (FTM_1). As another example, the notation $A_{rx2}^I$, may refer to an antenna index used by an initiator (I) used to receive (rx) a second ACK (2) associated with a second received FTM frame (FTM_2). Further, the notation $t_z^x$ may refer to the $z^{th}$ time stamp (such as $t_1$, $t_2$, $t_3$, $t_4$) associated with the $x^{th}$ RTT. For example, $t_4^2$ may refer to the time a responding device (such as the STA 115-*d*) receives a second ranging response (such as an ACK) associated with a second RTT or a second ranging message (such as an FTM_2). The AP 105-*b* may wish to engage in ranging or timing measurement procedures with the STA 115-*d*.

At 705, the AP 105-*b* may transmit an FTMR to STA 115-*d*. In some implementations, the AP 105-*b* may append or otherwise include an Antenna Switching Capabilities element to the FTMR to indicate if the AP 105-*b* supports either or both of Tx and Rx antenna switching or to indicate that the AP 105-*b* supports reporting the per-packet antenna index for either or both of its Tx and Rx antennas to the STA 115-*d*. Additionally, or alternatively, the AP 105-*b* may append or otherwise include an Antenna Switching Request element to the FTMR to request the STA 115-*d* to switch either or both of the Tx and Rx antennas of the STA 115-*d* or to request the STA 115-*d* to report per-packet antenna indices for either or both of its Tx and Rx antennas back to AP 105-*b*.

At 710, the STA 115-*d* may transmit an acknowledgement to the AP 105-*b* in response to the received FTMR. The AP 105-*b* may receive the FTMR acknowledgement from the STA 115-*d* and may prepare (such as prepare receiver circuitry) to receive a number of FTM frames.

At 715, the STA 115-*d* may transmit a first FTM frame (FTM_1) at a time $t_1^1$, using a first Tx antenna $A_{tx1}^R$. The STA 115-*d* may identify or generate a timestamp ti associated with the time the first FTM frame was transmitted by the STA 115-*d*. FTM_1 may include information related to FTM_1 Tx antenna $A_{tx1}^R$, such as through the method disclosed with reference to FIG. 5 or through other methods. In some implementations, the STA 115-*d* may append or otherwise include an Antenna Switching Capabilities element to FTM_1 to indicate if the STA 115-*d* supports either or both of Tx and Rx antenna switching or to indicate if the STA 115-*d* supports reporting the per-packet antenna index for either or both of its Tx and Rx antennas to the AP 105-*b*. Additionally, or alternatively, the STA 115-*d* may append or otherwise include an Antenna Switching Request element to FTM_1 to request the AP 105-*b* to switch either or both of Tx and Rx antennas or to request the AP 105-*b* to report per-packet Tx/Rx antennas indices back to the STA 115-*d*. After transmitting the first FTM frame, the STA 115-*d* may switch from first Tx antenna to second Tx antenna (such as from $A_{tx1}^R$ to $A_{tx2}^R$) for transmitting the next FTM frame.

The AP 105-*b* may receive the first FTM frame at a second time $t_2^1$ using a first Rx antenna $A_{rx1}^I$. For example, the AP 105-*b* may identify or generate a timestamp $t_2^1$ associated with a time the AP 105-*b* received the first FTM frame. After receiving the first FTM frame, the AP 105-*b* may switch from first Rx antenna to second Rx antenna (such as from $A_{rx1}^I$ to $A_{rx2}^I$) for receiving the next FTM frame.

At 720, the AP 105-*b* may transmit an ACK_1 in response to receiving the first FTM frame (at 715) at $t_3^1$ using Tx antenna $A_{tx1}^I$. In some implementations, $A_{tx1}^I$ may be the same antenna as $A_{rx1}^I$, or they may be different antennas. After transmitting the ACK_1 in response to the first FTM frame received at 715, the AP 105-*b* may switch from first Tx antenna to second Tx antenna (such as from $A_{tx1}^I$ to $A_{tx2}^I$). The STA 115-*d* may receive the ACK_1 at ti using Rx antenna $A_{rx1}^R$. $A_{rx1}^R$ may be the same antenna as $A_{tx1}^R$ or they may be different antennas. The STA 115-*d* may switch from first Rx antenna $A_{rx1}^R$ to second Rx antenna $A_{rx2}^R$ for receiving the next ACK.

At 725, the STA 115-*d* may transmit a second FTM frame (FTM_2) after receiving the ACK at 720. STA 115-*d* may transmit the second FTM frame at a time $t_1^2$ using second Tx antenna $A_{tx2}^R$. The second FTM frame may include information related to FTM_1 transmitting time $t_1^1$, ACK_1 receiving time $t_4^1$, FTM_2 Tx antenna $A_{tx2}^R$, and ACK_1 Rx antenna $A_{rx1}^R$. That is, FTM_2 may include timestamps $t_1^1$ and $t_4^1$, as well as antenna indices $A_{tx2}^R$ and $A_{rx1}^R$. The antenna indices information may be included through the methods disclosed with reference FIG. 5 or through other methods. In general, an FTM frame may include information associated with the previous FTM frame transmitting time, the previous ACK receiving time, the current FTM frame Tx antenna, and the previous ACK Rx antenna. After transmitting the second FTM frame at 725, the STA 115-*d* may switch from a second Tx antenna to a third Tx antenna (such as from $A_{tx2}^R$ to $A_{tx3}^R$) for transmitting the next FTM frame. The AP 105-*b* may receive the second FTM frame at time $t_2^2$ using a second Rx antenna $A_{rx2}^I$. After receiving the second FTM frame, AP 105-*b* may switch from the second Rx antenna to a third Rx antenna (such as from $A_{rx2}^I$ to $A_{rx3}^I$) for receiving the next FTM frame.

At 730, AP 105-*b* may transmit an ACK_2 in response to the received second FTM frame at time $t_3^2$ using a second Tx antenna $A_{tx2}^I$. $A_{tx2}^I$ may be the same antenna as $A_{rx2}^I$, or they may be different antennas. After transmitting the ACK_2 in response to the second FTM frame 725, AP 105-*b* may switch from the second Tx antenna to a third Tx antenna (such as $A_{tx2}^I$ to $A_{tx3}^I$). STA 115-*d* may receive the ACK_2 at a time $t_4^2$ using Rx antenna $A_{rx2}^R$. $A_{rx2}^R$ may be the same antenna as $A_{tx2}^R$ or they may be different antennas. STA 115-*d* may switch from the second Rx antenna to a third Rx antenna (such as $A_{rx2}^R$ to $A_{rx3}^R$) for receiving the next ACK.

At 735, the STA 115-*d* may transmit a third FTM frame (FTM_3) after receiving the ACK_2 at 730. The STA 115-*d* may transmit the third FTM frame at a time $t_1^3$ using a third Tx antenna $A_{tx3}^R$. The third FTM frame may include information related to FTM_2 transmitting time $t_1^2$, ACK_2 receiving time $t_4^2$ FTM_3 Tx antenna $A_{tx3}^R$, and ACK_2 Rx antenna $A_{rx2}^R$. That is, FTM_3 may include timestamps $t_1^2$ and $t_4^2$, as well as antenna indices $A_{tx3}^R$ and $A_{rx2}^R$. The antenna indices information may be included through the methods disclosed with reference to FIG. 5 or through other methods. After transmitting the third FTM frame at 735, the STA 115-*d* may switch from the third Tx antenna to a fourth Tx antenna (such as from $A_{tx3}^R$ to $A_{tx4}^R$) for transmitting the next FTM frame. The AP 105-*b* may receive the third FTM frame at time $t_2^3$ using a third Rx antenna $A_{rx3}^I$. After receiving the third FTM frame, the AP 105-*b* may switch from the third Rx antenna to a fourth Rx antenna (such as from $A_{rx3}^I$ to $A_{rx4}^I$) for receiving the next FTM frame.

At 740, the AP 105-*b* may transmit an ACK_3 in response to the received second FTM frame at time $t_3^3$ using the third Tx antenna $A_{tx3}^I$. $A_{rx3}^I$ may be the same antenna as $A_{tx3}^I$, or they may be different antennas. This process may continue until all FTM frames have been sent.

Figure 8:
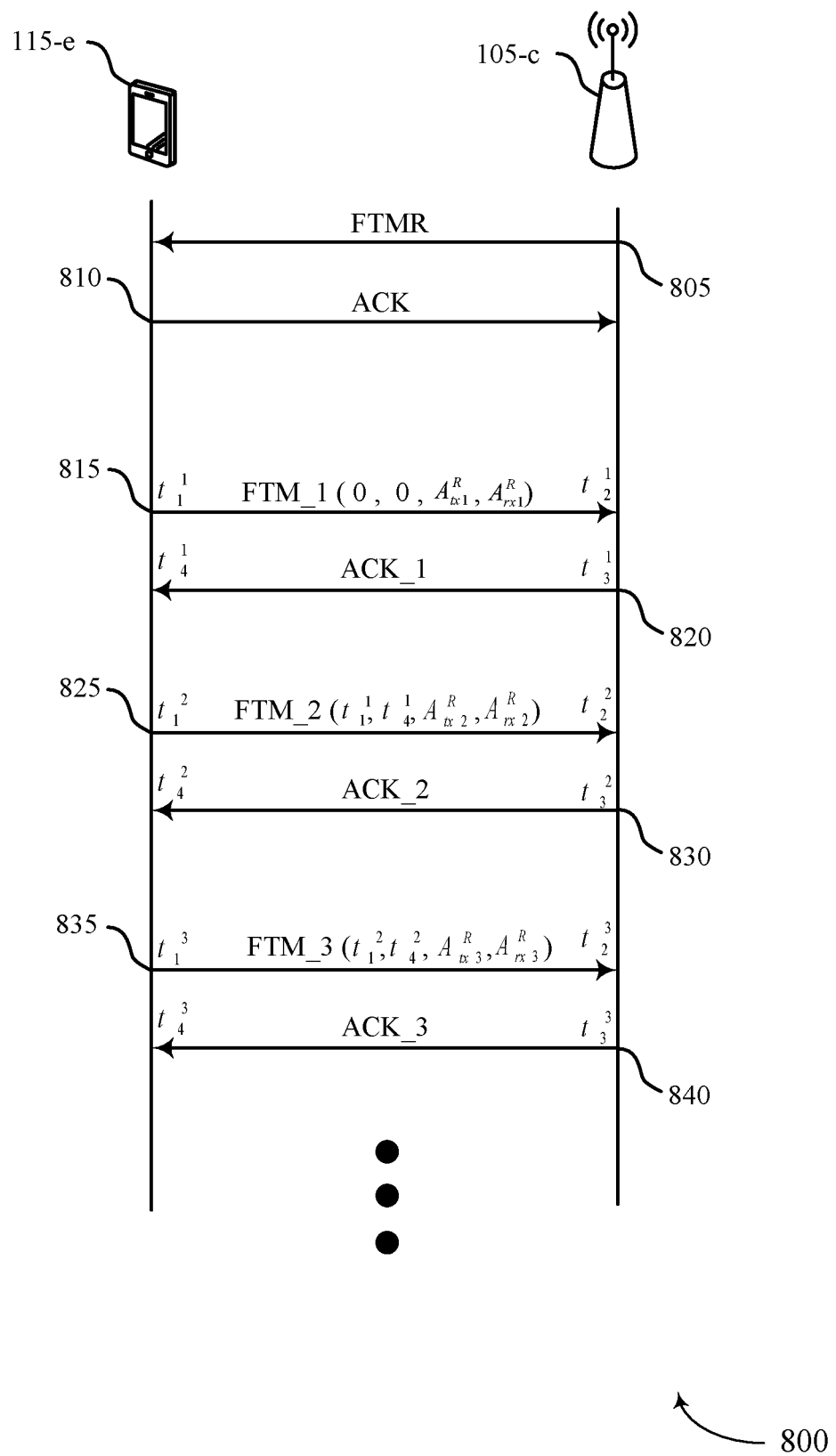

FIG. 8 is a diagram of an example FTM signaling 800 that supports ranging protocol improvements for antenna switching. For example, FTM signaling 800 may illustrate an example of ranging signaling between wireless communication devices that support ranging over multiple antennas in accordance with aspects of the present disclosure. In this example, an AP 105-c is the initiator and communicates with a STA 115-e, the responder. Additionally, both the AP 105-c and the STA 115-e may be multi-antenna devices. Although described in the context of the AP 105-c and the STA 115-e, techniques described herein may be performed between two APs 105, between two STAs 115, etc. In the following description, the notation $A_{tx1}^R$, for example, may refer to an antenna index used by a responder (R) used to transmit (tx) a first FTM frame (FTM_1). As another example, the notation $A_{rx2}^I$, may refer to an antenna index used by an initiator (1) used to receive (rx) a second ACK (2) associated with a second received FTM frame (FTM_2). Further, the notation $t_z^x$ may refer to the $z^{th}$ time stamp (such as $t_1, t_2, t_3, t_4$) associated with the $x^{th}$ RTT. For example, $t_4^2$ may refer to the time a responding device (such as the STA 115-e) receives a second ranging response (such as an ACK) associated with a second RTT or a second ranging message (such as an FTM_2). The AP 105-c may wish to engage in ranging or timing measurement procedures with the STA 115-e.

At 805, the AP 105-c may transmit an FTMR to STA 115-e. In some implementations, the AP 105-c may append or otherwise include an Antenna Switching Capabilities element to the FTMR to indicate if the AP 105-c supports either or both of Tx and Rx antenna switching or to indicate that the AP 105-c supports reporting the per-packet antenna index for either or both of its Tx and Rx antennas to STA 115-e. Additionally, or alternatively, the AP 105-c may append or otherwise include an Antenna Switching Request element to the FTMR to request the STA 115-e to switch either or both of the STA 115-e's Tx and Rx antennas or to request the STA 115-e to report per-packet antenna indices for either or both of its Tx and Rx antennas back to the AP 105-c.

At 810, the STA 115-e may transmit an acknowledgement to the AP 105-c in response to the received FTMR. The AP 105-c may receive the FTMR acknowledgement from the STA 115-e and may prepare (such as prepare receiver circuitry) to receive a number of FTM frames.

At 815, the STA 115-e may transmit a first FTM frame (FTM_1) at a time $t_1^1$, using a first Tx antenna $A_{tx1}^R$. The STA 115-e may identify or generate a timestamp $t_1^1$ associated with the time the first FTM frame was transmitted by the STA 115-e. FTM_1 may include information related to FTM_1 Tx antenna $A_{tx1}^R$ and ACK_1 Rx antenna $A_{rx1}^R$, such as through the method disclosed with reference to FIG. 5 or through other methods. In some implementations, the STA 115-e may append or otherwise include an Antenna Switching Capabilities element to FTM_1 to indicate if the STA 115-e supports either or both of Tx and Rx antenna switching or to indicate if the STA 115-e supports reporting the per-packet antenna index for either or both of its Tx and Rx antennas to the AP 105-c. Additionally, or alternatively, the STA 115-e may append or otherwise include an Antenna Switching Request element to FTM_1 to request the AP 105-c to switch either or both of Tx and Rx antennas or to request the AP 105-c to report per-packet Tx/Rx antennas indices back to the STA 115-e. After transmitting the first FTM frame, the STA 115-e may switch from the first Tx antenna to the second Tx antenna (such as from $A_{tx1}^R$ to $A_{tx2}^R$) for transmitting the next FTM frame.

The AP 105-c may receive the first FTM frame at a second time $t_2^1$ using a first Rx antenna $A_{rx1}^I$. For example, the AP 105-c may identify or generate a timestamp $t_2^1$ associated with a time the AP 105-c received the first FTM frame. After receiving the first FTM frame, the AP 105-c may switch from first Rx antenna to second Rx antenna (such as from $A_{rx1}^I$ to $A_{rx2}^I$) for receiving the next FTM frame.

At 820, the AP 105-c may transmit an ACK_1 in response to receiving the first FTM frame (at 815) at $t_3^1$ using Tx antenna $A_{tx1}^I$. In some implementations, $A_{tx1}^I$ may be the same antenna as $A_{rx1}^I$, or they may be different antennas. After transmitting the ACK_1 in response to the first FTM frame received at 815, the AP 105-c may switch from first Tx antenna to second Tx antenna (such as from $A_{tx1}^I$ to $A_{tx2}^I$). STA 115-e may receive the ACK_1 at $t_4^1$ using Rx antenna $A_{rx1}^R$. $A_{rx1}^R$ may be the same antenna as $A_{tx1}^R$ or they may be different antennas. The STA 115-e may switch from first Rx antenna $A_{rx1}^R$ to second Rx antenna $A_{rx2}^R$ for receiving the next ACK.

At 825, the STA 115-e may transmit a second FTM frame (FTM_2) after receiving the ACK at 820. The STA 115-e may transmit the second FTM frame at a time $t_1^2$ using second Tx antenna $A_{tx2}^R$. The second FTM frame may include information related to FTM_1 transmitting time ti, ACK_1 receiving time $t_4^1$, FTM_2 Tx antenna $A_{tx2}^R$, and ACK_2 Rx antenna $A_{rx2}^R$. That is, FTM_2 may include timestamps $t_1^1$ and $t_4^1$, as well as antenna indices $A_{tx2}^R$ and $A_{rx2}^R$. The antenna indices information may be included through the methods disclosed with reference FIG. 5 or through other methods. In general, an FTM frame may include information associated with the previous FTM frame transmitting time, the previous ACK receiving time, the current FTM frame Tx antenna, and the current or next ACK Rx antenna. After transmitting the second FTM frame at 825, the STA 115-e may switch from a second Tx antenna to a third Tx antenna (such as from $A_{tx2}^R$ to $A_{tx3}^R$) for transmitting the next FTM frame. The AP 105-c may receive the second FTM frame at time $t_2^2$ using second Rx antenna $A_{rx2}^I$. After receiving the second FTM frame, the AP 105-c may switch from the second Rx antenna to a third Rx antenna (such as from $A_{rx2}^I$ to $A_{rx3}^I$) for receiving the next FTM frame.

At 830, the AP 105-c may transmit an ACK_2 in response to the received second FTM frame at time $t_3^2$ using a second Tx antenna $A_{tx2}^I$. $A_{rx2}^I$ may be the same antenna as $A_{tx2}^I$, or they may be different antennas. After transmitting the ACK_2 in response to the second FTM frame 825, the AP 105-c may switch from the second Tx antenna to a third Tx antenna (such as $A_{tx2}^I$ to $A_{tx3}^I$). STA 115-e may receive the ACK_2 at a time $t_4^2$ using Rx antenna $A_{rx2}^R$. $A_{rx2}^R$ may be the same antenna as $A_{tx2}^R$ or they may be different antennas. The STA 115-e may switch from the second Rx antenna to a third Rx antenna (such as $A_{rx2}^R$ to $A_{rx3}^R$) for receiving the next ACK.

At 835, the STA 115-e may transmit a third FTM frame (FTM_3) after receiving the ACK_2 at 830. The STA 115-e may transmit the third FTM frame at a time $t_1^3$ using a third Tx antenna $A_{tx3}^R$. The third FTM frame may include information related to FTM_2 transmitting time $t_1^2$, ACK_2 receiving time $t_4^2$, FTM_3 Tx antenna $A_{tx3}^R$, and ACK_2 Rx antenna $A_{rx3}^R$. That is, FTM_3 may include timestamps $t_1^2$ and $t_4^2$, as well as antenna indices $A_{tx3}^R$ and $A_{rx3}^R$. The antenna indices information may be included through the methods disclosed with reference FIG. 5 or through other methods. After transmitting the third FTM frame at 835, STA 115-*e* may switch from the third Tx antenna to a fourth Tx antenna (such as from $A_{tx3}{}^R$ to $A_{tx4}{}^R$) for transmitting the next FTM frame. The AP 105-*c* may receive the third FTM frame at time $t_2{}^3$ using a third Rx antenna $A_{rx3}{}^I$. After receiving the third FTM frame, the AP 105-*c* may switch from the third Rx antenna to a fourth Rx antenna (such as from $A_{rx3}{}^I$ to $A_{rx4}{}^I$) for receiving the next FTM frame.

At 840, the AP 105-*c* may transmit an ACK_3 in response to the received second FTM frame at time $t_3{}^3$ using the third Tx antenna $A_{tx3}{}^I$. $A_{tx3}{}^I$ may be the same antenna as $A_{tx3}{}^I$, or they may be different antennas. This process may continue until all FTM frames have been sent.

Figure 9:
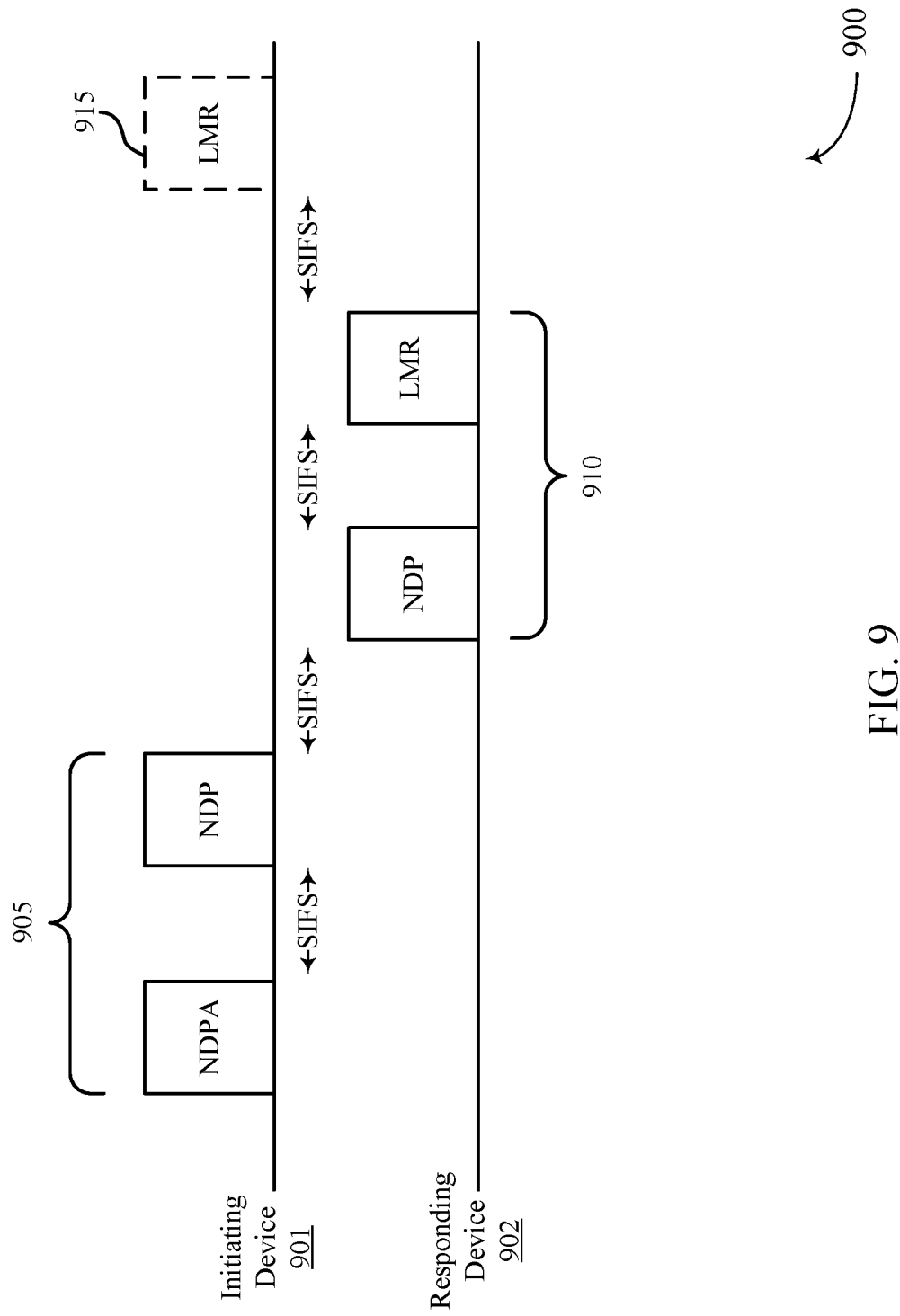
FIGS. 9 and 10 are diagrams of example null data packet (NDP) ranging procedures that support ranging protocol improvements for antenna switching.

FIG. 9 is a diagram of an example NDP ranging procedure 900 that supports ranging protocol improvements for antenna switching. Ranging process may include a ranging request 905 and a ranging message 910. Ranging request 905 may include either or both of an NDPA and an NDP. Ranging message 910 may include either or both of an NDP and a location measurement report (LMR).

An initiating device 901, such as a first STA 115 or AP 105, may transmit a ranging request 905 to initiate a ranging procedure. In some implementations, the ranging request 905 may include antenna switching capabilities of the initiating device 901 (such as a number of Tx antennas, Rx antennas, or both). Additionally, or alternatively, the ranging request 905 may include an antenna switching request, such as a request for antenna switching by a responding device 902 (such as a second STA 115 or AP 105, during the ranging procedure.

The initiating device 901 may receive ranging messages 910 from the responding device 902, in response to the ranging request. Ranging signaling such NDPAs, NDPs, LMRs, etc., may be transmitted and received by the initiating device and the responding device using different transmit antennas, receive antennas, or both. In some implementations, antenna switching may be employed by both or either of the initiating device 901 and the responding device 902, during the NDP ranging procedure 900. For example, the responding device 902 may transmit ranging messages 910 using different transmit antennas, which may each be received by the initiating device 901 using different receive antennas. Further, the initiating device 901 may transmit ranging responses or additional ranging requests 905, in response to received ranging messages, using different transmit antennas, which may each be received by the responding device 902 using different receive antennas.

In some implementations, the antenna switching may be preconfigured via network settings, established via RRC signaling prior to the ranging procedure, etc. In other implementations, ranging messages 910 transmitted by the responding device 902 may include antenna switching information such as transmit antenna indices used for transmission of different ranging messages, receive antenna indices used for reception of different ranging response messages received from the initiating device 901, or both. The initiating device 901 may therefore estimate a range between the initiating device 901 and the responding wireless communication device based on timing information associated with the ranging messages and RTTs (such as RTTs of an initiator transmitting a ranging request 905 to receiving a ranging message 910) associated with different antenna pairs used during the ranging procedure. For example, the initiating device may estimate a range based on the ranging messages 910 and a determination that at least two of the received ranging messages 910 are associated with different transmit antennas of the responding device 902.

The ranging request 905 may include either an NDPA alone or an NDPA and an NDP. The NDPA or NDP may include an Antenna Switching Capabilities element or an Antenna Switching Request element as described with reference to FIGS. 3A, 3B, 4A and 4B. For example, an Antenna Switching Capabilities element or an Antenna Switching Request element may be appended to the NDPA or NDP.

Ranging message 910 may include an LMR alone or an LMR and an NDP. The NDP or LMR may include an Antenna Switching Capabilities element or Antenna Switching Request element as described with reference to FIGS. 3A, 3B, 4A and 4B. For example, an Antenna Switching Capabilities element or an Antenna Switching Request element may be appended to the NDPA or NDP. Additionally, the LMR may contain a report of antenna indices as described with reference to FIG. 5 or through other means.

The initiating device 901 may transmit the ranging request 905. After transmitting the ranging request 905, the initiating device 901 may switch (from the Tx antenna used to transmit the ranging request 905) to another Tx antenna of the initiator. Alternatively, the initiating device 901 may switch the Tx antenna or a subset of the total number of Tx antennas of the initiating device 901 used to transmit ranging request 905 with a subset of the total number of Tx antennas. The responding device 902 may receive the ranging request 905. After receiving the ranging request 905, the responding device 902 may switch (from the Rx antenna used to receive the ranging request 905) to another Rx antenna of the responding device 902. Alternatively, the responding device 902 may switch the Rx antenna or a subset of the total number of Rx antennas of the responding device 902 used to receive ranging request 905 with a subset of the total number of Rx antennas of the responding device 902.

The responding device 902 may send ranging message 910. The antenna or antennas used to receive ranging request 905 may be the same as or different than the antenna or antennas used to transmit ranging message 910. After transmitting the ranging message 910, the responding device 902 may switch (from the Tx antenna used to transmit the ranging message 910) to another Tx antenna of the responder. Alternatively, the responding device 902 may switch the Tx antenna or a subset of the total number of Tx antennas of the responding device 902 used to transmit ranging message 910 with a subset of the total number of Tx antennas of the responding device 902. The initiating device 901 may receive the ranging message 910. The antenna or antennas used to receive the ranging message 910 may be the same as or different than the antenna or antennas used to transmit the ranging request 905. After receiving the ranging message 910, the initiating device 901 may switch (from the Rx antenna used to receive ranging message 910) to another Rx antenna of the initiating device 901. Alternatively, the initiator may switch the Rx antenna or a subset of the total number of Rx antennas of the initiating device 901 used to receive the ranging message 910 with a subset of the total number of Rx antennas of the initiating device 901. The responding device 902 may receive the ranging request 905.

In some implementations, the initiating device 901 may transmit an LMR 915 to responding device 902. LMRs or LMR frames (such as an LMR frame in the ranging message 910, the LMR 915, or both) may include measurement information (such as timestamps associated with transmission and reception times associated with ranging signaling), antenna switching information (such as Tx/Rx antenna indices associated with ranging signaling), or both. LMR frames may be transmitted from the responding device 902 to the initiating device 901 (such as in the ranging message 910) such that the initiating device 901 may perform range estimation determinations as described herein. Additionally, or alternatively, LMR frames may be transmitted from the initiating device 901 to the responding device 902 (such as the LMR 915) such that the responding device 902 may perform range estimation determinations as described herein.

Figure 10:
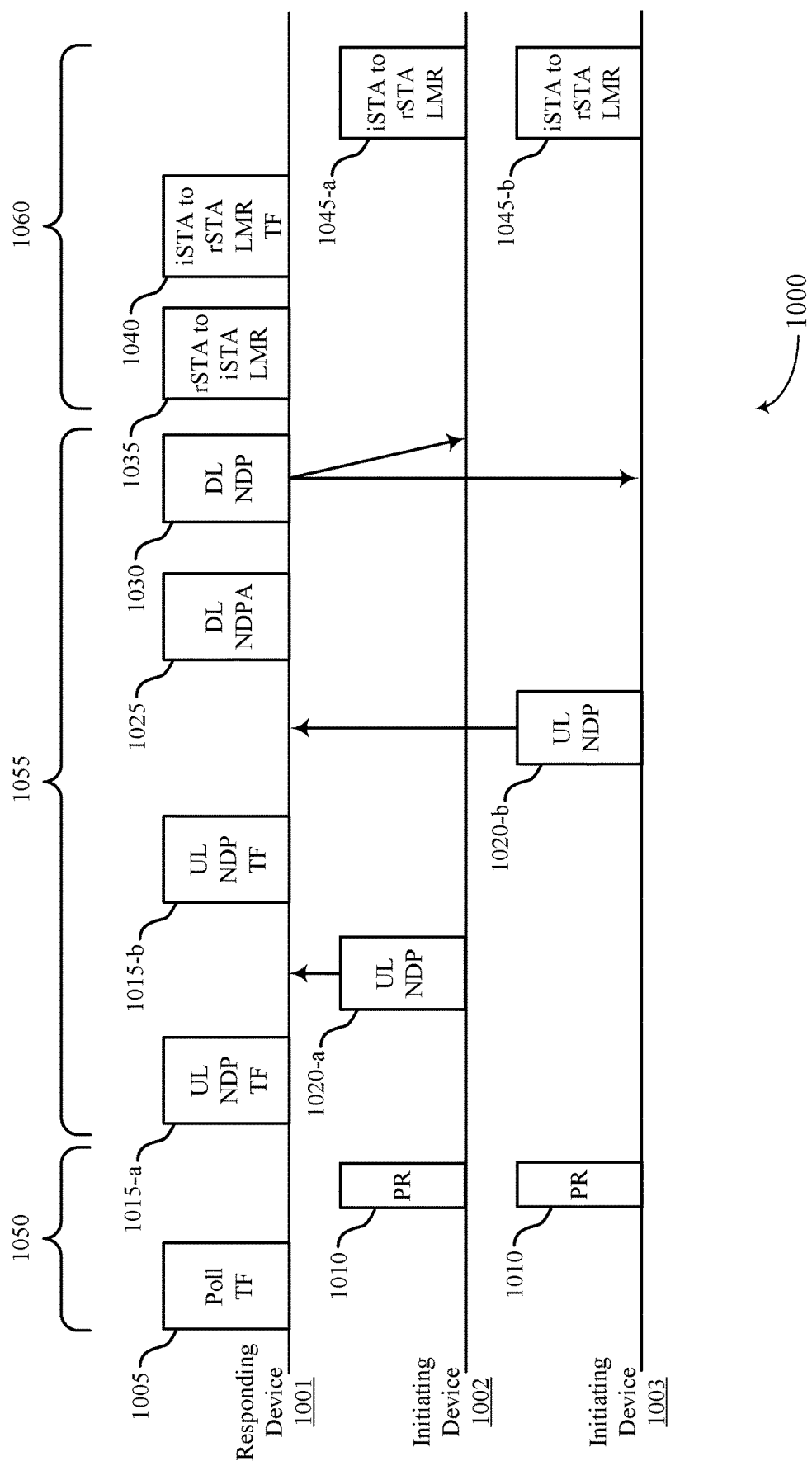

FIG. 10 is a diagram of an example NDP ranging procedure 1000 that supports ranging protocol improvements for antenna switching. For example, NDP ranging procedure 1000 may illustrate a range measurement procedure between a responding device 1001 (such as a polling AP or a responding STA (rSTA)), and two initiating devices 1002 and 1003 (such as initiating STAs (iSTAs)) responding to the poll. The NDP ranging procedure 1000 may include a polling phase 1050, followed by a range measurement sounding phase 1055, followed by a location reporting phase 1060. In some implementations, NDP ranging procedure 1000 may represent aspects of a dynamic trigger based sequence of an FTM procedure. NDP ranging procedure 1000 may appear in scheduled availability time windows assigned to initiating devices 1002 and 1003 during a prior negotiation phase (such as during location negotiation and ranging ID assignment).

Ranging signaling, such as trigger frames and NDPs, may be transmitted and received by the initiating device and the responding device(s) using different transmit antennas, receive antennas, or both. In some implementations, the poll trigger frames (TFs) 1005 or the uplink (UL) NDP TFs 1015 may include, or be appended to include, an antenna switching request, such as a request for antenna switching by the initiating devices 1002 and 1003 during the ranging procedure. In some other implementations, the initiating devices 1002 and 1003 may perform antenna switching during the ranging procedure without receiving an antenna switching request. Antenna switching may be employed by both or either of the responding device 1001 and the initiating devices 1002 and 1003 during the NDP ranging procedure 1000. For example, the responding device 1001 may transmit the UL NDP TFs 1015 using different transmit antennas, which may each be received by the initiating devices 1002 and 1003 using different receive antennas. Further, the initiating devices 1002 and 1003 may transmit the UL NDPs 1020, in response to received trigger frames, using different transmit antennas, which may each be received by the responding device 1001 using different receive antennas.

In some implementations, the antenna switching may be preconfigured via network settings, established via RRC signaling prior to the ranging procedure, etc. For example, the network may preconfigure the NDP ranging procedure 1000 such that each NDP is to be associated with certain transmit antennas or transmit antenna indices of the initiating devices. In some other implementations, antenna switching information associated with a sounding procedure may be included in the LMR frames 1035 as discussed herein. In some implementations, NDP sounding may include one or more rounds of uplink sounding, where each round of uplink sounding may include one trigger frame soliciting one or more NDPs from initiator(s). As described with regard to FTM frames, antenna switching may be performed with each round of uplink sounding.

Within each availability window, the responding device 1001 and the initiating devices 1002 and 1003 may perform ranging activities related to ranging polling, measurement and measurement results reporting, and group related scheduling indications. Each availability window may include a single transmission opportunity (TxOP), however an availability window may be extended to multiple TxOPs by announcement if a single TxOP is insufficient to accommodate all iSTAs (such as the initiating devices 1002 and 1003) responding to the polling phase 1050.

During the polling phase 1050, the responding device 1001 may transmit a poll TF 1005. In response to the poll TF 1005, the initiating devices 1002 and 1003 may transmit ranging poll response (PR) messages 1010. In some implementations, the initiating devices 1002 and 1003 may transmit ranging PR messages 1010 to request measurement instances in the iSTA's designated time and frequency allocation as identified in the TF location polling (such as the designated time and frequency allocation as identified short interframe space (SIFS) time after the TF location polling frame; poll TF 1005). In implementations where the bandwidth does not allow for the polling of all iSTAs served by the availability window, the rSTA (such as the responding device 1001) may schedule an additional poll opportunity within the availability window and may indicate such in the poll TF 1005 and the associated subsequent measurement and polling parts.

The range measurement sounding phase 1055 may commence, for example, SIFS time after the polling phase 1050. The range measurement sounding phase 1055 may include sounding trigger frames (such as the UL NDP TFs 1015), that may allocate uplink resources to one or more iSTAs. Each of the UL NDP TF 1015 (such as sounding trigger frames, TF location sounding frames, etc.) may be followed by one or more UL NDPs 1020, and the one or more UL NDP 1020 may be multiplexed in the frequency domain, the spatial stream domain, or both. For example, the responding device 1001 may transmit the UL NDP TF 1015-*a* to allocate uplink resources to the initiating device 1002 (such as a time, frequency, and spatial stream for the UL NDP 1020-*a*). The responding device 1001 may further transmit the UL NDP TF 1015-*b* to allocate uplink resources to the initiating device 1003 (such as a time, frequency, and spatial stream for the UL NDP 1020-*b*). In some implementations, the UL NDPs 1020 may be spatially multiplexed (such as the UL NDP 1020-*a* and the UL NDP 1020-*b* may be spatially multiplexed in frequency domain, spatial stream domain, or both). After the uplink sounding (such as a SIFS time after the last UL NDP 1020), the initiating device 1003 may transmit an NDPA frame (such as a downlink (DL) NDPA frame 1025) followed by a DL NDP sounding frame 1030. In some implementations, the DL NDP 1030 may be used by all iSTAs taking part in the exchange (such as by the initiating devices 1002 and 1003 taking part in the ranging procedure).

Throughout the range measurement sounding phase 1055, STAs may perform time of flight (ToF) measurements. For example, the responding device 1001 and the initiating devices 1002 and 1003 and may capture timestamps of sounding frames exchanged during the range measurement sounding phase 1055. The initiating devices 1002 and 1003 may capture the time at which their respective UL NDPs 1020 are transmitted ($t_1$), the responding device 1001 may capture the time at which the UL NDPs 1020 arrive or are received ($t_2$), the responding device 1001 may capture the time at which the DL NDP(s) 1030 are transmitted ($t_3$), and the initiating devices 1002 and 1003 may capture the time at which the DL NDP(s) 1030 are received ($t_4$). The timestamp values associated with $t_2$ and $t_3$ may be associated with measurements performed according to the responding device 1001 clock (such as the timing information from the responding device 1001 perspective without applying any frequency offset correction to the time basis).

The location reporting phase 1060 may follow the range measurement sounding phase 1055 (such as, for example, a SIFS time after the DL NDP 1030). According to the techniques described herein, the measurement results (such as $t_1$, $t_2$, $t_3$, and $t_4$, as discussed herein) and antenna switching information may be carried in an LMR frame 1035. For example, the LMR frame 1035 may carry fields or information similar to the FTM frame 500 as described herein with reference to FIG. 5. That is, the LMR frame 1035 may carry information such as measurement results $t_1$, $t_2$, $t_3$, and $t_4$, as well as antenna switching information used by the responding device 1001 (such as carrying measurement results information in a TOA field, a TOD field, or both, and carrying antenna switching information in a TOD error field, a TOA error field, or both). Information such as measurement results, antenna switching information, or both, conveyed in a range measurement sounding phase 1055 may be either from a current availability window or a previous availability window. That is, in some implementations, measurement results and antenna switching information associated with a sounding frame exchange may be associated with a previous sounding message exchange. In some implementations, the trigger frame or NDPA of the preceding location sounding phase may indicate if associated measurement results are included in the same availability window or the successive availability window that may include medium allocation for sounding to the iSTAs. If the iSTA to rSTA LMR 1045 is negotiated, the rSTA (such as the responding device 1001) may assign uplink resources using a location sub-type LMR trigger frame (such as the iSTA to rSTA LMR TF 1040). Antenna switching information conveyed by the responding device 1001 via the LMR frames 1035 may include transmit antenna information (such as transmit antenna indices) associated with the transmitted UL NDP TFs 1015, receive antenna information (such as receive antenna indices) associated with the received UL NDPs 1020, transmit antenna information associated with the transmitted DL NDPs 1030, etc. As described in more detail herein, the initiating devices 1002 and 1003 may use antenna switching information (such as Tx/Rx antenna indices) included in the sounding messages (such as in a TOA error field, a TOD error field, or both) to determine antenna-pair specific RTTs. RTT may be determined by the equation $RTT=[(t_4-t_1)-(t_3'-t_2')]$, where $t_3'$ and $t_2'$ are the times at which the DL NDP 1030 was transmitted by the responding device 1001 and the time at which the UL NDP was received by the responding device 1001, respectively, as determined by the initiating devices 1002 and 1003. RTTs may be grouped or categorized according to the antenna pair(s) used during the sounding procedure, for increased spatial diversity and improved direct path (and RTT) estimation as described in more detail herein.

Figure 11:
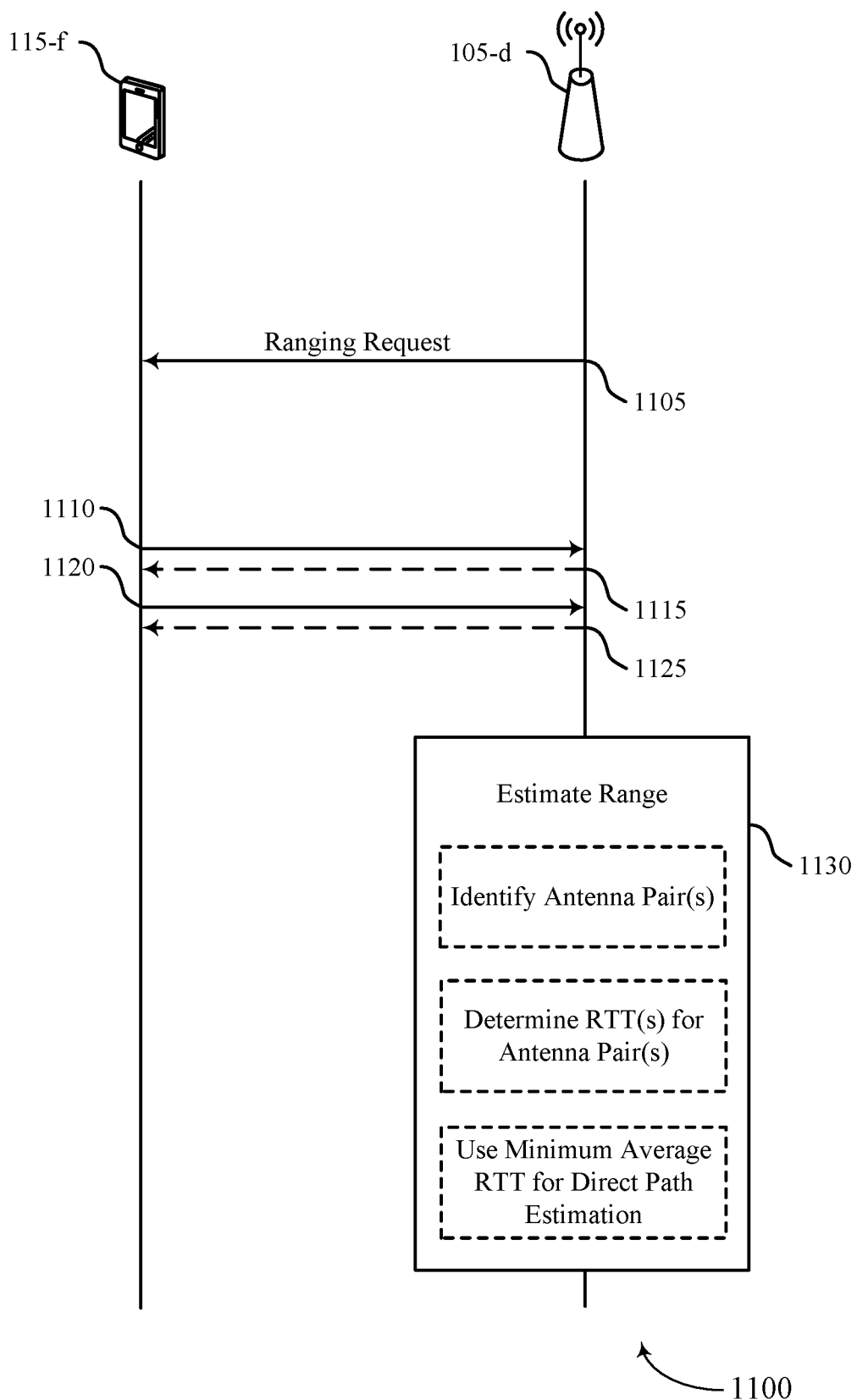
FIG. 11 is a diagram of an example ranging protocol for antenna switching.

FIG. 11 is a diagram of an example ranging protocol 1100 for antenna switching. Ranging protocol 1100 shows a ranging procedure between an initiating device, which in this example is an AP 105-*d*, and a responding device, which in this example is a STA 115-*f*.

At 1105, the AP 105-*d* may transmit a ranging request to the STA 115-*f*. In some implementations, the ranging request may include a request for the STA 115-*f* to perform Tx antenna switching. The ranging request may further include a request for the STA 115-*f* to provide a Tx antenna index for each ranging message the STA 115-*f* may send. The ranging request may Additionally, or alternatively include a request for the STA 115-*f* to provide a Rx antenna index for each transmission in relation to ranging response messages that the STA 115-*f* may receive. The ranging request may be an FTM request message. Alternatively, the ranging request may be a NDPA or a downlink trigger frame.

At 1110 and 1120, the STA 115-*f* may transmit ranging messages to the AP 105-*d*. The ranging messages may include an indication of Tx or Rx antenna switching capabilities. The ranging messages may Additionally, or alternatively include a request for Tx or Rx antenna switching by AP 105-*d*. Furthermore, the AP 105-*d* may receive a Tx antenna index for each ranging message indicating a Tx antenna of the STA 115-*f* used to transmit that ranging message or a previous ranging message. The multiple ranging messages may be multiple FTM frames. Alternatively, the multiple ranging messages may be NDP messages. NDP messages also may be called NDP frames.

At 1115 and 1125, the AP 105-*d* may transmit ranging response messages to the STA 115-*f* (for example, a ranging response at 1115 may be transmitted in response to a ranging message received at 1110 and a ranging response at 1125 may be transmitted in response to a ranging message received at 1120). The ranging response messages may be ACKs or acknowledgment frames. Alternatively, the ranging response messages may be NDP messages, DL NDPA frames, or DL NDP messages. NDP messages also may be called NDP frames and DL NDP messages also may be called downlink NDP frames. Alternatively, the ranging response messages may include downlink trigger frames. The AP 105-*d* may receive an antenna index for each ranging response message indicating a Rx antenna of the STA 115-*f* used to receive a previous or will use to receive a future ranging response message and to capture $t_4$.

At block 1130, the AP 105-*d* may estimate a range between itself and the STA 115-*f*. This estimation may be based on the multiple ranging messages the AP 105-*d* receives and a determination that at least two such received ranging messages are associated with different Tx antennas. Furthermore, the determination that two received ranging messages are associated with different Tx antennas may be based on the indication of either or both of Tx and Rx antenna switching capabilities in ranging message 1110. A set of range values for each Tx or Rx antenna pair used during the ranging procedure may be determined. The range value of the set of range values may be determined based on receiving a ranging message and transmitting a ranging response message using a Tx and Rx antenna pair associated with set. An average range value for each set of determined range values may be calculated. The average range value may be an example of a weighted average. Next, a minimum range value of all computed average values may be identified and used to estimate the range between the AP 105-*d* and the STA 115-*f*.

Figure 12:
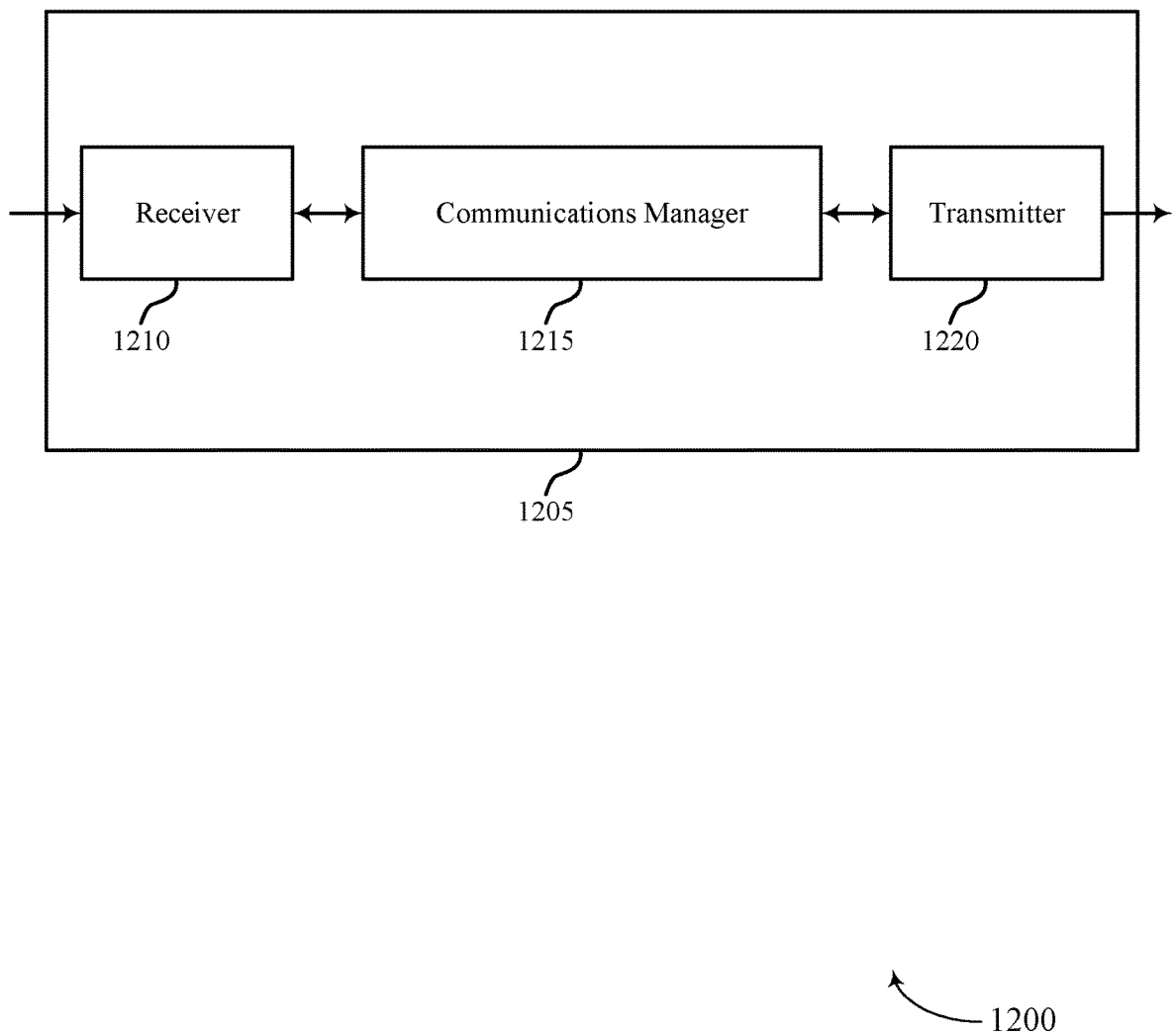
FIGS. 12-15 show block diagrams of example devices that support ranging protocol improvements for antenna switching.

FIG. 12 shows a block diagram of an example device that supports ranging protocol improvements for antenna switching. The wireless communication device 1205 may be an example of aspects of a STA 115, AP 105, initiating device 901, responding device 902, responding device 1001, initiating device 1002, or initiating device 1003 as described herein. The wireless communication device 1205 may include a receiver 1210, a communications manager 1215, and a transmitter 1220. The wireless communication device 1205 also may include a processor. Each of these components may be in communication with one another such as via one or more buses.

The receiver 1210 may receive information such as packets, user data, or control information associated with various information channels such as control channels, data channels, and information related to ranging protocol improvements for antenna switching, etc. Information may be passed on to other components of the device. The receiver 1210 may be an example of aspects of the transceiver 1520 described with reference to FIG. 15. The receiver 1210 may utilize a single antenna or a set of antennas.

If the wireless communication device 1205 is acting as an initiating device, the communications manager 1215 may transmit a ranging request for a ranging procedure to a responding device. The communications manager 1215 may receive or process a set of ranging messages from the responding device based on the transmitted ranging request. The communications manager 1215 may transmit a set of ranging response messages to the second wireless communication device, where each ranging response message in the set of ranging response messages corresponds to a separate ranging message in the received set of ranging messages and at least two ranging response messages of the set of ranging response messages are transmitted using different transmit antennas. The communications manager 1215 may estimate a range between the initiating device and the responding device based on the set of ranging messages and the at least two ranging response messages transmitted using different transmit antennas of the initiating device.

If the wireless communication device 1205 is acting as a responding device, the communications manager 1215 may receive or process a ranging request for a ranging procedure from an initiating device. The communications manager 1215 may transmit a set of ranging messages to the initiating device based on the received ranging request, such that at least two of the set of ranging messages are transmitted using different transmit antennas of the responding device. The communications manager 1215 may be an example of aspects of the communications manager 1515 described with reference to FIG. 15.

The transmitter 1220 may transmit signals generated by other components of the device. In some implementations, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

A processing system of the wireless communication device 1205 may perform various functions such as functions or tasks supporting ranging protocol improvements for antenna switching. A processing system may generally refer to a system or series of machines or components that receives inputs and processes the inputs to produce a set of outputs (which may be passed to other systems or components of, for example, the wireless communication device 1205). For example, a processing system of the wireless communication device 1205 may refer to a system including the communications manager 1215 and, in some cases, various other components or subcomponents of the wireless communication device 1205. The processing system may receive, process, and output information (such as information related to ranging protocol improvements for antenna switching).

The processing system of the wireless communication device 1205 may interface with other components of the wireless communication device 1205, and may process information received from other components (such as inputs or signals), output information to other components, etc. For example, a chip or modem of the wireless communication device 1205 may include a processing system, a first interface to output information, and a second interface to receive information. In some cases, the first interface may refer to an interface between the processing system of the chip or modem and the transmitter 1220, such that the wireless communication device 1205 may transmit information output from the chip or modem. In some cases, the second interface may refer to an interface between the processing system of the chip or modem and the receiver 1210, such that the wireless communication device 1205 may receive information or signal inputs, and the information may be passed to the processing system.

Figure 13:
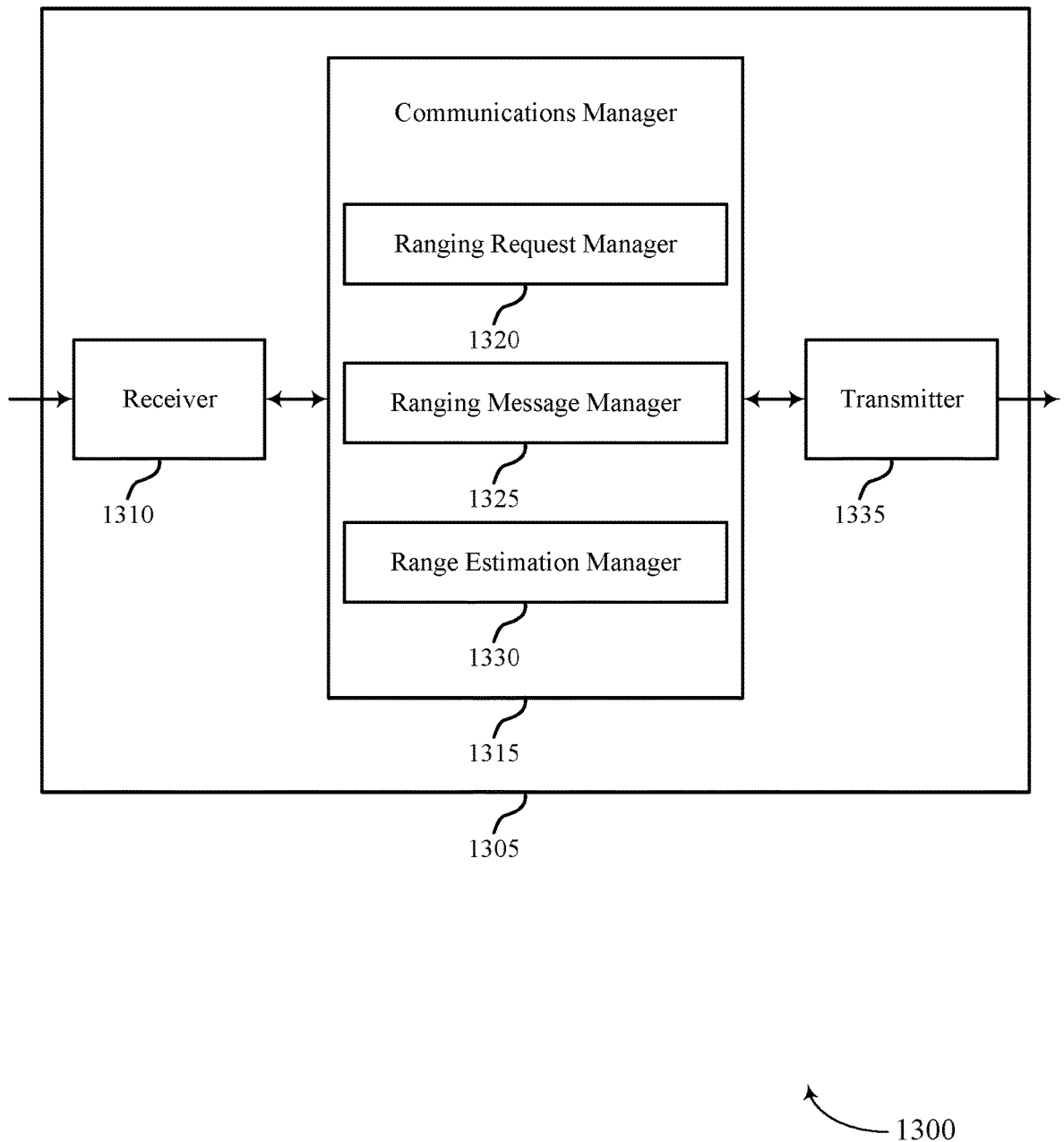

FIG. 13 shows a block diagram of an example device that supports ranging protocol improvements for antenna switching. The wireless communication device 1305 may be an example of aspects of a STA 115, AP 105, initiating device 901, responding device 902, responding device 1001, initiating device 1002, initiating device 1003, or wireless communication device 1205 described herein. The wireless communication device 1305 may include a receiver 1310, a communications manager 1315, and a transmitter 1335. The wireless communication device 1305 also may include a processor. Each of these components may be in communication with one another such as via one or more buses.

The receiver 1310 may receive information such as packets, user data, or control information associated with various information channels such as control channels, data channels, and information related to ranging protocol improvements for antenna switching, etc. Information may be passed on to other components of the device. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described with reference to FIG. 12. The communications manager 1315 may include a ranging request manager 1320, a ranging message manager 1325, and a range estimation manager 1330. The communications manager 1315 may be an example of aspects of the communications manager 1515 described with reference to FIG. 15.

If the wireless communication device 1305 is acting as an initiating device, the ranging request manager 1320 may transmit a ranging request for a ranging procedure to a responding device. The ranging message manager 1325 may receive or process a set of ranging messages based on the transmitted ranging request. The ranging message manager 1325 may transmit a set of ranging response messages to the second wireless communication device, where each ranging response message in the set of ranging response messages corresponds to a separate ranging message in the received set of ranging messages and at least two ranging response messages of the set of ranging response messages are transmitted using different transmit antennas. The range estimation manager 1330 may estimate a range between the initiating device and the responding device based on the set of ranging messages and the at least two ranging response messages transmitted using different transmit antennas of the initiating device.

If the wireless communication device 1305 is acting as a responding device, the ranging request manager 1320 may receive a ranging request for a ranging procedure from the initiating device. The ranging message manager 1325 may transmit a set of ranging messages to the initiating device based on the received ranging request, where at least two of the set of ranging messages are transmitted using different transmit antennas of the responding device.

The transmitter 1335 may transmit signals generated by other components of the device. In some implementations, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
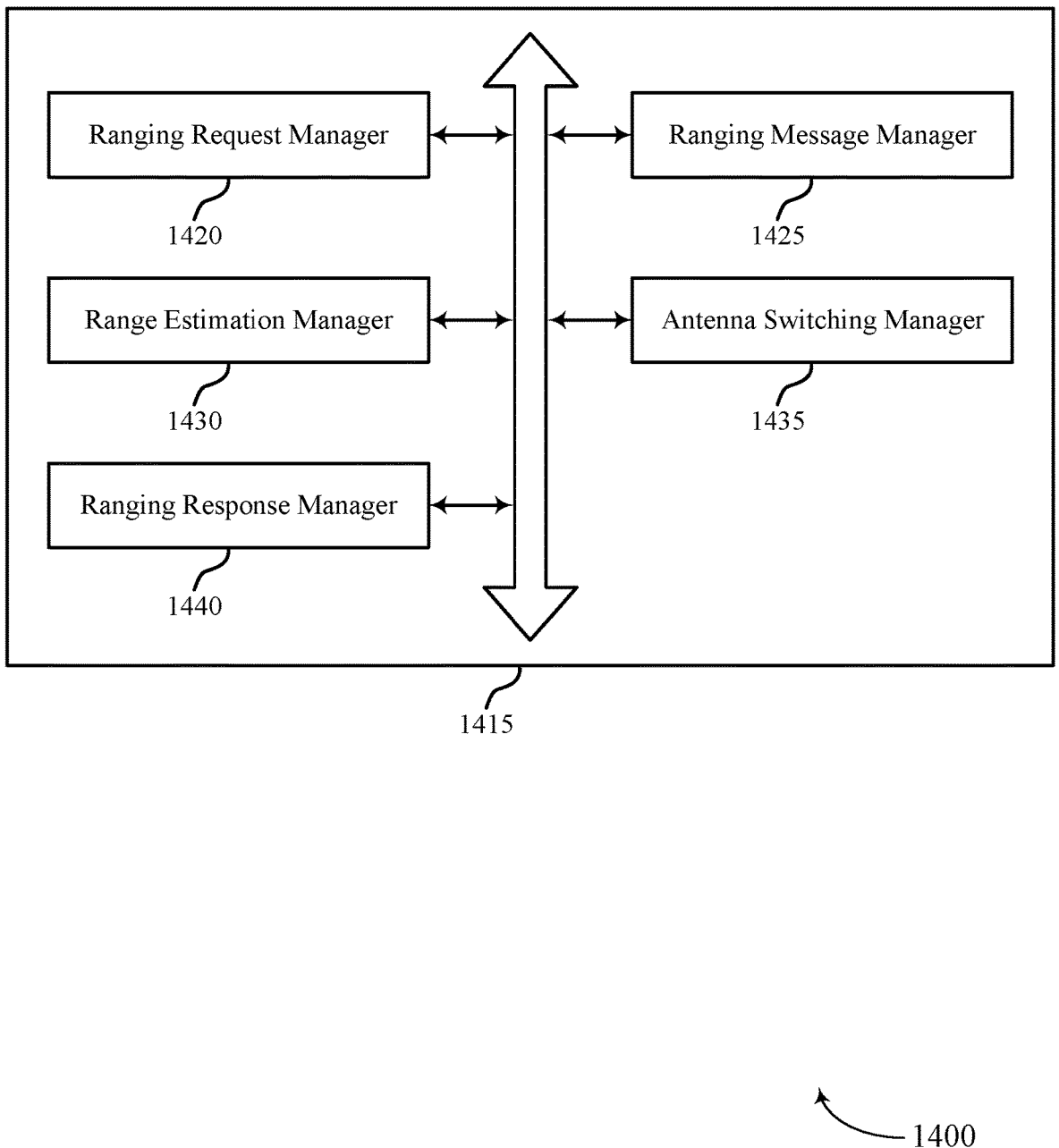

FIG. 14 shows a block diagram of an example device that supports ranging protocol improvements for antenna switching. The communications manager 1405 may be an example of aspects of the communications manager 1215, the communications manager 1315, or the communications manager 1515 described with reference to FIGS. 12, 13, and 15, respectively. The communications manager 1405 may include a ranging request manager 1420, a ranging message manager 1425, a range estimation manager 1430, an antenna switching manager 1435, and a ranging response manager 1440. Each of these managers may communicate, directly or indirectly, with one another such as via one or more buses.

In an initiating device, the ranging request manager 1420 may cause a ranging request to be transmitted to a responding device. In some implementations, the ranging request may include a request for transmit antenna switching by the responding device during a ranging procedure.

In some implementations, at least two ranging messages of the set of ranging messages are received using different receive antennas of the initiating device, and the range between the initiating device and the responding device is estimated based on using the different receive antennas. In some implementations, at least two ranging response messages of the set of ranging response messages are transmitted using different transmit antennas of the initiating device, and the range between the initiating device and the responding device is estimated based on using the different transmit antennas. In some implementations, the range estimation manager 1430 may determine a set of range values for each transmit and receive antenna pair used during the ranging procedure, where each range value of the set of range values is determined based on receiving a ranging message and transmitting a ranging response message using a transmit and receive antenna pair associated with the set. The range estimation manager 1430 may compute an average range value for each set of determined range values, and identify a minimum range value of all computed average range values, where the range between the initiating device and the responding device is estimated based on the minimum range value.

In some implementations, the range estimation manager 1430 may determine a set of round trip times based on receiving the set of ranging messages and transmitting the set of ranging response messages, where at least two round trip times of the set of round trip times are determined based on using different transmit and receive antenna pairs. The range estimation manager 1430 may determine an outlier threshold for discarding one or more round trip times of the set of round trip times, and may determine a subset of valid round trip times of the set of round trip times based on the outlier threshold, where the range between the initiating device and the responding device is estimated based on the subset of valid round trip times In some implementations, the range estimation manager 1430 may determine a median round trip time based on the set of round trip times, where the outlier threshold is based on the median round trip time, a bandwidth of the set of ranging messages, a bandwidth of the set of ranging response messages, a preamble type of the set of ranging messages, a preamble type of the set of ranging response messages, or some combination thereof In some implementations, the determination that the subset of valid round trip times may further include the range estimation manager 1430 comparing each round trip time of the set of round trip times to the outlier threshold, where the subset of valid round trip times is determined based on one or more round trip times that satisfy the outlier threshold.

In some implementations, the range estimation manager 1430 may identify a first group of the subset of valid round trip times including one or more valid round trip times determined using a first transmit and receive antenna pair, identify a second group of the subset of valid round trip times including one or more valid round trip times determined using a second transmit and receive antenna pair, and determine a weighted round trip time average for each of the first group and the second group, where the range between the initiating device and the responding device is estimated based on the weighted averages.

In some implementations, each weighted average is based on the median round trip time, a bandwidth of the set of ranging messages, a bandwidth of the set of ranging response messages, a preamble type of the set of ranging messages, a preamble type of the set of ranging response messages, or some combination thereof.

In some implementations, the range estimation manager 1430 may identify a lesser weighted round trip time average of the weighted round trip time averages, where the range between the initiating device and the responding device is estimated based on the lesser weighted average.

In some implementations, the ranging request includes a request for transmit antenna switching by the responding device during the ranging procedure.

In some implementations, the range estimation manager 1430 may determine that at least two ranging messages of the received set of ranging messages are associated with different transmit antennas of the responding device based on the request for transmit antenna switching by the responding device, where the range between the initiating device and the responding device is estimated based on the determination.

In some implementations, the receiving the ranging request by range estimation manager 1430 may further include receiving a first ranging message including an indication of transmit antenna switching capabilities of the responding device, where the range between the initiating device and the responding device is estimated based on the indication of transmit antenna switching capabilities of the responding device.

In some implementations, the receiving the set of ranging messages by range estimation manager 1430 may further include receiving, for each ranging message in the set of ranging messages, a transmit antenna index indicating a transmit antenna of the responding device used to transmit that ranging message or a transmit antenna of the responding device used to transmit a previous ranging message, where the range between the initiating device and the responding device is estimated based on the transmit antenna index indicating a transmit antenna of the responding used to transmit that ranging message or the transmit antenna of the responding device used to transmit a previous ranging message.

In some implementations, the set of ranging messages includes a set of fine timing measurement (FTM) frames and the set of ranging response messages includes a set of acknowledgement frames.

In some implementations, the ranging response manager 1440 may receive a set of ranging response messages from the initiating device, where each ranging response message in the received set of ranging response messages corresponds to a separate ranging message in the transmitted set of ranging messages.

In some implementations, at least two ranging response messages of the set of ranging response messages are received using different receive antennas of the responding device.

In some implementations, the transmitting the set of ranging messages by the responding device may include transmitting, for each ranging message in the set of ranging messages, a transmit antenna index indicating a transmit antenna of the responding device used to transmit that ranging message or a transmit antenna of the responding device used to transmit a previous ranging message.

In some implementations, the received ranging request includes a request for the responding device to provide the transmit antenna index for each transmitted ranging message in the set of ranging messages.

In some implementations, transmitting the set of ranging messages by the responding device can include transmitting, for each received ranging response message corresponding to the transmitted set of ranging messages, a receive antenna index indicating a receive antenna of the responding device used to receive each ranging response message.

In some implementations, the received ranging request includes a request for the responding device to provide the receive antenna index for each received ranging response message in the set of ranging response messages.

In some implementations, the ranging request further includes a request for receive antenna switching by the responding device during the ranging procedure, and estimating the range is further based on a determination that at least two of the ranging response messages are associated with different receive antennas of the responding device. In some implementations, the ranging request is an FTM request frame, the set of ranging messages includes a set of FTM frames, and the ranging procedure is an FTM procedure. In some implementations, the ranging request is an NDPA frame, the set of ranging messages includes a set of NDP frames, and the ranging procedure is a very high throughput Institute of Electrical and Electronics Engineers (IEEE) 802.11az (VHTz) procedure. In some implementations, the ranging request is a downlink Trigger frame, the set of ranging messages includes a set of UL NDP frames, and the ranging procedure is a high efficiency IEEE 802.11az (HEz) procedure.

In an initiating device, the ranging message manager 1425 may receive or process a set of ranging messages based on the transmitted ranging request. In some implementations, receiving the set of ranging messages includes receiving a first ranging message including an indication of receive antenna switching capabilities of the responding device. In some implementations, receiving the set of ranging messages includes receiving a first ranging message including a request for transmit antenna switching by the imitating device during the ranging procedure. In some implementations, receiving the set of ranging messages includes receiving a first ranging message including a request for receive antenna switching by the initiating device during the ranging procedure. In some implementations, receiving the set of ranging messages includes using different receive antennas of the initiating device to receive each ranging message, and where estimating the range is further based on using the different receive antennas to receive each ranging message.

In a responding device, the ranging request manager 1420 may receive or process the ranging request for a ranging procedure from an initiating device. In a receiving device, the ranging message manager 1425 may transmit a set of ranging messages to the initiating device based on the received ranging request, where at least two of the set of ranging messages are transmitted using different transmit antennas of the responding device.

In some implementations, the ranging message manager 1425 may transmit a second ranging message including an indication of receive antenna switching capabilities of the responding device. In some implementations, the ranging message manager 1425 may transmit a second ranging message including a request for transmit antenna switching by the initiating device during the ranging procedure.

In some implementations, transmitting the set of ranging messages includes transmitting a second ranging message including an indication of transmit antenna switching capabilities of the responding device. In some implementations, the initiating device may determine that at least two of the ranging response messages are associated with different receive antennas of the responding device based on the indication of receive antenna switching capabilities in the first ranging message.

In some implementations, the set of ranging response messages includes a set of acknowledgement frames and the set of ranging messages includes a set of FTM frames. In some implementations, at least two of the transmitted ranging messages are associated with different transmit antennas of the responding device.

The range estimation manager 1430 may estimate a range between the initiating device and the responding device based on the set of ranging messages and a determination that at least two of the received ranging messages are associated with different transmit antennas of the responding device.

In some implementations, the range estimation manager 1430 may determine a set of range values for each transmit and receive antenna pair used during the ranging procedure, where each range value of the set of range values is determined based on receiving a ranging message and transmitting a ranging response message using a transmit and receive antenna pair associated with the set. In some implementations, the range estimation manager 1430 may compute an average range value for each set of determined range values. In some implementations, the range estimation manager 1430 may identify a minimum range value of all computed average range values, where the range between the initiating device and the responding device is estimated based on the minimum range value. The average range value may be an example of a weighted average.

The antenna switching manager 1435 may receive a first ranging message including an indication of transmit antenna switching capabilities of the responding device. In some implementations, the antenna switching manager 1435 may receive, for each ranging message in the set of ranging messages, a transmit antenna index indicating a transmit antenna of the responding device used to transmit that ranging message or a transmit antenna of the responding device used to transmit a previous ranging message.

In some implementations, the antenna switching manager 1435 may receive, for each ranging response message corresponding to the set of ranging messages, a receive antenna index indicating a receive antenna of the responding device used to receive that ranging response message or a receive antenna of the responding device used to receive a previous ranging response message.

In some implementations, transmitting the set of ranging response messages to the responding device includes using different transmit antennas for transmitting at least two of the ranging response messages of the set of ranging response messages. In some implementations, the antenna switching manager 1435 may use different transmit antennas of the responding device to transmit each ranging message.

In some implementations, the antenna switching manager 1435 may transmit, for each ranging response message corresponding to the set of ranging messages, a receive antenna index indicating a receive antenna of the responding device used to receive each ranging response message. In some implementations, the antenna switching manager 1435 may use different receive antennas for receiving at least two of the ranging response messages of the set of ranging response messages. In some implementations, the antenna switching manager 1435 may transmit, for each ranging message in the set of ranging messages, a transmit antenna index indicating a transmit antenna of the responding device used to transmit that ranging message or a transmit antenna of the responding device used to transmit a previous ranging message.

In some implementations, the determination that at least two of the received ranging messages are associated with different transmit antennas of the responding device is based on the indication of transmit antenna switching capabilities in the first ranging message. In some implementations, the ranging request includes a request for the responding device to provide the transmit antenna index for each ranging message in the set of ranging messages. In some implementations, the ranging request includes a request for the responding device to provide the receive antenna index for each ranging response message in the set of ranging response messages.

In some implementations, the received ranging request includes a request for the responding device to provide the receive antenna index for each received ranging response message in the set of ranging response messages. In some implementations, the received ranging request includes a request for the responding device to provide the transmit antenna index for each ranging message in the set of ranging messages.

The ranging response manager 1440 may transmit a set of ranging response messages to the responding device, where each ranging response message in the set of ranging response messages corresponds to a separate ranging message in the received set of ranging messages. In some implementations, the ranging response manager 1440 may receive a set of ranging response messages from the initiating device, where each ranging response message in the set of ranging response messages corresponds to a separate ranging message of the transmitted set of ranging messages.

In some implementations, the set of ranging response messages includes a set of acknowledgement frames and the set of ranging messages includes a set of FTM frames. In some implementations, the set of ranging response messages includes a set of NDP frames, a set of DL NDPA frames, or a set of DL NDP frames. In some implementations, the set of ranging response messages includes a set of NDP frames, a set of DL NDPA frames, or a set of DL NDP frames.

Figure 15:
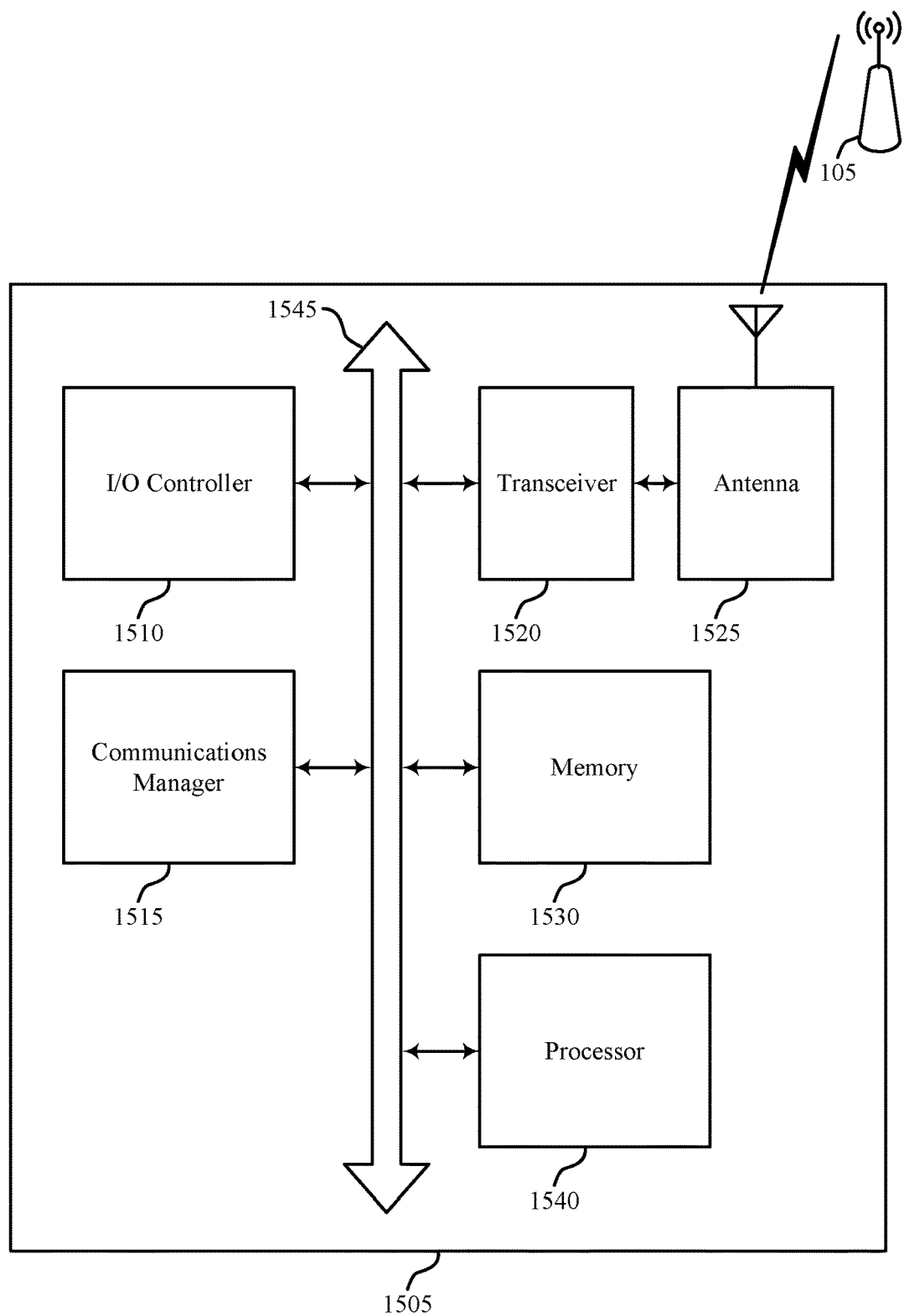

FIG. 15 shows a block diagram of an example device that supports ranging protocol improvements for antenna switching. The wireless communication device 1505 may be an example of or include the components of a STA 115, AP 105, initiating device 901, responding device 902, responding device 1001, initiating device 1002, initiating device 1003, or wireless communication device 1205 described herein. The wireless communication device 1505 may include components for bi-directional voice and data communications including components for transmitting and receiving communications, including an input/output (I/O) controller 1510, a communications manager 1515, a transceiver 1520, an antenna 1525, memory 1530, and a processor 1540. These components may be in electronic communication via one or more buses such as bus 1545.

The communications manager 1515 may be an example of communications manager 1215, communications manager 1315, or communications manager 1405 described herein.

The I/O controller 1510 may manage input and output signals for the wireless communication device 1505. The I/O controller 1510 also may manage peripherals not integrated into the wireless communication device 1505. In some implementations, the I/O controller 1510 may represent a physical connection or port to an external peripheral. In some implementations, a user may interact with the wireless communication device 1505 via the I/O controller 1510 or via hardware components controlled by the I/O controller 1510.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 also may include a modem to modulate the packets and provide the modulated packets to the antennas for transmission, and to demodulate packets received from the antennas.

In some implementations, the wireless communication device 1505 may include a single antenna 1525. However, in some implementations the device may have more than one antenna 1525, which may be capable of concurrently transmitting or receiving multiple wireless transmissions.

The memory 1530 may store computer-readable, computer-executable software 1535 including instructions that, when executed, cause the processor 1540 to perform various functions described herein. In some implementations, the memory 1530 may contain, among other things, a basic I/O system (BIOS) which may control basic hardware or software operation such as the interaction with peripheral components or devices.

The processor 1540 may be configured to execute computer-readable instructions stored in the memory 1530 to perform various functions such as functions or tasks supporting ranging protocol improvements for antenna switching.

Figure 16:
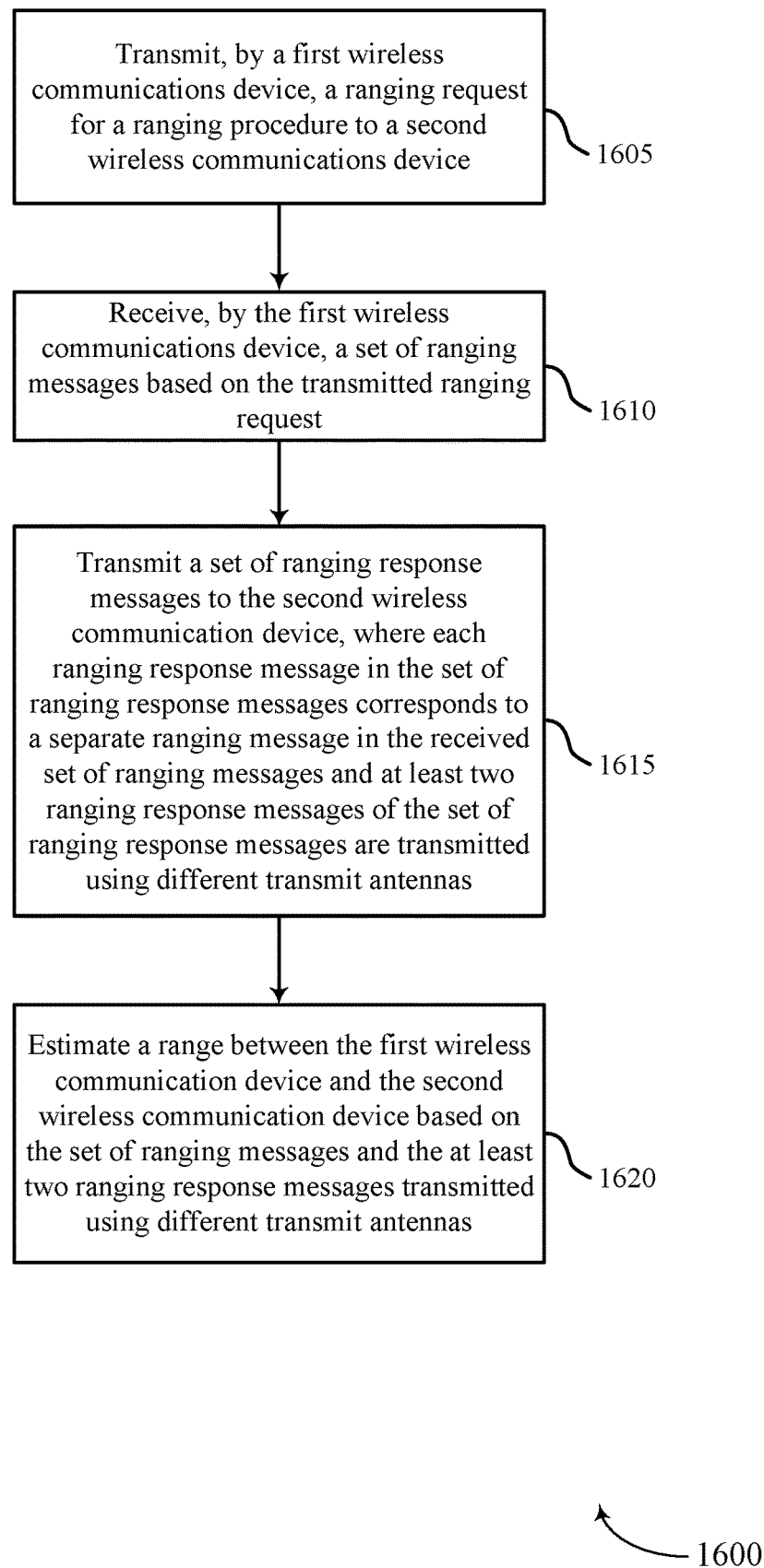
FIGS. 16-20 are flowcharts of example methods that support ranging protocol improvements for antenna switching.

FIG. 16 is a flowchart of example method 1600 that supports ranging protocol improvements for antenna switching. The operations of method 1600 may be implemented by a first wireless communication device (such as a STA 115, AP 105, wireless communication device 1205, or wireless communication device 1305) or its components as described herein. For example, the operations of method 1600 may be performed by a communications manager as described with reference to FIGS. 12-15. In some implementations, a processor may execute a set of instructions to control the functional elements of the wireless communication device to perform the functions described herein. Additionally, or alternatively, a wireless communication device may perform aspects of the functions described herein using special-purpose hardware.

At block 1605, a first wireless communication device (that is, the initiating device) may transmit a ranging request for a ranging procedure to a second wireless communication device (that is, a responding wireless device). The operations of block 1605 may be performed according to the methods described herein. In some implementations, aspects of the operations of block 1605 may be performed by a ranging request manager as described with reference to FIGS. 12-15.

At block 1610, the first wireless communication device may receive a set of ranging messages based on the transmitted ranging request. The operations of block 1610 may be performed according to the methods described herein. In some implementations, aspects of the operations of block 1610 may be performed by a ranging message manager as described with reference to FIGS. 12-15.

At block 1615, the first wireless communication device may transmit a set of ranging response messages to the second wireless communication device, where each ranging response message in the set of ranging response messages corresponds to a separate ranging message in the received set of ranging messages and at least two ranging response messages of the set of ranging response messages are transmitted using different transmit antennas. The operations of block 1615 may be performed according to the methods described herein. In some implementations, aspects of the operations of block 1615 may be performed by a ranging message manager as described with reference to FIGS. 12-15.

At block 1620, the first wireless communication device may estimate a range between the first wireless communication device and the second wireless communication device based on the set of ranging messages and the at least two ranging response messages transmitted using different transmit antennas of the second wireless communication device. The operations of block 1620 may be performed according to the methods described herein. In some implementations, aspects of the operations of block 1620 may be performed by a range estimation manager as described with reference to FIGS. 12-15.

Figure 17:
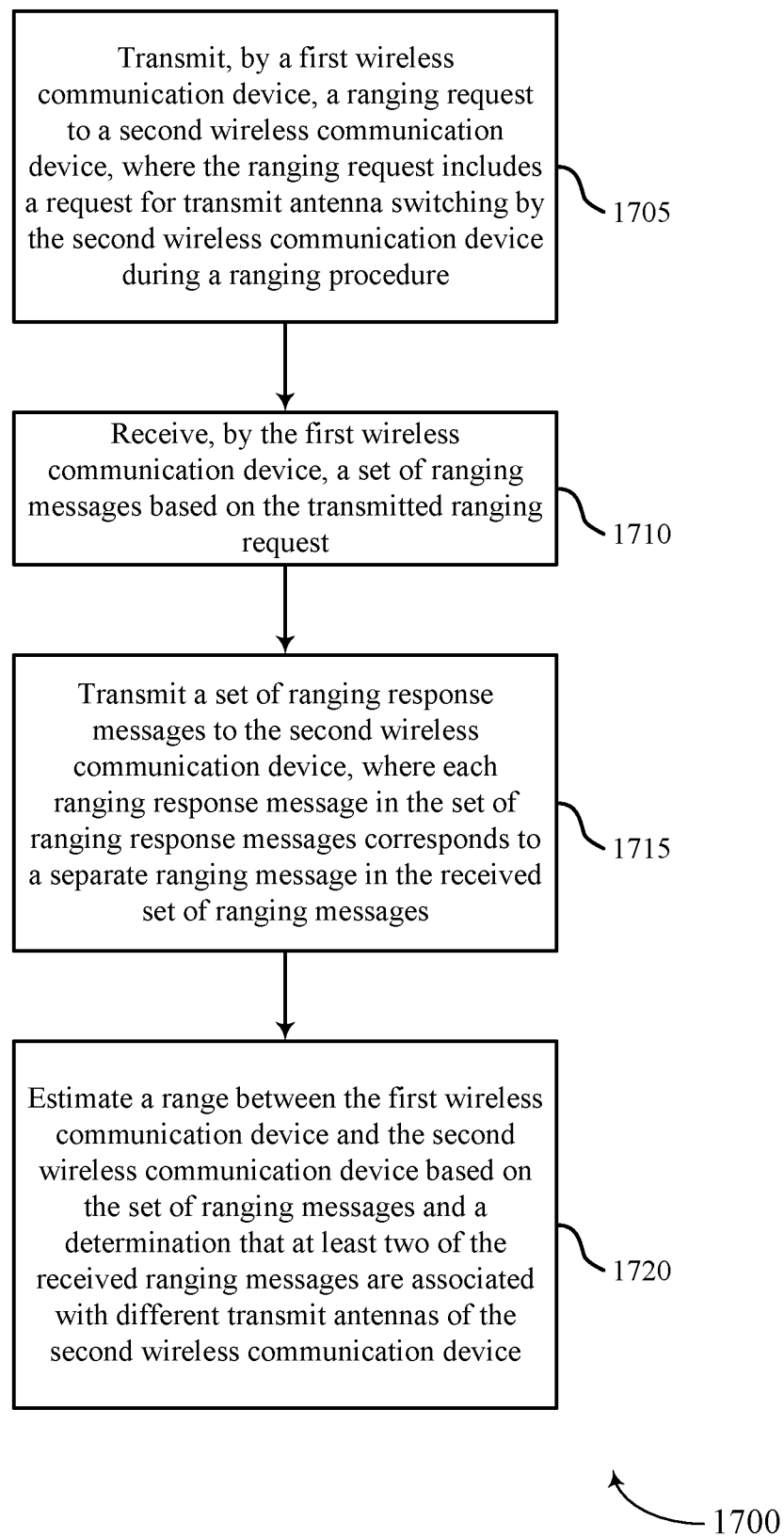

FIG. 17 is a flowchart of example method 1700 that supports ranging protocol improvements for antenna switching. The operations of method 1700 may be implemented by a first wireless communication device (such as a STA 115, AP 105, wireless communication device 1205, or wireless communication device 1305) or its components as described herein. For example, the operations of method 1700 may be performed by a communications manager as described with reference to FIGS. 12-15. In some implementations, a processor may execute a set of instructions to control the functional elements of the first wireless communication device to perform the functions described herein. Additionally, or alternatively, the first wireless communication device may perform aspects of the functions described herein using special-purpose hardware.

At block 1705, the first wireless communication device, (that is, the initiating device) may transmit a ranging request to a second wireless communication device (that is, the responding device), where the ranging request includes a request for transmit antenna switching by the second wireless communication device during a ranging procedure. The operations of block 1705 may be performed according to the methods described herein. In some implementations, aspects of the operations of block 1705 may be performed by a ranging request manager as described with reference to FIGS. 12-15.

At block 1710, the first wireless communication device may receive, a set of ranging messages based on the transmitted ranging request. The operations of block 1710 may be performed according to the methods described herein. In some implementations, aspects of the operations of block 1710 may be performed by a ranging message manager as described with reference to FIGS. 12-15.

At block 1715, the first wireless communication device may transmit a set of ranging response messages to the second wireless communication device, where each ranging response message in the set of ranging response messages corresponds to a separate ranging message in the received set of ranging messages. The operations of block 1715 may be performed according to the methods described herein. In some implementations, aspects of the operations of block 1715 may be performed by a ranging response manager as described with reference to FIGS. 12-15.

At block 1720, the first wireless communication device may estimate a range between the first wireless communication device and the second wireless communication device based on the set of ranging messages and a determination that at least two of the received ranging messages are associated with different transmit antennas of the second wireless communication device. The operations of block 1720 may be performed according to the methods described herein. In some implementations, aspects of the operations of block 1720 may be performed by a range estimation manager as described with reference to FIGS. 12-15.

Figure 18:
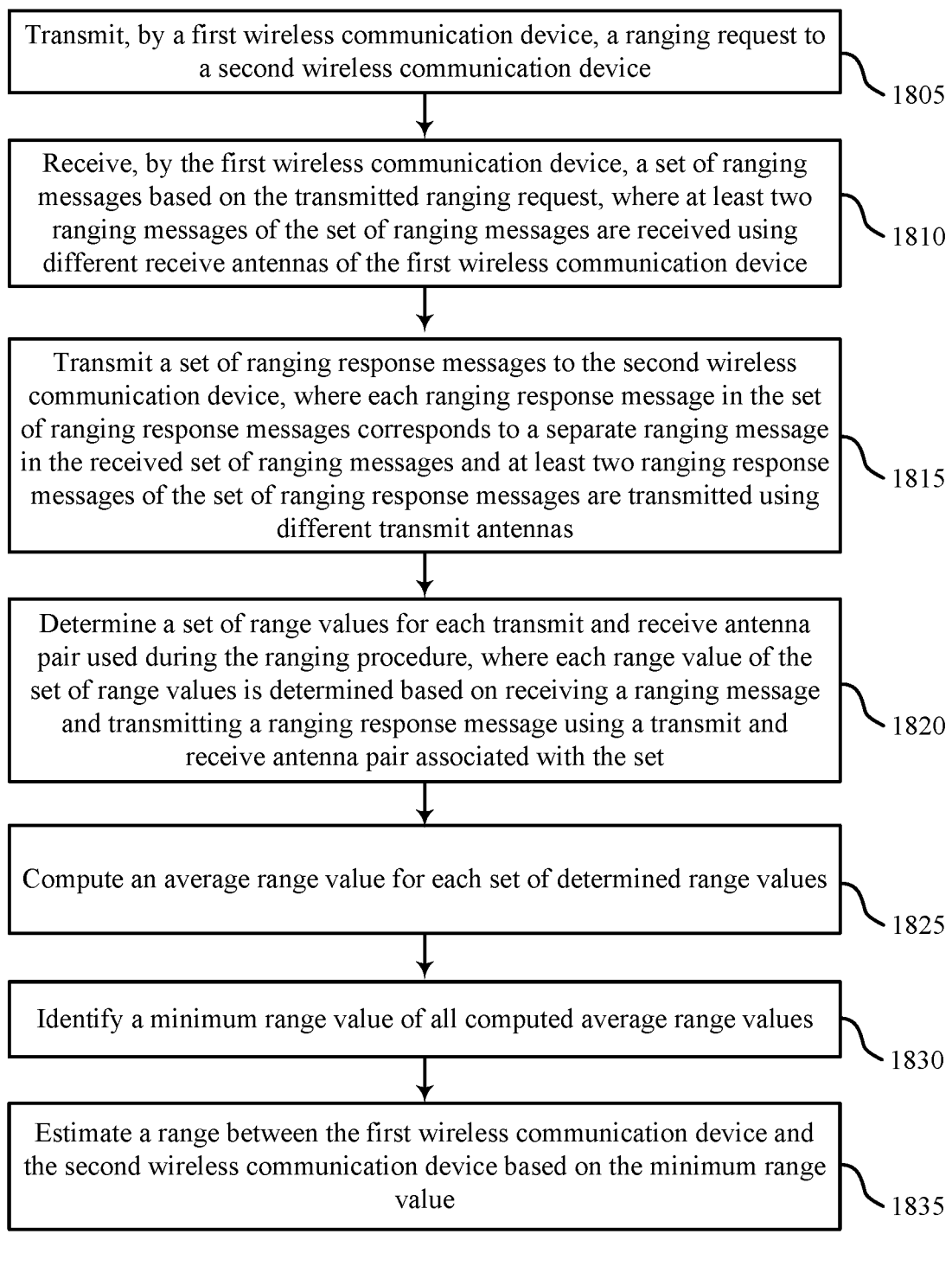

FIG. 18 is a flowchart of example method 1800 that supports ranging protocol improvements for antenna switching. The operations of method 1800 may be implemented by a first wireless communication device (such as a STA 115, AP 105, wireless communication device 1205, or wireless communication device 1305) or its components as described herein. For example, the operations of method 1800 may be performed by a communications manager as described with reference to FIGS. 12-15. In some implementations, a processor may execute a set of instructions to control the functional elements of the first wireless communication device to perform the functions described herein. Additionally, or alternatively, the first wireless communication device may perform aspects of the functions described herein using special-purpose hardware.

At block 1805, the first wireless communication device (that is, the initiating device) may transmit a ranging request for a ranging procedure to a second wireless communication device (that is, the responding device). The operations of block 1805 may be performed according to the methods described herein. In some implementations, aspects of the operations of block 1805 may be performed by a ranging request manager as described with reference to FIGS. 12-15.

At block 1810, the first wireless communication device may receive, by the first wireless communication device, a set of ranging messages based on the transmitted ranging request, where at least two ranging messages of the set of ranging messages are received using different receive antennas of the first wireless communication device. The operations of block 1810 may be performed according to the methods described herein. In some implementations, aspects of the operations of block 1810 may be performed by a ranging message manager as described with reference to FIGS. 12-15.

At block 1815, the first wireless communication device may transmit a set of ranging response messages to the second wireless communication device, where each ranging response message in the set of ranging response messages corresponds to a separate ranging message in the received set of ranging messages and at least two ranging response messages of the set of ranging response messages are transmitted using different transmit antennas. The operations of block 1815 may be performed according to the methods described herein. In some implementations, aspects of the operations of block 1815 may be performed by a ranging message manager as described with reference to FIGS. 12-15.

At block 1820, the first wireless communication device may determine a set of range values for each transmit and receive antenna pair used during the ranging procedure, where each range value of the set of range values is determined based on receiving a ranging message and transmitting a ranging response message using a transmit and receive antenna pair associated with the set. The operations of block 1820 may be performed according to the methods described herein. In some implementations, aspects of the operations of block 1820 may be performed by a range estimation manager as described with reference to FIGS. 12-15.

At block 1825, the first wireless communication device may compute an average range value for each set of determined range values. In some implementations, the average range value may be a weighted average of the determined range values. The operations of block 1825 may be performed according to the methods described herein. In some implementations, aspects of the operations of block 1825 may be performed by a range estimation manager as described with reference to FIGS. 12-15.

At block 1830, the first wireless communication device may identify a minimum range value of all computed average range values. In some implementations, the average range value may be a weighted average of the determined range values. The operations of block 1830 may be performed according to the methods described herein. In some implementations, aspects of the operations of block 1830 may be performed by a range estimation manager as described with reference to FIGS. 12-15.

At block 1835, the first wireless communication device may estimate a range between the first wireless communication device and the second wireless communication device based on the identified minimum range value. The operations of block 1835 may be performed according to the methods described herein. In some implementations, aspects of the operations of block 1835 may be performed by a range estimation manager as described with reference to FIGS. 12-15.

Figure 19:
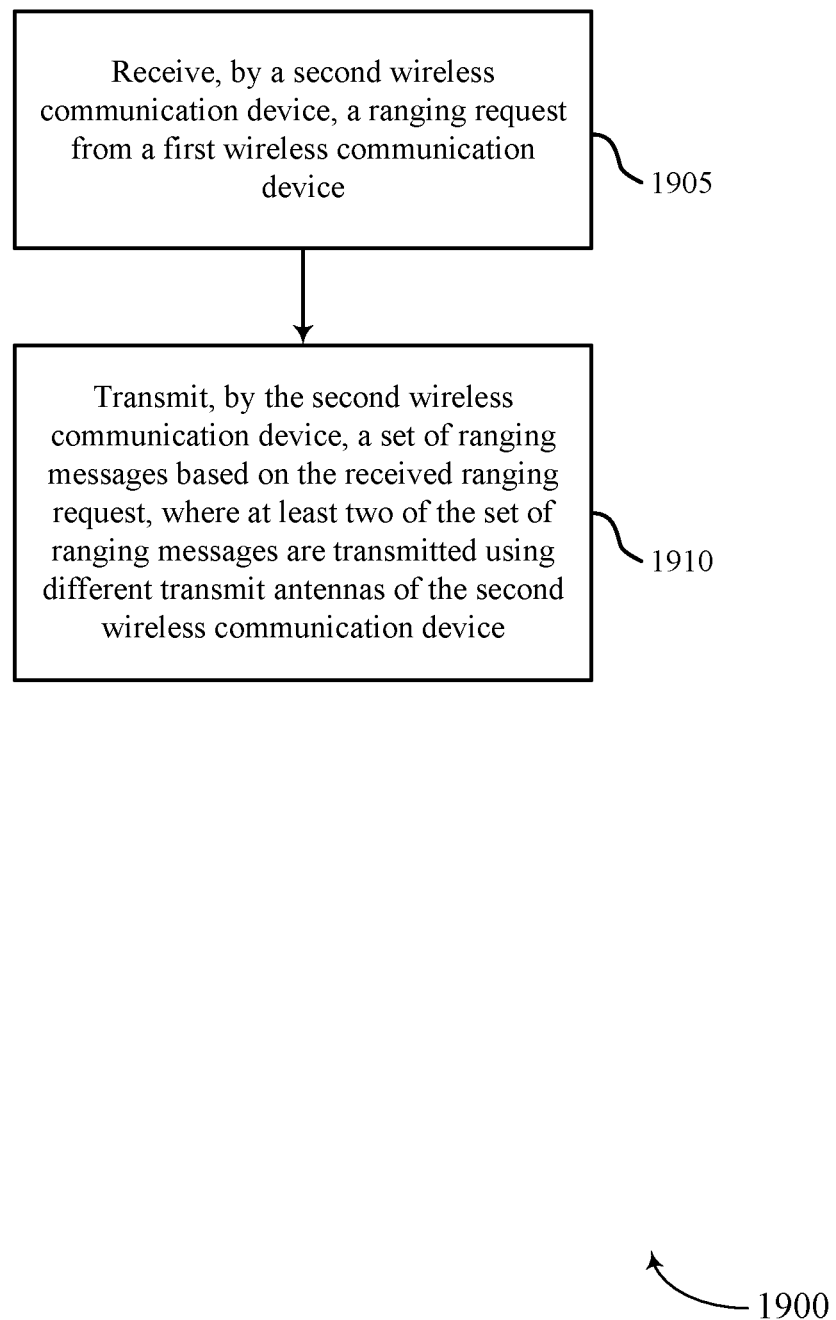

FIG. 19 is a flowchart of example method 1900 that supports ranging protocol improvements for antenna switching. The operations of method 1900 may be implemented by a second wireless communication device (such as a STA 115, AP 105, wireless communication device 1205, or wireless communication device 1305) or its components as described herein. For example, the operations of method 1900 may be performed by a communications manager as described with reference to FIGS. 12-15. In some implementations, a processor may execute a set of instructions to control the functional elements of the second wireless communication device to perform the functions described herein. Additionally, or alternatively, the second wireless communication device may perform aspects of the functions described herein using special-purpose hardware.

At block 1905, the second wireless communication device (that is, the responding device) may receive a ranging request for a ranging procedure from a first wireless communication device (that is, the initiating device. The operations of block 1905 may be performed according to the methods described herein. In some implementations, aspects of the operations of block 1905 may be performed by a ranging request manager as described with reference to FIGS. 12-15.

At block 1910, the second wireless communication device may transmit, to the first wireless communication device, a set of ranging messages based on the received ranging request, where at least two of the set of ranging messages are transmitted using different transmit antennas of the second wireless communication device. The operations of block 1910 may be performed according to the methods described herein. In some implementations, aspects of the operations of block 1910 may be performed by a ranging message manager as described with reference to FIGS. 12-15.

Figure 20:
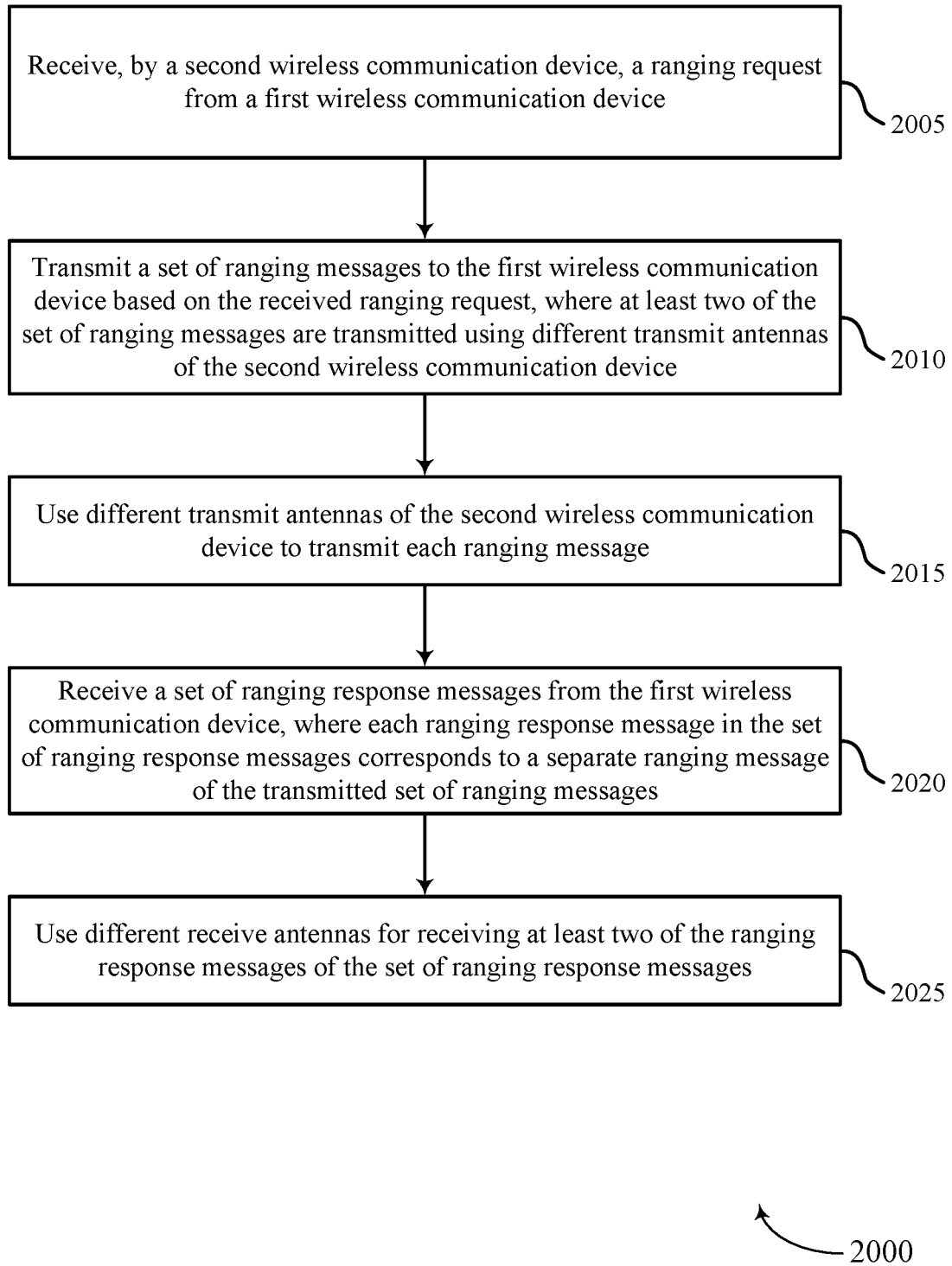

FIG. 20 is a flowchart of example method 2000 that supports ranging protocol improvements for antenna switching. The operations of method 2000 may be implemented by a second wireless communication device (such as a STA 115, AP 105, wireless communication device 1205, wireless communication device 1305) or its components as described herein. For example, the operations of method 2000 may be performed by a communications manager as described with reference to FIGS. 12-15. In some implementations, a processor may execute a set of instructions to control the functional elements of the second wireless communication device to perform the functions described herein. Additionally, or alternatively, the second wireless communication device may perform aspects of the functions described herein using special-purpose hardware.

At block 2005, the second wireless communication device (that is, the responding device) may receive a ranging request from a first wireless communication device (that is, the initiating device). The operations of block 2005 may be performed according to the methods described herein. In some implementations, aspects of the operations of block 2005 may be performed by a ranging request manager as described with reference to FIGS. 12-15.

At block 2010, the second wireless communication device may transmit a set of ranging messages to the first wireless communication device based on the received ranging request, where at least two of the set of ranging messages are transmitted using different transmit antennas of the second wireless communication device. The operations of block 2010 may be performed according to the methods described herein. In some implementations, aspects of the operations of block 2010 may be performed by a ranging message manager as described with reference to FIGS. 12-15.

At block 2015, the second wireless communication device may use different transmit antennas of the second wireless communication device to transmit each ranging message. The operations of block 2015 may be performed according to the methods described herein. In some implementations, aspects of the operations of block 2015 may be performed by an antenna switching manager as described with reference to FIGS. 12-15.

At block 2020, the second wireless communication device may receive a set of ranging response messages from the first wireless communication device, where each ranging response message in the set of ranging response messages corresponds to a separate ranging message of the transmitted set of ranging messages. The operations of block 2020 may be performed according to the methods described herein. In some implementations, aspects of the operations of block 2020 may be performed by a ranging response manager as described with reference to FIGS. 12-15.

At block 2025, the second wireless communication device may use different receive antennas for receiving at least two of the ranging response messages of the set of ranging response messages. The operations of block 2025 may be performed according to the methods described herein. In some implementations, aspects of the operations of block

2025 may be performed by an antenna switching manager as described with reference to FIGS. 12-15.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a set of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include random-access memory (RAM), read-only memory (ROM), EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described herein as acting in certain combinations and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication, comprising:
a first interface configured to output a ranging request for transmission to an access point for a ranging procedure, wherein the ranging request comprises an indication of antenna switching capabilities of the apparatus for the ranging procedure, the antenna switching capabilities comprising a number of different transmit antennas for the ranging procedure during which the apparatus is configured to switch among the different transmit antennas;

a second interface configured to receive a plurality of ranging messages from the access point based at least in part on the outputted ranging request;

the first interface configured to output a plurality of ranging response messages for transmission to the access point, wherein each ranging response message in the plurality of ranging response messages corresponds to a separate ranging message in the plurality of ranging messages and at least two ranging response messages of the plurality of ranging response messages are output for transmission by switching among the different transmit antennas; and a processing system configured to estimate a range between the station and the access point based at least in part on the plurality of ranging messages and the at least two ranging response messages.

2. The apparatus of claim 1, wherein the second interface is configured to receive at least two ranging messages of the plurality of ranging messages based at least in part on different receive antennas of the station, and wherein the processing system is configured to estimate the range between the station and the access point based at least in part on the different receive antennas.

3. The apparatus of claim 1, wherein the processing system is further configured to:

determine a set of range values for each transmit and receive antenna pair used during the ranging procedure, wherein each range value of the set of range values is determined based at least in part on receiving a ranging message and transmitting a ranging response message using a transmit and receive antenna pair associated with the set;

compute an average range value for each set of determined range values; and identify a minimum range value of all computed average range values, wherein the processing system is configured to estimate the range between the station and the access point based at least in part on the minimum range value.

4. The apparatus of claim 1, wherein the processing system is further configured to:

determine a set of round trip times based at least in part on receiving the plurality of ranging messages and transmitting the plurality of ranging response messages, wherein at least two round trip times of the set of round trip times are determined based at least in part on using different transmit and receive antenna pairs;

determine an outlier threshold for discarding one or more round trip times of the set of round trip times; and determine a subset of valid round trip times of the set of round trip times based at least in part on the outlier threshold, wherein the processing system is configured to estimate the range between the station and the access point based at least in part on the subset of valid round trip times.

5. The apparatus of claim 4, wherein the processing system is further configured to:

determine a median round trip time based at least in part on the set of round trip times, wherein the outlier threshold is based at least in part on the median round trip time, a bandwidth of the plurality of ranging messages, a bandwidth of the plurality of ranging response messages, a preamble type of the plurality of ranging messages, a preamble type of the plurality of ranging response messages, or some combination thereof.

6. The apparatus of claim 4, wherein the processing system is further configured to:

compare each round trip time of the set of round trip times to the outlier threshold, wherein the processing system is configured to determine the subset of valid round trip times based at least in part on the one or more round trip times that satisfy the outlier threshold.

7. The apparatus of claim 4, wherein the processing system is further configured to:

identify a first group of the subset of valid round trip times comprising one or more valid round trip times determined using a first transmit and receive antenna pair;

identify a second group of the subset of valid round trip times comprising one or more valid round trip times determined using a second transmit and receive antenna pair; and determine a weighted round trip time average for each of the first group and the second group, wherein the processing system is configured to estimate the range between the station and the access point based at least in part on the weighted round trip time average for each of the first group and the second group.

8. The apparatus of claim 7, wherein each weighted round trip time average is based at least in part on a median round trip time, a bandwidth of the plurality of ranging messages, a bandwidth of the plurality of ranging response messages, a preamble type of the plurality of ranging messages, a preamble type of the plurality of ranging response messages, or some combination thereof.

9. The apparatus of claim 7, wherein the processing system is further configured to:

identify a lesser weighted round trip time average of the weighted round trip time averages, wherein the processing system is configured to estimate the range between the station and the access point based at least in part on the lesser weighted round trip time average.

10. The apparatus of claim 1, wherein the ranging request includes a request for transmit antenna switching by the access point during the ranging procedure.

11. The apparatus of claim 10, wherein the processing system is further configured to:

determine that at least two ranging messages of the received plurality of ranging messages are associated with different transmit antennas of the access point based at least in part on the request for transmit antenna switching by the access point, wherein the processing system is configured to estimate the range between the station and the access point based at least in part on the determination.

12. The apparatus of claim 1, wherein the second interface is further configured to:

receive a first ranging message comprising an indication of transmit antenna switching capabilities of the access point, wherein the processing system is configured to estimate the range between the station and the access point based at least in part on the indication of transmit antenna switching capabilities of the access point; and receive, for each ranging message in the plurality of ranging messages, a transmit antenna index indicating a transmit antenna of the access point used to transmit that ranging message or a transmit antenna of the access point used to transmit a previous ranging message, wherein the processing system is configured to estimate the range between the station and the access point based at least in part on the transmit antenna index indicating the transmit antenna of the access point used to transmit that ranging message or the transmit antenna of the access point used to transmit the previous ranging message.

13. The apparatus of claim 1, wherein the plurality of ranging messages comprises a plurality of fine timing measurement (FTM) frames and the plurality of ranging response messages comprises a plurality of acknowledgement frames.

14. The apparatus of claim 1, further comprising:
a transceiver configured to transmit the ranging request and the plurality of ranging response messages, wherein the plurality of ranging messages are received via the transceiver, and further wherein the apparatus is configured as a user equipment (UE).

15. An apparatus for wireless communication, comprising:
a first interface configured to receive a ranging request from a station for a ranging procedure, wherein the ranging request comprises an indication of antenna switching capabilities of the station for the ranging procedure, the antenna switching capabilities comprising a number of different transmit antennas for the ranging procedure during which the station is configured to switch among the different transmit antennas; and
a second interface configured to output a plurality of ranging messages for transmission to the station based at least in part on the received ranging request, wherein at least two ranging messages of the plurality of ranging messages are transmitted using the different transmit antennas.

16. The apparatus of claim 15, wherein the first interface is further configured to:
receive the plurality of ranging response messages from the station, wherein each ranging response message in the plurality of ranging response messages corresponds to a separate ranging message in the plurality of ranging messages.

17. The apparatus of claim 16, wherein at least two ranging response messages of the plurality of ranging response messages are received using different receive antennas of an access point.

18. The apparatus of claim 15, wherein the ranging request includes a request for transmit antenna switching by an access point during the ranging procedure.

19. The apparatus of claim 15, wherein the second interface is further configured to:
output a first ranging message for transmission to the station, the first ranging message comprising an indication of transmit antenna switching capabilities of an access point; and
output for transmission, for each ranging message in the plurality of ranging messages, a transmit antenna index indicating a transmit antenna of the access point used to transmit that ranging message or a transmit antenna of the access point used to transmit a previous ranging message.

20. The apparatus of claim 19, wherein the received ranging request comprises a request for the access point to provide the transmit antenna index for each transmitted ranging message in the plurality of ranging messages.

21. The apparatus of claim 15, wherein the second interface is further configured to:
output for transmission, for each received ranging response message corresponding to the transmitted plurality of ranging messages, a receive antenna index indicating a receive antenna of an access point used to receive each ranging response message.

22. The apparatus of claim 21, wherein the received ranging request comprises a request for the access point to provide the receive antenna index for each received ranging response message in the plurality of ranging response messages.

23. The apparatus of claim 15, further comprising:
a transceiver configured to transmit the plurality of ranging message, wherein the ranging request is received via the transceiver, and further wherein the apparatus is configured as an access point.

24. A method for wireless communication at a station, comprising:
transmitting a ranging request to a access point for a ranging procedure, wherein the ranging request comprises an indication of antenna switching capabilities of the station for the ranging procedure, the antenna switching capabilities comprising a number of different transmit antennas for the ranging procedure during which the station is configured to switch among the different transmit antennas;
receiving a plurality of ranging messages from the access point based at least in part on the transmitted ranging request;
transmitting a plurality of ranging response messages to the access point, wherein each ranging response message in the plurality of ranging response messages corresponds to a separate ranging message in the received plurality of ranging messages and at least two ranging response messages of the plurality of ranging response messages are transmitted by switching among the different transmit antennas; and
estimating a range between the station and the access point based at least in part on the plurality of ranging messages and the at least two ranging response messages.

25. The method of claim 24, wherein at least two ranging messages of the plurality of ranging messages are received using different receive antennas of the station, and wherein the range between the station and the access point is estimated based at least in part on using the different receive antennas.

26. The method of claim 24, wherein estimating the range further comprises:
determining a set of range values for each transmit and receive antenna pair used during the ranging procedure, wherein each range value of the set of range values is determined based at least in part on receiving a ranging message and transmitting a ranging response message using a transmit and receive antenna pair associated with the set;
computing an average range value for each set of determined range values; and
identifying a minimum range value of all computed average range values, wherein the range between the station and the access point is estimated based at least in part on the minimum range value.

27. The method of claim 24, wherein estimating the range further comprises:
determining a set of round trip times based at least in part on receiving the plurality of ranging messages and transmitting the plurality of ranging response messages, wherein at least two round trip times of the set of round trip times are determined based at least in part on using different transmit and receive antenna pairs;

determining an outlier threshold for discarding one or more round trip times of the set of round trip times; and determining a subset of valid round trip times of the set of round trip times based at least in part on the outlier threshold, wherein the range between the station and the access point is estimated based at least in part on the subset of valid round trip times.

28. The method of claim 27, further comprising:

determining a median round trip time based at least in part on the set of round trip times, wherein the outlier threshold is based at least in part on the median round trip time, a bandwidth of the plurality of ranging messages, a bandwidth of the plurality of ranging response messages, a preamble type of the plurality of ranging messages, a preamble type of the plurality of ranging response messages, or some combination thereof.

29. The method of claim 27, wherein determining the subset of valid round trip times further comprises:

comparing each round trip time of the set of round trip times to the outlier threshold, wherein the subset of valid round trip times is determined based at least in part on the one or more round trip times that satisfy the outlier threshold.

30. A method for wireless communication at an access point, comprising:

receiving a ranging request from a station for a ranging procedure, wherein the ranging request comprises an indication of antenna switching capabilities of the station for the ranging procedure, the antenna switching capabilities comprising a number of different transmit antennas for the ranging procedure during which the station is configured to switch among the different transmit antennas; and transmitting a plurality of ranging messages to the station based at least in part on the received ranging request, wherein at least two ranging messages of the plurality of ranging messages are transmitted using the different transmit antennas.

* * * * *